US011104502B2

(12) United States Patent
Espinosa

(10) Patent No.: US 11,104,502 B2
(45) Date of Patent: Aug. 31, 2021

(54) MULTI-FUNCTION COMPACT APPLIANCE AND METHODS FOR A FOOD OR ITEM IN A CONTAINER WITH A CONTAINER STORAGE TECHNOLOGY

(71) Applicant: Edward P. Espinosa, Madrid (ES)

(72) Inventor: Edward P. Espinosa, Madrid (ES)

(73) Assignee: Jeffrey S. Melcher, Boca Raton, FL (US)

( * ) Notice: Subject to any disclaimer, the term of this patent is extended or adjusted under 35 U.S.C. 154(b) by 801 days.

(21) Appl. No.: 15/446,390

(22) Filed: Mar. 1, 2017

(65) Prior Publication Data

US 2018/0093814 A1    Apr. 5, 2018

Related U.S. Application Data

(60) Provisional application No. 62/301,757, filed on Mar. 1, 2016.

(51) Int. Cl.
*B65D 81/20* (2006.01)
*A47F 3/04* (2006.01)
(Continued)

(52) U.S. Cl.
CPC ............ *B65D 81/2038* (2013.01); *A23L 3/01* (2013.01); *A23L 3/28* (2013.01); *A23L 5/15* (2016.08);
(Continued)

(58) Field of Classification Search
CPC ... B65D 81/2038; B65D 2203/10; A23L 5/15; A23L 3/01; A23L 3/28; A47F 3/001;
(Continued)

(56) References Cited

U.S. PATENT DOCUMENTS 1,404,400 A   1/1922   Moon
1,594,512 A   8/1926   Der Lippe-Lipski
(Continued)

FOREIGN PATENT DOCUMENTS

DE      19858254 A1    6/2000
DE   202004011287 U1   9/2004
(Continued)

OTHER PUBLICATIONS

European Search Report and Examination dated Feb. 20, 2012 in EP 06 72 0029, pp. 1-7.
(Continued)

*Primary Examiner* — Jimmy Chou
(74) *Attorney, Agent, or Firm* — Melcher Patent Law PLLC; Jeffrey S. Melcher

(57) ABSTRACT

A multi-function appliance and methods and systems for manufacturing, producing, preparing, packaging, displaying, selling and marketing perishable food or items in a container with a container storage technology for use with select consumer goods or household appliances. A method and system for the use of multiple brand logos or names and communicative indicia on a container or product packaging wherein at least one of the brand logos or names, such as a secondary or tertiary brand logo or name can be used to represent different or distinct products, services or benefits from the primary brand logo or name.

21 Claims, 29 Drawing Sheets

(51) Int. Cl.
*F25D 17/04* (2006.01)
*A47F 3/00* (2006.01)
*A23L 3/01* (2006.01)
*A23L 3/28* (2006.01)
*A47F 7/00* (2006.01)
*A23L 5/10* (2016.01)
*F25D 25/02* (2006.01)

(52) U.S. Cl.
CPC .............. *A47F 3/001* (2013.01); *A47F 3/04* (2013.01); *A47F 7/0071* (2013.01); *F25D 17/042* (2013.01); *A47B 2210/175* (2013.01); *B65D 2203/10* (2013.01); *F25D 25/025* (2013.01)

(58) Field of Classification Search
CPC ........ A47F 3/04; A47F 7/0071; F25D 17/042; F25D 25/025; A47B 2210/175
USPC ....... 219/470, 472, 686, 702, 703, 704, 720, 219/401
See application file for complete search history.

(56) References Cited

U.S. PATENT DOCUMENTS

| | | | |
|---|---|---|---|
| 2,388,746 A | 11/1945 | Knapp | |
| 2,425,816 A | 8/1947 | Maxson | |
| 2,823,833 A * | 2/1958 | Bauerlein | B67D 1/0045 222/129.2 |
| 2,894,845 A | 7/1959 | Stoddard | |
| 3,116,610 A | 1/1964 | Whitmore | |
| 3,216,214 A | 11/1965 | Gasbarro | |
| 3,409,447 A * | 11/1968 | Jeppson | H05B 6/782 426/244 |
| 4,179,596 A * | 12/1979 | Bjork | C03B 32/00 219/686 |
| 4,222,276 A | 9/1980 | DeRogatis | |
| 4,340,797 A * | 7/1982 | Takano | G10L 15/26 219/707 |
| 4,340,798 A * | 7/1982 | Ueda | H05B 6/6411 219/714 |
| 4,340,800 A * | 7/1982 | Ueda | H05B 6/6435 219/714 |
| 4,351,999 A * | 9/1982 | Nagamoto | H05B 6/6432 219/705 |
| 4,430,540 A * | 2/1984 | Scalf | H05B 6/6452 219/506 |
| 4,513,189 A * | 4/1985 | Ueda | H05B 6/6435 219/490 |
| 4,517,026 A * | 5/1985 | Inoue | H01L 21/324 219/686 |
| 4,557,118 A | 12/1985 | Pink | |
| 4,697,057 A * | 9/1987 | Fowler | H05B 6/6452 200/11 G |
| 4,725,948 A * | 2/1988 | Mierzwinski | H05B 6/6435 219/702 |
| 4,755,646 A * | 7/1988 | Fowler | H05B 6/6452 200/37 A |
| 4,841,661 A | 6/1989 | Moore | |
| 4,909,014 A | 3/1990 | Kobayashi | |
| 5,046,332 A | 9/1991 | Hermann | |
| 5,095,717 A | 3/1992 | Germi | |
| 5,112,630 A * | 5/1992 | Scott | A21B 1/48 219/388 |
| 5,121,677 A * | 6/1992 | Le Claire | A21C 9/04 118/18 |
| D326,663 S | 8/1992 | Girardon | |
| 5,142,970 A | 9/1992 | ErkenBrack | |
| 5,157,940 A | 10/1992 | Bertu | |
| 5,195,427 A | 3/1993 | Germano | |
| 5,237,142 A * | 8/1993 | Cigarini | G01G 19/56 219/708 |
| 5,271,240 A * | 12/1993 | Detrick | F25D 17/042 62/268 |
| 5,272,963 A * | 12/1993 | Del Fabbro | H05B 6/645 99/468 |
| 5,332,095 A | 7/1994 | Wu | |
| 5,334,402 A * | 8/1994 | Ovadia | A21D 8/06 219/686 |
| 5,347,918 A | 9/1994 | Chen | |
| 5,390,809 A | 2/1995 | Lin | |
| 5,398,811 A | 3/1995 | Latella | |
| 5,492,703 A | 2/1996 | Gics | |
| 5,494,165 A | 2/1996 | Detrick | |
| 5,521,359 A * | 5/1996 | Bone | H05B 6/68 219/679 |
| 5,522,216 A | 6/1996 | Park | |
| 5,605,047 A | 2/1997 | Park | |
| 5,628,404 A | 5/1997 | Hendrix | |
| 5,806,575 A | 9/1998 | Tsay | |
| 5,837,193 A * | 11/1998 | Childers | A61L 2/24 422/28 |
| 5,859,412 A * | 1/1999 | Yagi | A23B 4/031 219/704 |
| 5,946,919 A * | 9/1999 | McKinney | A21C 15/00 62/3.7 |
| 5,964,255 A | 10/1999 | Schmidt | |
| 6,090,422 A | 7/2000 | Taragan | |
| 6,121,593 A * | 9/2000 | Mansbery | F24C 7/08 219/679 |
| 6,148,875 A | 11/2000 | Breen | |
| 6,264,054 B1 | 7/2001 | Miyake | |
| 6,297,479 B1 * | 10/2001 | Wefers | A23B 7/02 219/388 |
| 6,442,866 B2 * | 9/2002 | Wefers | A23L 19/03 34/263 |
| 6,497,276 B2 * | 12/2002 | Clark | F25D 23/12 126/21 A |
| 6,510,946 B2 | 1/2003 | Gutierrez | |
| 6,904,761 B2 | 6/2005 | Rafalovic | |
| 6,971,418 B2 | 12/2005 | De Costa | |
| 7,012,229 B2 * | 3/2006 | Kim | A23L 3/365 165/64 |
| 7,048,136 B2 | 5/2006 | Havens | |
| 7,279,666 B2 * | 10/2007 | Ito | A23L 3/365 219/686 |
| 7,325,409 B2 | 2/2008 | Espinosa | |
| 7,488,919 B2 * | 2/2009 | Gagas | F24C 7/087 219/400 |
| 7,823,626 B2 * | 11/2010 | Mueller | F25D 19/00 165/61 |
| 7,933,733 B2 | 4/2011 | McCoy | |
| 7,987,984 B2 | 8/2011 | Gipson | |
| 8,191,465 B2 * | 6/2012 | Sager | H05B 6/6441 99/332 |
| 8,345,132 B2 | 1/2013 | Stephens | |
| 8,563,059 B2 * | 10/2013 | Luckhardt | A47J 37/00 426/233 |
| 8,669,581 B2 * | 3/2014 | Jung | H01L 33/486 257/99 |
| 8,742,304 B2 * | 6/2014 | Emma | F25D 23/12 219/679 |
| 8,786,412 B2 * | 7/2014 | Ebrom | H04L 67/12 340/12.29 |
| 9,449,208 B2 | 9/2016 | Luk et al. | |
| 9,563,833 B2 | 2/2017 | Swager et al. | |
| 9,958,203 B2 * | 5/2018 | Fu | A61P 31/04 |
| 10,178,873 B2 * | 1/2019 | Durance | A23B 7/148 |
| 10,584,915 B2 * | 3/2020 | Nelson | H01R 39/00 |
| 2003/0024278 A1 | 2/2003 | Berkey | |
| 2003/0070789 A1 * | 4/2003 | Mueller | F25D 19/00 165/61 |
| 2005/0051541 A1 * | 3/2005 | Kim | A23L 5/15 219/686 |
| 2005/0103466 A1 * | 5/2005 | Landry | F25D 23/12 165/61 |
| 2006/0117763 A1 * | 6/2006 | Espinosa | F25D 17/042 62/78 |
| 2007/0158335 A1 * | 7/2007 | Mansbery | F24C 7/082 219/505 |
| 2007/0208456 A1 | 9/2007 | Uland | |

(56) References Cited

U.S. PATENT DOCUMENTS

| | | |
|---|---|---|
| 2007/0234754 A1 | 10/2007 | Fujii et al. |
| 2007/0246453 A1* | 10/2007 | Nam ................ F24C 7/082 |
| | | 219/413 |
| 2008/0006041 A1* | 1/2008 | Nakata ............ F25D 17/042 |
| | | 62/131 |
| 2008/0041233 A1* | 2/2008 | Bunn .............. A47J 31/007 |
| | | 99/281 |
| 2008/0041947 A1* | 2/2008 | Hollister ........... G06Q 10/08 |
| | | 235/385 |
| 2009/0084778 A1* | 4/2009 | Smario ............. F25D 23/12 |
| | | 219/679 |
| 2009/0188911 A1* | 7/2009 | Emma .............. F25D 23/12 |
| | | 219/679 |
| 2010/0084396 A1 | 8/2010 | Wu |
| 2010/0200555 A1* | 8/2010 | Godecker .......... F25B 21/02 |
| | | 219/201 |
| 2010/0213187 A1* | 8/2010 | Bandholz ......... H05B 6/6441 |
| | | 219/506 |
| 2010/0234045 A1 | 9/2010 | Karr |
| 2011/0143000 A1* | 6/2011 | Fiset ............... C12H 1/165 |
| | | 426/248 |
| 2011/0315566 A1 | 12/2011 | Boynton |
| 2012/0034350 A1* | 2/2012 | Gard .............. H05B 6/6411 |
| | | 426/242 |
| 2012/0097667 A1* | 4/2012 | Niklasson ........ H05B 6/682 |
| | | 219/702 |
| 2012/0129358 A1* | 5/2012 | Ogawa .......... H01L 21/67109 |
| | | 438/795 |
| 2012/0199571 A1* | 8/2012 | Brown ............ F24C 15/022 |
| | | 219/401 |
| 2012/0211486 A1* | 8/2012 | Kasai .............. H05B 6/806 |
| | | 219/679 |
| 2012/0267369 A1 | 10/2012 | Duvigneau |
| 2012/0318693 A1 | 12/2012 | Conner |
| 2013/0075389 A1* | 3/2013 | Ashida .......... H01J 37/32192 |
| | | 219/702 |
| 2013/0075390 A1* | 3/2013 | Ashida .......... H01J 37/32302 |
| | | 219/702 |
| 2013/0092032 A1* | 4/2013 | Cafferty ............ F24C 7/08 |
| | | 99/325 |
| 2013/0186887 A1* | 7/2013 | Hallgren ........... H05B 6/68 |
| | | 219/702 |
| 2013/0306627 A1* | 11/2013 | Libman ............ H05B 6/705 |
| | | 219/705 |
| 2013/0320001 A1* | 12/2013 | Kondo ............. B23K 1/0012 |
| | | 219/686 |
| 2013/0330447 A1* | 12/2013 | Holman ............ G07F 9/026 |
| | | 426/231 |
| 2014/0203012 A1* | 7/2014 | Corona ............ H05B 6/6447 |
| | | 219/705 |
| 2014/0246424 A1* | 9/2014 | Shimomura ........ H05B 6/70 |
| | | 219/686 |
| 2014/0248784 A1* | 9/2014 | Hayashi ............ H05B 6/80 |
| | | 438/795 |
| 2014/0251982 A1* | 9/2014 | Emma .............. F25B 29/00 |
| | | 219/679 |
| 2014/0284239 A1 | 9/2014 | Espinosa |
| 2015/0019354 A1* | 1/2015 | Chan ............... A47J 37/00 |
| | | 705/15 |
| 2015/0285513 A1* | 10/2015 | Matarazzi .......... F24C 7/08 |
| | | 99/342 |
| 2015/0289324 A1* | 10/2015 | Rober .............. H05B 6/68 |
| | | 219/711 |
| 2016/0174748 A1* | 6/2016 | Baldwin ........... A47J 36/321 |
| | | 426/231 |
| 2016/0327279 A1* | 11/2016 | Bhogal ............. H05B 1/0263 |
| 2016/0379434 A1* | 12/2016 | Huang ............. G07F 11/00 |
| | | 99/334 |
| 2017/0000292 A1* | 1/2017 | Park ............... H04N 5/2257 |
| 2017/0261213 A1* | 9/2017 | Park ................ F24C 7/085 |
| 2017/0262973 A1 | 9/2017 | Johnston |
| 2017/0263100 A1 | 9/2017 | Johnston |
| 2017/0270474 A1 | 9/2017 | McCoy |
| 2018/0093814 A1 | 5/2018 | Espinosa |
| 2018/0216830 A1* | 8/2018 | Ivanovic ........... F25D 29/005 |

FOREIGN PATENT DOCUMENTS

| | | |
|---|---|---|
| EP | 0405680 A2 | 1/1991 |
| EP | 0440296 A1 | 8/1991 |
| EP | 0545246 A2 | 6/1993 |
| JP | 2000-2479 A1 | 1/2000 |
| JP | 2001-013837 | 1/2001 |
| JP | 2004085004 A | 3/2004 |
| WO | 90/13779 A1 | 11/1990 |
| WO | 96/31746 A1 | 10/1996 |
| WO | 01/71263 A1 | 9/2001 |
| WO | 2005/057103 | 6/2005 |
| WO | 2016/109533 | 12/2014 |
| WO | 2016/109563 | 12/2014 |
| WO | 2018/093814 | 3/2016 |

OTHER PUBLICATIONS

Final Office Action issued in U.S. Appl. No. 13/771,174, dated Mar. 3, 2014, pp. 1-50.
Final Office Action dated Feb. 2, 2011, in U.S. Appl. No. 12/026,870.
Keurig coffee machine, www.keurig.com, p. 1, (2014).

* cited by examiner

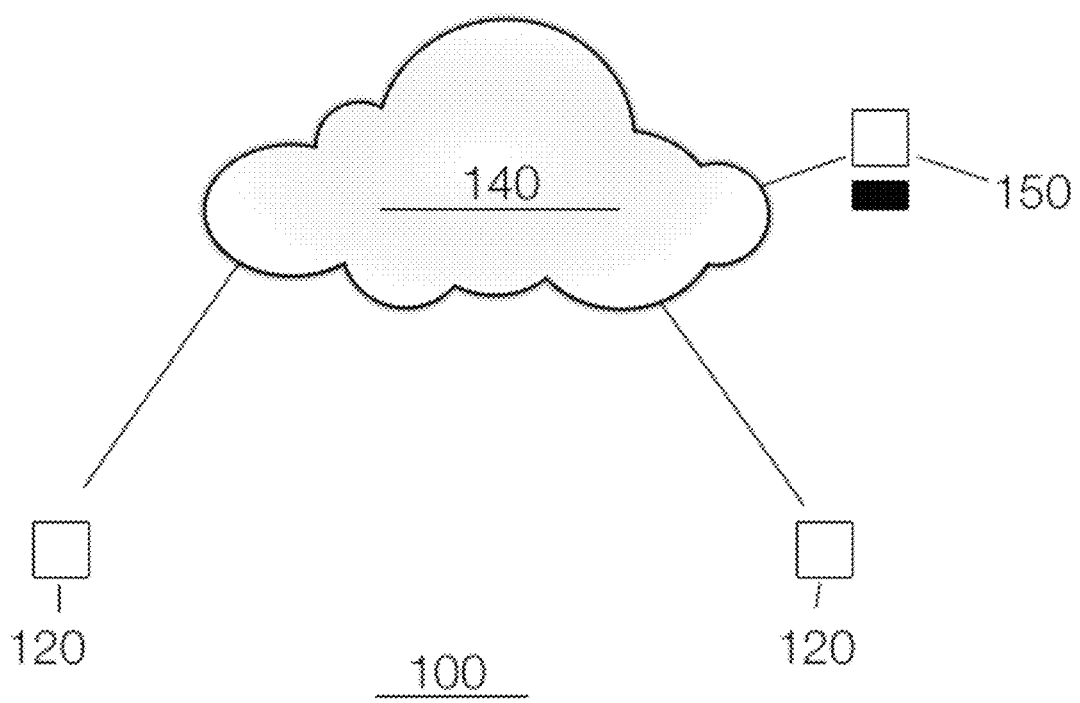

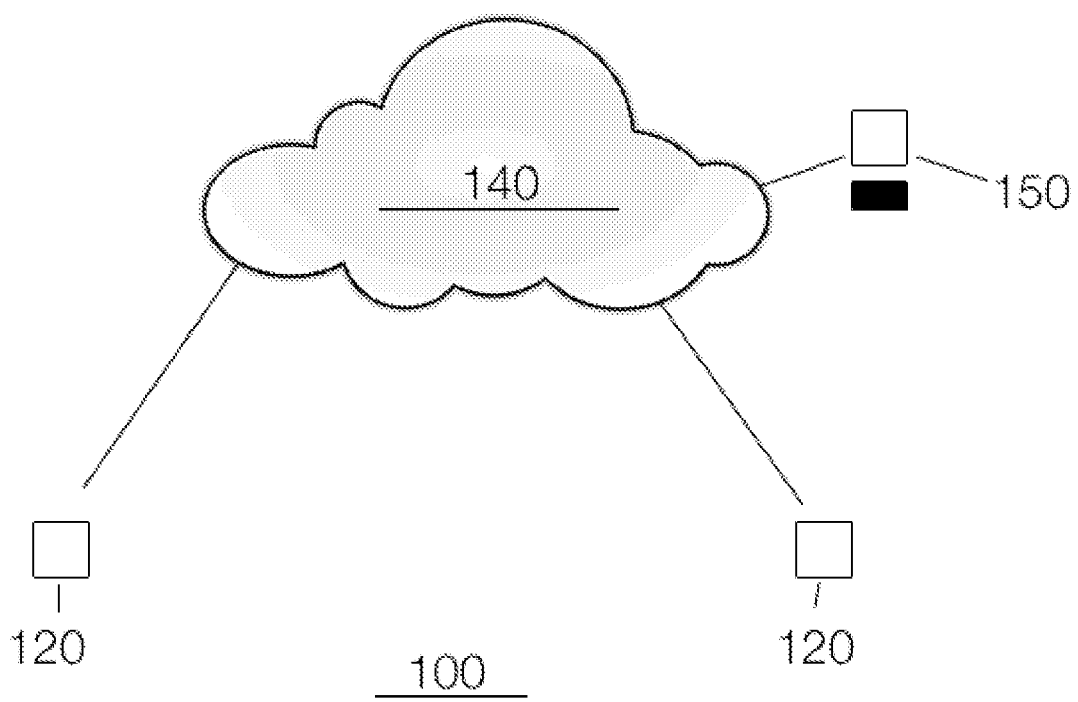

MULTI-FUNCTION COMPACT APPLIANCE AND METHODS FOR A FOOD OR ITEM IN A CONTAINER WITH A CONTAINER STORAGE TECHNOLOGY

This application claims priority to U.S. Provisional Patent Application No. 62/301,757, filed 1 Mar. 2016, the complete disclosure of which is incorporated herein by reference.

FIELD OF THE INVENTION

The present invention relates to secular trends in sustainability and urbanization that include increasing urban populations and food prices, food chain insecurity and resource availability and smaller living spaces. In particular, the present invention discloses storage containers that provide improved use for combined food storage, preservation and preparation for use with compact multi-function appliances designed to preserve, disinfect, prepare and cook food items while minimizing space and energy consumption.

The present invention also relates to a method and system for manufacturing, producing, preparing, packaging, displaying, selling and marketing perishable food or items in a container with a container storage technology for use with select consumer and electronic goods, household or professional appliances and connected user interfaces such as smartphones, wearable devices and other related interfaces.

Also disclosed is a method and system for the use of multiple brand logos or names and communicative indicia on a container or product packaging wherein at least one of the brand logos or names (such as a secondary or tertiary brand logo or name) can be used to represent unique, different or distinct products, services or benefits from the primary brand logo or name. Secondary or tertiary brand logos or names can communicate to consumers either an enhanced, unexpected or unseen use or benefit for a perishable food or item inside a container with container storage technologies, an additional benefit for the storage of a perishable food or item, an additional benefit provided in the stored perishable food or item, the use of a container with container storage technologies or an additional benefit for a select consumer and electronics good, household or professional appliance or user interface for use with the storage, monitoring, disinfecting, preparation or cooking of a perishable food or item or the use of a smart tag, a container or a container storage technology as described herein.

Additionally, a method is disclosed using multiple forms of communicative indicia including smart tags and text on product packaging and containers with container storage technologies or on select consumer goods, household appliances or user interfaces to inform, communicate, read, write, utilize, store, monitor and track perishable food or items or food or items in a container with a container storage technology to immediately and effectively inform consumers of the benefits, uses and advantages associated therewith. Additionally disclosed is the use of smart tags to provide enhanced marketing materials for food or items and means to create consumer engagement with the use of said smart tags, food or items, products, containers, appliances, consumer goods or user interfaces. Also disclosed herein are embodiments for multi-function appliances, containers with container storage technologies and methods for the manufacture of said containers with container storage technologies and appliances.

The vacuum storage technology disclosed in U.S. Pat. No. 7,325,409, issued 5 Feb. 2008, is incorporated herein by reference.

BACKGROUND OF THE INVENTION

Current food, consumer goods and appliance storage and marketing technologies are wasteful and inefficient. Essentially, if a storage technology is difficult or time consuming, every participant in the food, consumer goods and appliance chain (manufacturers, retailers, and consumers) will not properly benefit, access, store and preserve food, consumer good or appliance information and product materials. There is a need for a more efficient, faster and easier to use food, consumer good and appliance technology to maximize marketing efforts and minimize waste to ensure that all participants in the food, consumer good and appliance chain can better receive, understand, store, access and utilize product and marketing materials and better improve and efficiently store perishable food, consumer goods and appliance related materials, among others.

In this regard, it is important that manufacturers and retailers display product packaging to provide the simplest and most effective communication indicia and text possible. This is more important than ever as ageing demographics and trends combined with new product container storage technology developments highlight the need for product packaging clarity and ease of understanding. Additionally, product containers are becoming increasingly more sophisticated incorporating container storage technologies to allow consumers to either use said product containers as conventional storage containers or, if consumers are effectively informed, to use containers, incorporating container storage technologies such as smart tags, with select appliances and consumer goods and to also use select appliances and consumer goods with said containers and container storage technologies. Providing effective communicative indicia and text regarding benefits, uses and advantages of product packaging, containers and container storage technologies is challenging due to the aforementioned technological advances, as well as, to the insecure and limited space provided on a container and on incorporated container storage technologies. For example, many product containers are immediately disposable after opening and do not incorporate a container storage technology.

Container storage technologies are not readily apparent or noticeable on containers or consumer goods making it difficult or impossible to distinguish between a container or a consumer good with a storage container technology and a container without a storage container technology. Additionally, product packaging is often confusing and typically displayed in a crowded retail space creating a consumer product sensory overload experience. Furthermore, retail shopping time is typically stressful, compulsive, limited and performed at the end of a tiring day or during a consumer's free time. A consumer usually does not have sufficient time or focus to read printed text on product containers in addition to analyzing product pricing and best product purchases.

SUMMARY OF THE INVENTION

Objectives of the present invention include providing multi-function compact appliance for use with containers and providing more efficient and simpler to use food, consumer good and appliance technologies and methods for product information and marketing, to reduce food and packaging waste and provide enhanced, improved and more reliable and secure marketing and information to consumers.

Product containers, packaging and container storage technologies impact product effectiveness, desirability and visibility to customers and directly impact revenues derived from product sales. As used herein, a container can be any receptacle and can be a sealable or resealable receptacle or closure for use with a container (such as bottles, bags, Ziploc and Vacu Vin type closures, lids, caps, covers, bricks, pouches, rigid or flexible containers, boxes, bags, receptacles inside a receptacle(s) such as a cereal bag inside a box, a consumer good inside a box or bag and additionally inside any other container, etc.) to hold a perishable food or consumer good item and can also be constructed and designed to contain storage environments such as, but not limited to, gas, vacuum, pressure or vented container environments, as described herein, with said containers not being destroyed by said applications and further for containers and bags incorporating materials to allow them to be treated by and disinfected using a UV light source. Additionally, said containers where applicable are designed for combined use inside an appliance with multi-functions that can include combinations of a microwave oven, induction cooking plate, stove top or plaque, an oven and an appliance compartment and operating systems that can create vacuum, pressure, venting and UV light source environments, individually, in combination or in sequence. Further, said containers can be flexible or compressible to substantially maintain said functions, forms and environments ("container").

A container with a container storage technology can utilize wireless technologies and combinations thereof. Radio frequency identification ("RFID") is a wireless communication technology that can use a contactless integrated circuit ("ic") card or tag. Near field communication ("NFC") is similar in concept to RFID and can also use a contactless ic card or tag. However, NFC differs from RFID because some RFID devices enable communication at a distance of several meters whereas NFC devices have antennas which are brought within about two to four centimeters from each other to communicate. For example, NFC can be used as a wireless technology to allow devices to wirelessly communicate with one another over close proximities. Typical distances can be several centimeters and communicating can also include waving or physical contact such as knocking or tapping. Current NFC communication can include contactless transactions and data exchange, among others. NFC is a short range wireless connectivity technology that can also allow the exchange of various types of information, such as text, numbers, pictures, MP3 files or digital authorizations between two NFC enabled devices that can include smartphones, appliances, containers and such as between a smartphone and a compatible smart card or reader that are in close proximity. Li-Fi (Light Fidelity) is a bidirectional high speed and fully networked wireless communication technology similar to Wi-Fi which can also be incorporated into appliances and devices by incorporating Li-Fi enabling software and hardware into an appliance as discussed herein. It is wireless and uses visible light communication or infra-red and near ultraviolet (instead of radio frequency waves) spectrum, part of optical wireless communications technology.

A feature of NFC communication (as with related RFID) can include passive communication capabilities. Passive communication can consist of an active "interrogator" device (a "reader" device) that transmits a signal that is inductively harvested to power the passive interrogated device (the "client" or "tag"). The transmitted signal can also include a constant wave ("cw") portion. The tag can respond to the interrogator by reflecting back a modulated version of the cw portion of the transmitted signal. Passive communication enables communication with otherwise unpowered tag devices for applications for example with inventory management.

The technologies disclosed herein for use with a container with a container storage technology, as well as with appliances, can include a wireless device and use with a wired and wireless device. In one embodiment, the wireless device can include: a power supply; an NFC or wireless interface configured to harvest energy radiated from an external interrogator device and to receive configuration data without receiving power from the power supply; a memory structure configured to store the received configuration data; a processor; and a non-transitory computer readable medium. In one application, the non-transitory computer readable medium includes one or more instructions configured to, when executed by the processor, cause the wireless device to retrieve the received configuration data from the memory structure, and configure the wireless device based on the received configuration data.

In another embodiment, the wireless device can include: a power supply; an nfc or wireless interface configured to utilize energy radiated from an external interrogator device, and to transmit one or more backup data without receiving power from the power supply; a memory structure configured to store the one or more backup data; a processor; and a non-transitory computer readable medium. In one application, the non-transitory computer readable medium can include one or more instructions configured to, when executed by the processor, cause the device to update the one or more backup data stored within the memory structure.

In another embodiment, backup data can comprise one or more of: user data, marketing material, product information, technology information, container and appliance applications and information or any other information described herein including contact data, device specific data and network configuration data. In certain situations, the one or more backup data can be encrypted. In another embodiment, the memory structure can comprise a removable or non-removable secure or non-secure element. Furthermore, wireless and similar enabled consumer goods and appliances herein can function as either an initiator or target depending upon the user desired functionality and application.

Smartphones, appliances, containers, tablet terminals and other user interfaces can be equipped with NFC and wireless modules. NFC and wireless can operate using both passive communication and active communication. In passive communication, a reader/writer communicates with a contactless ic card or tag without a power source. In active communication, two devices both incorporating power sources communicate with each other by alternately acting as an initiator and a target.

An NFC enabled device can use a reader/writer function to read contactless ic cards. With NFC, an NFC antenna of one of the devices is required to be brought within the communicable distance of an NFC antenna of the other device. However, with NFC it is possible to access a contactless ic card or tag having no power source to read or write data and it is only necessary to bring the devices in close proximity to start or finish communication or exchange. This application therefore allows for the use of containers, smartphones, consumer goods, appliances, electronic devices and user interfaces to perform transactions and exchanges with, for example, containers, smartphones, consumer and electronic devices and goods and appliances.

NFC and wireless technologies can allow a single consumer or electronic device, appliance, user interface or container to operate in more than one mode. For example, a smartphone can be capable of functioning (a) in the card emulation mode to facilitate a credit or debit card transaction; and (b) in reader mode, to facilitate reading a container or other smart tags or other compatible and similar devices. Furthermore, it is possible for the technologies described herein to be capable of peer to peer information exchange.

As used herein, a container storage technology can include any technology that communicates, interacts, tracks, monitors, benefits or enhances the use, access, understanding, storage or appearance of a perishable food, user interface consumer or electronic device, good or appliance which can also be in a container such as, but not limited to, wireless technologies that can include Li-Fi, RFID, NFC and RFID tag and ic card, an NFC tag and ic card (active, passive, hybrid or battery assisted passive tags), a machine-readable code such as a QR code that can consist of an array of black and white squares and can store data such as URLs or other information that can be read by a camera on a smartphone, bar codes that can be read by RF and bar code devices, thin film labels and applications with sensors and sensors in communication with wireless technologies such as Li-Fi interfaces and RFID, NFC and Hybrid tags ("smart tags"), semiconductors, circuits, chip resistors, thin film chip resistors and networks, high power attenuator chips, ferroelectric memory, thin film, thin film transistors, thin film addressable memory, electronic temperature and other-sensing labels as described herein including real-time sensing capabilities, electronic sensor circuits, plastic semiconductors, metal oxide and organic semiconductors, analog-to-digital converters, single or multiple one-way valves, a one-way valve sealed or covered with an adhesive, film, plastic or material to prevent matter from entering said valve or container, vacuum seals and sensors incorporated into containers or container lids such sensors can detect various gases inside a container such as aldehyde or acetic acids, Sulphur compounds or alcohol to monitor the status and condition of said foods and provide said information and data wirelessly to an appliance control system, covers or caps ("covers") to close and seal the aperture of a container that can incorporate sensing technologies, flexible or deformable container covers, adhesive films that incorporate one-way valves to seal container openings or apertures, sensors that can monitor temperature, vacuum, humidity, time, container density, acidity levels and gases, which can include, but are not limited to, ethylene, oxygen, $CO_2$, $NH_3$, $H_2$, $H_2S$, $O_2$, $N_2$ and $SO_2$, a film, foil, plastic or other suitable food storage material to cover the aperture of a container and the aforementioned technologies can connect or communicate via wireless methods of transferring data between two or more electronic devices in communication, such as Li-Fi, Wi-Fi, Bluetooth, etc., and incorporate internet and cloud computing technologies which can involve deployed groups of remote servers and software networks to allow centralized data storage and online access to computer services or resources, and other similar technologies described herein and complementary combinations of said technologies. Additionally, the appliances, consumer goods, user interfaces and devices as described herein can also include the aforementioned wireless capabilities. Furthermore, any of said technologies, for example thin film labels and smart tags, can be connected and in communication or attached directly or indirectly to food items, consumer or electronic devices or goods, containers or caps/covers and to professional and household appliances, whether or not in a container with all of the aforementioned as disclosed herein and referred to as "technology" or "technologies".

Furthermore, container technologies can be configured to connect to or communicate with each other where applicable as well as to appliances, user interfaces, consumer goods and devices using wireless systems such as smart tag readers, Li-Fi, Wi-Fi, cloud computing or Bluetooth, among others. For example, smart tags and sensors can be connected or in communication with each other to communicate with smart tag readers in consumer or electronic devices, user interfaces or goods and appliances and with appliances, consumer or electronic devices and for example such as appliance, consumer or electronic device or user interface operating systems as described herein.

Product packaging, information and marketing materials as used herein can include any communicative indicia such as icons, abbreviated text, symbols, shapes, colors, forms, or text, in various size and contrast, that can be digitally, physically, in combination or by any other means connected to, incorporated, read, written, attached or associated with said perishable food, consumer good or appliance, smart tags, URLs or other wired, wireless, cloud, web or internet data, containers, container storage technologies, consumer goods, electronics, devices, user interfaces or appliances, including email and web site addresses, telephone numbers or any other digital or social media information. Product information can include technical and specification data and financial, legal and operating information, data and documents such as warranty, technical and operating manuals and technologies, products and services that are similar, compatible or incompatible or disparate, as well as, any other materials disclosed herein. Product marketing materials can include smart tags, readers, URLs, price, product, place, promotions, marketing collateral, coupons, promotional materials, recipes, menus, movies, music, sales, visual and auditory materials, discounts, brochures and other printed product information, visual aids used in sales presentations, web content, sales and demonstration scripts, product data sheets and white papers as well as any other materials disclosed herein and can further include food or items nutritional content and daily consumption requirements, allergic and health warnings and medical information to address food or item allergens or health reactions as well as genetically modified foods and organisms (GMO) used in foods or food production, non-GMO items, explanations and related information to access product and issue related information such as medical and emergency assistance contact information and basic medical, health and emergency response suggestions (all of the aforementioned "product packaging" or "packaging" or "marketing").

Consumer or electronic devices, user interfaces and goods or household and professional appliances can include any user interface such as mobile and smartphones, tablets, lap tops, computers, glasses, watches, connected or wireless wearables, devices and clothing, devices and wristbands, printers, cameras, micro-processors that can include use with an appliance, consumer goods, user interface and device operating systems and any other similar electronic device and appliance operating systems can include functions and modes that include microwave oven, induction cook top, UV light systems, ionizing radiation, irradiation, pulsed UV light, excimer lamp technologies, continuous UV low-pressure, medium pressure mercury lamps, UV-C light (any of these technologies can be incorporated as a single mode or combination mode in an appliance and can be controlled by an appliance controller, another or external appliance, a container or smartphone, mobile or remote application to function with the other or external appliance functions and modes disclosed herein), ovens, stoves, refrigerators, freezers, washer/dryers and container vacuum systems, such as, drawers, storage closets, compartments, modular units, portable, handheld or container vacuum storage devices or systems, or any related type products, which can be smart tag reader enabled, and can combine, connect and communicate with other technologies in any complementary or compatible combination as described herein and combinations of the aforementioned appliances as described herein ("appliance").

As used herein a one-way valve is a valve that allows air or a gas to flow through an opening in a valve in only one direction and said valve can have a cracking pressure which is the minimum upstream pressure at which the valve will operate to allow a valve to be designed for a predetermined cracking pressure to store a specific perishable food or item. For example, a container can include several valves each with a closing mechanism and each valve with a unique cracking pressure in order to select a valve and vacuum environment most appropriate to store a certain perishable food or item. A one-way valve can be used to create a vacuum or a pressurized environment inside a container as described herein. As used herein a seal can be any device or material that is used to close off or fasten an aperture, opening or connection, especially to prevent the escape of a liquid or gas or environment from inside a container using a container, closure device or cover, lid, etc., and can include a flat spherical, ball shaped or any other type or shaped mechanism. A seal can also allow containers to be vented when not sealed closed. A seal can be used a two way valve. As used herein, and where compatible in the various disclosed embodiments and disclosure, a one-way valve can be used in place of seal and a seal can be used in place of a one-way valve.

For example, a spice container can now incorporate a smart tag, a sensor and an adhesive film to seal the exterior opening of a one-way valve to allow said container to be vacuum sealed post-purchase using an appliance and may also require refrigeration. The container provides very limited surface area to effectively transmit a text message regarding the incorporated technologies, use requirements, benefits and to highlight said technologies. Furthermore, product containers conceal sensors and smart tags the latter which consumers associate with theft prevention. Additionally, a few containers that use one-way valves store products that release gases so the one-way valves must be left uncovered. Currently, there are no products on the market that incorporate multiple one-way valves, cap or cover sensors to determine if a product has been opened or compromised and incorporating flat seals or one-way valves or to monitor the status and quality of the food item via the level of gases inside said container (sensors can be located externally or internally of said container), adhesive, film, plastic or material to seal or cover the opening of a one-way valve or one-way valve seals that can be incorporated into a container or a cover for said container or a flexible or deformable cover to allow a vacuum environment to be created inside a container. A one-way valve is also very difficult to identify and locate on a container for apparent reasons. A sensor located in a container cover or open close aperture structure or inside a container cannot be identified. Consumer confusion is created by the presence of these technologies associated with a product purchase decision especially when a consumer cannot readily identify said technologies or understand the possible benefits, usages, applications and complementary product availability that can include use with an appliance.

Some products have well known functionalities, technologies and benefits associated with them. For example, a storage container and a refrigerator are designed to perform specific functions with expected benefits and results. However, in addition to considering primary (well-known) advantages associated with a product, a consumer will also consider secondary or tertiary product benefits such as technologies, functionalities and benefits that are not normally associated, apparent or evident with a product unless a consumer is effectively informed. Generally, a consumer will consider primary and other obvious benefits of a product when making a product purchase. However, packaging for a more complicated consumer item such as a product including a perishable food or item inside a sealable container with multiple container storage technologies that can be utilized in and with numerous appliances such as a smartphone, smart refrigerator or smart multi-function appliance requires a substantial amount of text space to convey effective primary, secondary or tertiary benefits, use requirements and benefits to a consumer. Furthermore, printed text is distracting to the overall visual effect of the packaging and usually conveys a generic message that does not separate or adequately explain the product in the retail space and time which then diminishes the overall impact of the product packaging with the consumer.

Therefore, there exists the need for a method and system for the manufacture and product process of preparing, packaging, displaying, selling and marketing perishable food or items in a container with container storage technologies for use with appliances and consumer goods, a method and system to provide consumers with product packaging that includes container storage technologies including smart tags, sensors, communicative indicia or text also using smart tags to effectively and immediately communicate specific primary, secondary or tertiary benefits such as benefits regarding storage technologies, usages, interaction and communication, advantages, product availability and complementary usage with appliances and consumer goods to consumers using minimal surface area on said container or product packaging and a method and system to provide consumers product packaging information regarding appliances and consumer goods to effectively and immediately communicate specific primary, secondary or tertiary benefits of using an appliance and consumer good with select containers that incorporate container storage technologies for perishable food or items. Also disclosed herein are embodiments for an appliance and for containers with container storage technologies and methods for the manufacture of said containers.

Furthermore, the average consumer has preconceptions regarding the benefits of a product based on the brand of said product. Therefore, a method can also include the use of a brand logo or name of a product or products which are the same, complementary, distinct or different from the primary product. These secondary or tertiary brand logos or names can include, for example, appliances and consumer goods or generic types or categories of appliances and technologies and can utilize a primary brand logo or name product or type of appliance or technology, such as a perishable food or item in a container with a container storage technology, but which are distinct, different and not readily associated with or from the primary brand logo or name. It can be advantageous to associate the benefits of a different type of product to highlight existing benefits or to showcase new benefits not readily apparent from the primary brand product such as referring or associating to an appliance such as a smartphone, a smart refrigerator, a smart multi-function appliance or a container vacuum storage system to showcase the benefits of a perishable food or item in a container with smart tags or by referring or associating to a vacuum storage system to showcase the benefits of a perishable food or item in a one-way valve container which may also include a smart tag. This also can apply to containers and bags that can be used inside a UV light source appliance where said food items and containers and bags can be disinfected inside said system, as well as any other items placed therein. A container or bag can be open or sealed close and can also incorporate materials in the container construction to allow UV light to pass through said materials to disinfect the contents, in one example. Single or multiple primary, secondary or tertiary (or additional logos or names) brand logos or names can be used. Each brand logo or name can also provide an association which can include but is not limited to an unexpected, unseen or unknown benefit from one brand logo or name to the next. Examples of brand logos or names that can be used or associated via any communicative indicia or text including smart tags can include appliances, perishable food or items which can also be in a container with container storage technologies, manufacturers or distributors of containers, container storage technologies, smart tag and sensor technologies or food or service or distribution providers such as food and service providers and distributors that can include cloud computing, internet services, on-line shopping services, appliance and smartphone companies or services and applications, companies digitizing food, recipes and the food chain, grocery and, convenience stores, supermarkets or consumer and electronics goods or services stores.

For example, a user can view a product container in a retail space with a primary brand logo or name which immediately informs the user of an expected quality of said perishable food or item therein. The user then views single or multiple secondary or tertiary brand logos or names on the container which can reinforce the primary brand logo by association and the consumer is also immediately informed that the container has a plurality of other unseen or non-obvious benefits such as it is reusable and resealable, incorporates smart tags which can include product information and food safety data, food expiration date sensors, a one-way valve with an adhesive, plastic or film cover or incorporates a vacuum or venting seal mechanism in the cover, a cap/cover or container sensor for food expiration and microbial status regarding gas levels among others or notifications or food safety and security concerning whether a container has been opened or tampered with or has a flexible or deformable plastic or metal screwtop or cover to allow for venting or for a vacuum environment to be created therein, incorporates multiple one-way valves to allow product venting or incorporates smart tags and sensors so that the container and contents can provide food and safety and expiration date data, marketing materials and information, can interact, communicate food status and general information and be monitored and tracked and, additionally, can inform a consumer that additional products are available and that similar products with similar type benefits are available and where said products are available for purchase.

Furthermore, secondary and tertiary brand logos or names add to the perceived quality of the primary brand logo, and vice versa, due to consumer perception that the primary brand logo or name product has been and can be effectively stored and monitored thereby providing extended shelf-life or notice of a product expiring or its expiration date in addition to the value of the secondary and tertiary brand logo or name serving as a compatible product, sponsor, partner, promoter or being of a like or similar quality product to the primary brand logo or name product. This perception can be established in any combination of use of the brand logos and names. Substantial added value can be provided to consumers and to the primary, secondary or tertiary brand logos or names via the aforementioned associations and relationships.

Container packaging can provide other benefits such as highlighting technologies that are incorporated into a container to effectively and immediately inform consumers of said technologies and to identify their location on a product by labeling each technology using any communicative indicia or text, such as icons, forms or shapes to identify said technologies or by use of readily discernible colors or markings to indicate the presence of said technologies with colored plastic or adhesive seals to cover or seal the openings of one-way valves or seals, text, linear or hashed markings for tearing a package at an identified location to expose a one-way valve or seal and also the use of associated informational text or colored exposed smart tags, each of which can relate to and associate with a primary, secondary or tertiary brand logo or name or generic icons or other communicative indicia. Furthermore, said technologies can be associated with the secondary or tertiary brand logos or names or other generic communicative indicia.

A brief product or technology benefit descriptor or description can be used to explain technologies, uses and benefits provided by both a container and generic or secondary or tertiary brand logos or names which can use other communicative indicia to associate a primary brand logo or name, container and container storage technologies and secondary or tertiary brand logos or names together or in any combination thereof. Additionally, brand logos and names can include, but are not limited to, the manufacturer or third party of the following and benefits of a container, smart tags and sensors, adhesive film and thin films, one-way valves to cover and seal container apertures, vacuum seals inside container covers, one-way valves, internal and external container sensors and any technology combinations described herein. It should be noted that generic, primary, secondary or tertiary brand logos or names can include and combine any of the aforementioned and in any order or combination. Containers for use with an appliance without a food item stored inside can also use this method such that the primary brand name or logo can refer to the container manufacturer or any of the other groups disclosed herein as well as the secondary and tertiary brand logos or names and generic names. Furthermore, brand logos and names can be companies, groups or associations under common or independent control.

Furthermore, consumers in a retail space generally compare product offerings and benefits. A consumer can consider one product to determine offered advantages and benefits and then compare other product offerings and availability to the initial product to compare other, similar, different or same product brand offerings, benefits and advantages. A consumer may also desire or require more product information or information regarding other associated products prior to making a purchase and the secondary or tertiary brand logos and names may provide the information the consumer needs to make a product purchase decision. A generic, secondary or tertiary brand logo or name can immediately inform a consumer that same or other similar type products are available and that additional information can be obtained regarding product benefits and uses. Furthermore, generic icons, symbols or any other marketing materials disclosed herein can be used in combination with brand logos and names to represent for example smartphones, smart tags, sensors, user interfaces, appliances, consumer goods and electronic devices and can be incorporated into any of the marketing materials and examples provided herein and in any combination. For example, a combined primary, secondary or tertiary brand logo or name descriptor can include the following using any communicative indicia or text to form a benefits descriptor and association and in any combination hereof or as disclosed herein:
[primary brand logo or name, icon, generic]
[combined description of association or inter-relation, icon]
[secondary brand logo or name]
or
[tertiary brand logo or name]
or;
[primary brand logo or name, icon]
[combined description of association or inter-relation]
[secondary brand logo or name]
[combined description of association or inter-relation]
[tertiary brand logo or name, icon, generic]
or;
[primary brand logo or name]
[secondary brand logo or name, generic]
or
[tertiary brand logo or name, icon]
[combined description of association or inter-relation]
For example, product packaging can include a primary brand logo or name which includes a perishable food or item in a container with container storage technologies and a secondary or tertiary brand logo or name or icon for any of the following: a select smartphone, smart tag, sensor, user interface, appliance, consumer or electronics good, a perishable food or item, a container storage technology, a container, a grocery store, food distribution or service company that can include also internet, cloud or product providers and any others disclosed herein. The logo and brand name for an appliance or storage technology immediately informs a consumer that there are additional non-obvious or unseen benefits associated with a perishable food or item, container and container storage technologies and a logo for a food distribution channel such as a store or supermarket, immediately informs a consumer of same or other similar type product availability and furthermore that this information can also be located, read, downloaded or accessed in whole, part or additionally provided via a smart tag on a container, appliance, consumer good, user interface or electronic device and accessed with an appliance, user interface or consumer good that is smart tag reader enabled. This is applicable to all the disclosure and examples provided herein.
[primary brand logo or name]
[secondary brand logo or name, icon]
or
[tertiary brand logo or name, generic]
Another example includes an appliance or consumer good with a primary brand logo or name attached to it with secondary or tertiary brand logos or names attached to said appliance or consumer or electronics good, user interface or device for perishable food or items in a container with container storage technologies or a brand logo or name for a food, storage technology or container manufacturer or food distribution store or goods or service provider. A secondary or tertiary brand logo or name immediately informs a consumer that other unseen or unexpected benefits are associated with said appliance for example via a smart tag or that can include improved appliance storage systems for a perishable food or item in a container with a container storage technology, availability of similar perishable food or items in a container with container storage technologies that can be used with said appliance or consumer goods and, further, that said logo or brand name for a perishable food or item, storage technology, container or food distribution store or service provider immediately informs a consumer of said product availability and availability of other similar type products.

Furthermore, additional benefits include container storage technologies that are highlighted and placed into a standard format presentation on a container, product packaging or marketing materials. Containers can incorporate single or multiple container storage technologies. However, a consumer cannot easily identify these container storage technologies because they are not readily apparent or visible and are confusing, therefore, a consumer does not know if a product benefit is offered or not and does not realize comparative product advantages. More importantly, a consumer does not know how or what is required to benefit from these container storage technologies. To date most consumers do not realize the benefits or advantages of smart tag technologies. In addition, consumers may not readily understand why a product incorporates a one-way valve with an adhesive, film or plastic cover sealing said one-way valve. Most consumers would not understand the associated benefits of such technologies. For example, RFID tags are concealed on product containers and consumers associate them with product theft prevention. An adhesive, film or plastic that covers the openings of single or multiple one-way valves or seals on a container may be confusing and also difficult to identify on a container. A container cover with a vacuum seal incorporated inside said cover is not apparent to a consumer. A flexible or deformable plastic or metal screwtop or cover to create a vacuum environment inside a container is also not readily identifiable. Furthermore, technologies such as an adhesive, film or plastic that covers a one-way valve on a container and requires removal from said one-way valve prior to creating a vacuum environment inside said container using an appliance will need to be explained, emphasized and highlighted so that consumers are made aware of said product container benefits and advantages. For example, RFID tags, one-way valves and associated adhesive, seals, film or plastic that covers the opening of a one-way valve and seals can be made visible and highlighted in a manner so that these technologies are immediately noticeable, recognizable and understood by a consumer by use of markings, highlighting or emphasizing said technologies with colors, text, icons or any other communicative indicia or text, or any combinations thereof, so that consumers immediately recognize said technologies and related benefits.

A container, product packaging and marketing materials can include a specification, technical, benefits and advantages descriptor line or section which states, lists or describes a container storage technology used with said product and container followed by a benefits or advantages section which states, lists or describes the benefits offered by the product and container and how said product and container can be used post purchase with an appliance such as a smartphone, user interface or smart refrigerator or appliance, container vacuum system, freezer, etc. Additionally, icons or other communicative indicia and text can be used to represent the container storage technologies, benefits and advantages, for example, smart tags such as NFC and RFID tags, one-way valves, smart refrigerators and appliance, smartphones, container vacuum systems and combinations thereof. This method can allow a consumer to view a product, container and container storage technology and product packaging and be immediately informed regarding the product's and container's benefits, such as, functionalities, technologies and advantages and to inform a consumer which appliances or consumer goods can utilize said product and container storage technologies. Also, by using a standard section or informational format on a product, container, product packaging or marketing material a consumer can quickly and easily find this information on any product, brand, container or product packaging to efficiently and quickly obtain product and container technology information and information regarding which brands, products or appliances are capable of using said technologies and be informed regarding said product availability. Examples of container informational benefits sections can include any combination of the technologies disclosed herein and are not limited to:

container technology: RFID tag, NFC tag, sensor, [product name], icon
benefits: monitor and track food
advantages: use with smart refrigerator, appliance, smartphone
container specification: one-way valve, RFID tag, smart tag
benefits: resealable vacuum container, monitor and track food
use with: smart refrigerator, vacuum system, [product logo], icon
container technology: smart tag, sensor, icon, generic, one-way valve
container use: smart refrigerator, vacuum system, smartphone, icon,
Food advisory: GMO, Allergens, Health warnings, Nutritional content
Food notice: Organic, GMO, Allergens, Food reactions, Medical suggestions A container, appliance or consumer good, user interface or electrical device as described herein can also include on marketing materials attached, related or associated with said items any communicative indicia to indicate the technologies that are compatible with said item. For example a generic, icon, brand logo or name can be placed on a container and then serially, randomly or via design or pattern icons, or any other symbolic or generic depiction, can be placed or positioned to represent compatible technologies capable of interacting or exchanging information or data. Furthermore, this can also include only the use of brand logos and names or generic icons or any combinations thereof as described herein. For example:

[brand logo or name] [icon: smartphone] [icon: appliance] [icon: tablet]; or
[brand logo or name] [brand logo or name as icon] [generic]; or
[icon: smartphone] [icon: appliance] [icon: tablet]; or
[brand logo or name] [icon: smartphone] [icon: appliance] [icon: tablet]; or
[icon: smartphone] [GMO] [icon: GMO] [icon: Nutritional value] [icon: Health warning];
or
[icon: smartphone] [GMO] [icon: GMO] [icon: Food allergens] [icon: Medical assistance]; or A technology benefits description or descriptor can also be provided. This information can be provided in any format or combination and can be referred to, placed or attached in any location on a container, product packaging, container storage technology such as on a smart tag (RFID, NFC or hybrid—smart tags) to be read with a smartphone or other device or marketing materials by using any combination of communicative indicia, text, icons or brand logos or names. This format can also be used in any combination with any of the other methods and disclosure described herein.

Furthermore, any of the materials disclosed herein including marketing and product information can be physically and graphically incorporated or attached to containers or marketing materials with the same information or combinations thereof written and incorporated into or onto smart tags attached to a container or vice versa as previously described herein and connected in or in communication with cloud, internet, WIFI or LIFI applications, information or services.

However, when a consumer engages with a container, appliance, consumer or electronic device or good with a smart tag, for example highlighted in the form of a smartphone icon (or any form as disclosed herein) the consumer, whether familiar or not familiar with said technologies, has no indication or idea of the type of information contained or incorporated into said smart tag and what information can possibly be accessed using a smartphone. Therefore, to create a meaningful consumer engagement with a product, brand, company and consumer or electronic goods or devices and smart tag readers and technologies and to create a value proposition and meaningful experience for all participants a method and system is necessary to provide adequate and sufficient information to allow consumers to purposefully engage with that product and smart tag.

Marketing materials, as described herein, for example on a container, can incorporate a system of icons, colors, shapes, letters, numerals, forms, etc. (or any other marketing materials as described herein) to indicate the presence and location of a smart tag on a container, consumer or electronic good or appliance and also the type of marketing materials and information that are incorporated into a smart tag. For example, a container can incorporate a system and method situated or positioned on a container and serially aligned using an icon for a smart phone to indicate the presence and location of a smart tag on a container or item to further indicate and convey to a consumer the expectation of said container and its application.

For example, a letter "C" (coupons) on a container can inform a consumer that by tapping or waving the smart tag with a smartphone or user interface reader on a container a consumer can receive or access product, coupons or promotional materials in the form of sales, discounts, etc. Other icons or forms to indicate smart tag content can include letters or numbers to include a circle or any other shape or form such as a generic smartphone icon, combinations, such as an "i" or "iP" to indicate general product information or info: product, an "L" or "iL" to indicate legal data, materials or documents such as warranty, disclaimer, return and terms of use information for products or info: legal, a "T" or "iT" for technical information, system or requirements or info: technical, a "S" or "iS" for product specification and information or info: product, a "VGM" or "iVGM" for videos, games or music or info: videos, games, music, an "N" or "iN" for new product releases for use with said item or other systems or info: new release or an "A" or "iA" to indicate product accessories, add-ons and compatible systems or info: accessories, or "Fa" for food advisory information which can include GMO information, food allergens, medical suggestions and other health related information.

Additionally, the same type of method can be used to indicate the different types of data or media materials that a consumer can access, retrieve or read on a container smart tag via a smartphone, user interface or appliance. For example an icon, or any other form or combination of communicative indicia, such as "Mt" can indicate media: text, "Mv" can indicate media: video, "Mu" can indicate media: url, "Mp" can indicate media: photos, "Cc" can indicate cloud or internet connected and "Mm" can indicate media: mp3, "App" can indicate accessing or requiring a user application to access information and any other media or combinations thereof.

This type of system and method will encourage consumer engagement with products via a smart tag by better informing a consumer regarding a product engagement or transaction decision by providing consumer expectations and making the engagement and transaction purposeful and meaningful.

Additionally disclosed is a method and system for time and date stamping an opened container with a smartphone, appliance and consumer good or electronic device. An appliance smart tag reader can read a container with an RFID tag for example when it is placed inside an appliance such as a smart refrigerator or appliance. However, many items initially placed inside a refrigerator or storage system are not opened but are placed inside the refrigerator, for example, to be better preserved in a cool environment. This can be helpful for product inventory management purposes; however, it is more important for a consumer to know when a container has been opened to monitor the container and product expiration date after opening. An RFID enabled refrigerator can read and communicate with multiple smart tag containers placed into a refrigerator. An NFC enabled refrigerator can read and write one NFC tagged container at a time when the container/product is placed in close proximity to the reader. The advantage to this method it that it does not require a user to place an unopened NFC tagged container into reading distance of an NFC reader. However, when a container is opened a user can place the product/container and NFC tag within reading or writing distance of the NFC appliance reader so the appliance reader can print the time and date and any other relevant or application information onto the NFC tag and appliance operating system for the consumer to more effectively monitor and track the product expiration date and the amount of time an opened container is stored inside an appliance. Additionally, an unopened container/product with an NFC tag can be initially read into an appliance refrigerator inventory when the NFC reader when placed into an appliance and when the container is opened a user can place the container/product and NFC tag in proximity for the NFC reader/writer to print/write the time and date onto the product/container tag or to share said data with an appliance NFC reader and operating system to store the open and expiration data information and to provide relevant notifications either via the appliance, appliance control system or a mobile application. This system and method can either be used to record a container open time and date status or to record an initial unopen storage status time and date for inventory storage management purposes and to record a container open time and date storage status to monitor expiration date status for specific appliance functions and operations—refrigeration, vacuum, venting, etc. This system can also include combination RFID/NFC/Hybrid container tag functionalities. Additionally, after an opened container is recorded, written or read as "open" by the refrigerator operating system the system can be programmed to send expiration date notice emails to a smartphone or other device to indicate selectable or programmed time durations a container has been inside a refrigerator, appliance or vacuum system. This system also functions for container sensors disclosed herein where said sensors connect to and communicate with a smart tag to transmit food and safety expiration date information as described herein. Further, said product information can be posted on a refrigerator display system for a user to read and monitor the expiration date of items in an appliance. This allows a smart tag container to be configured to allow a consumer to use a time and date stamp function as described herein on the container/product for inventory management and expiration storage date purposes. Furthermore, this application and method can be disclosed, incorporated and marketed on a container, product or storage technology in the form of an icon or any other marketing materials or communicative indicia as described herein to inform a consumer of the added benefits of the attached smart tag, container and product and interactive appliance-container monitoring. An application can also be written for use with smartphones, appliances and user interfaces.

Disclosed is an embodiment for a lid or cover ("cover") for a container, see FIG. 23, for example, a wine bottle. A first cover can attach to a container for example via threading to seal said container so that when the first cover is threaded onto the container an airtight seal in created, sealing the container so the contents or environments created therein cannot escape or release from the container. The first cover includes an aperture to allow gas or air to pass into or out of the container that the cover attaches to. On top of the first cover is a second attachable cover that can attach via threading, pressure or a push-fit seal functionality with said second cover and threading designed to seal the first cover and bottle when moved into a close position and to breathe or allow gases or air to pass into or out of a bottle when moved into an open position. The first cover can have a circular threaded ring positioned on top of the first cover smaller in circumference than the circumference of the first cover to which the second cover can threadably attach. When the second cover is threaded onto the first cover into a closed position the aperture in the first cover is closed to the admittance of gases into or out of a container. A one-way valve or a seal mechanism can be placed into the aperture of the first cover so that the second cover can seal it in a closed or open position when the second cover is moved to an open or close position. In this way, a first cover can be removed from a container to pour the contents and then be replaced onto the bottle and placed into a closed position to seal the bottle. To create a vacuum environment inside the container, for example via a vacuum compartment, the second cover can be moved into an open position without being removed on top of the first cover to allow air or gases to be removed from inside the container as described herein. The second cover can then be moved back into a close position to fully seal the container with a vacuum environment. The second cover can also attach via a hinge mechanism. Furthermore, in another embodiment, see FIG. 24, a sealable cover can include a spherical aperture cylindrical opening with an aperture at the bottom of the base of the cover. A spherical tube can threadably or push-fit into the spherical cylindrical opening so that the end when threaded or pushed in sits above the aperture at the bottom of the base of the cover. The spherical tube can include an air channel that runs vertically up and down the tube. Further, the tube can have an aperture at both ends and be hollow to allow air or gases to flow through the tube. The top end of the tube can include a one-way valve. The other end can include a spherical seal. When the tube is placed inside the opening of the cover so that the air channel is blocked the one-way valve will function to allow air or gases into or out of a container via a tube. When the tube is disposed in the cover but allows air into the air channel air will pass into or out of the container via a seal placed at the bottom of the tube but on top of the container cover aperture. When the tube is disposed completely inside the cover the tube air channel is closed and the tube pushes down on top of the seal and closes and locks the container, the seal and the one-way valve. In this way an environment can be created inside a container using either a one-way valve or flat seal and can seal and lock a container closed. This also allows for easy replacement of a malfunctioning one-way valve or flat seal in a container or cover. In another embodiment, see FIG. 25, of the above disclosure, the hollow tube does not incorporate a one-way valve. The threadable hollow or breathable tube can be tightened over a flat seal situated covering a container aperture to create a unique cracking or pressure point and then tighten to a close and lock position. The threadable hollow or breathable member can be constructed to vent or tighten the flat seal over the container aperture to create a range of unique vacuum pressures. The threadable member can have a pointed tip or one with a spring type mechanism inside the hollow tube so that when tightened it fits into a recessed seal cover and can be locked by the external portion of the tube member or can lock the seal by pushing into the center of the seal. Further, the extended tip can assist in creating an additional range of pressure. The seal can also be moved to an open position by unthreading the tube so that the container can be vented or fully removed to remove the flat seal covering the container aperture and removed from the container cover.

Another embodiment includes a flip-top with a hinge mechanism to incorporate a one-way valve or flat seal mechanism into the hinged top or bottom part of the cover. In this way when a cover is moved or flipped into an open position a vacuum environment inside a container can be released and the contents of said container can be poured or released. When the cover is moved or flipped into a closed position the container can be placed into a vacuum system to allow a vacuum to be created inside the container. A cover can have a vent aperture to allow gases or air to be released or can incorporate threading that allows gases or air to be evacuated from said container. All the covers and flat seals disclosed herein can include release valves or valves to release a vacuum environment from a container.

Another embodiment can include a container that incorporates a sealing device or one-way valve into the container to allow gases to pass into or out of the container depending upon the type of one-way valve. For example, a one-way valve can be incorporated into the corner of a food bag with the plastic bag corner extending to hermetically seal and cover the aperture of the one-way valve. In this way, the valve is protected and kept clean with the plastic bag corner covering it. A user can create a vacuum environment inside the bag by tearing or removing the plastic covering the one-way valve along or via scoring or other markings placed onto the bag to identify and assist in opening the bag to allow the one-way valve to evacuate gases from inside the bag using a vacuum system as described herein.

Another embodiment includes appliances with smart tag readers connected or in communication with cloud computing and internet network applications to read smart tag containers and products into appliance inventory systems and record container open date status and product expiration dates which are also network connected to food distribution and service provider networks as described herein. Additionally, a user, secure code access or website in communication with an appliance operating and inventory management system can be configured to access, review and monitor appliance inventoried products and to place product orders via the connected food distribution and service provider network. Furthermore, a vacuum system that is smart tag reader enabled can be configured to read a container with a smart tag to operate the vacuum system operating systems or appliance systems. For example, when a container with a smart tag is placed into a vacuum system the smart tag reader can read the container or be given instructions such that when the system aperture is closed and a sensor records that the aperture is closed the vacuum system can then automatically activate the vacuum means to draw a predetermined vacuum level inside the vacuum compartment and to then automatically deactivate the vacuum system and to release the vacuum from inside the vacuum system via a one-way valve in communication with the vacuum compartment and vacuum appliance operating system. Containers can also be configured to operate and control appliance temperature, humidity, venting, UV and other operating settings as noted herein.

In the following description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention which can apply, function and operate to and with any of the appliances, consumer goods and user interfaces disclosed herein to allow appliances, smartphones, Artificial Intelligence (AI), image and event recognition, voice activation and recognition software to connect, communicate and interact with a user, user interface and software and hardware programs for connected or wireless communication via IoT, cloud, internet and other types systems and services to operate, interact communicate.

However, it will be apparent to one skilled in the art that the present invention may be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention.

The operations described herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

FIG. 1A describes a food or goods management system 100. The system 100 comprises a plurality of user interface devices 120 and a main server 150 interconnected via a communication network 140. Various networks 140 may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications, such as by the network 140. Some suitable communications protocols may include TCP/IP, UDP, OSI, Ethernet, WAP, IEEE 802.11, Bluetooth, Zigbee, IrDa or any other desired protocol. Furthermore, components of the system may communicate through a combination of wired or wireless paths.

The system 100 can be accessed via any user interface device 120 that is capable of connecting to the main server 150. The user interface device 120 comprises a display, and preferably a touch screen display, a video camera and a microphone for inputting sound. An exemplary user interface device 120 contains a web browser or similar program, allowing in some embodiments for a secure SSL connection, and able to display HTML and CSS. This includes user interface devices 120 such as tablets, iPads, Mac OS computers, Windows computers, e-readers, and mobile user devices such as the iPhone, Android, and Windows Phone. Preferably, the user interface device 120 is a tablet or phone. The user interface devices 120 can connect to the server 150 via the internet and/or wirelessly, such as through a mobile telephone network 140, and/or any other suitable medium. User interface devices 120 are able to communicate to the main server 150 so that content can be started on one user interface device 120 and later continued on a separate user interface device 120. The user interface device 120 preferably includes an I/O interface that allows a user to interact with the system 100. The I/O interface may include any hardware, software, or combination of hardware and software.

The CPU of the user interface device 120 can be implemented as a conventional microprocessor, application specific integrated circuit (ASIC), digital signal processor (DSP), programmable gate array (PGA), or the like. The CPU executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The memory may include random access memory (RAM), ready-only memory (ROM), programmable memory, flash memory, and the like. The memory, include application programs, OS, application data etc. The exemplary computing device 120 also includes a network module connected to an antenna to communicate with rest of the system 100.

The main server 150 described herein can include one or more computer systems directly connected to one another and/or connected over the network 140. Each computer system includes a processor, non-volatile memory, user input and user output mechanisms, a network interface, and executable program code (software) comprising computer executable instructions stored in non-transitory tangible memory that executes to control the operation of the main server 150. Similarly, the processors functional components formed of one or more modules of program code executing on one or more computers. Various commercially available computer systems and operating system software can be used to implement the hardware and software. The components of each server can be co-located or distributed. In addition, all or portions of the same software and/or hardware can be used to implement two or more of the functional servers (or processors) shown. The main server 150 can run any desired operating system, such as Windows, Mac OS X, Solaris or any other server based operating systems. Other embodiments can include different functional components. In addition, the present invention is not limited to a particular environment or main server 150 configuration. Preferably, the main server 150 is a cloud based computer system.

The main server 150 includes a web server and the query processing unit. The web server receives the user requests and sends it to the query processing unit. The query processing unit processes the request and responds back to the user interface device 120 via the web server. The query processing unit fetches data from the database server if additional information is needed for processing the request. The database is stored in the non-volatile memory. The term "database" includes a single database and a plurality of separate databases. The main server 150 can comprise the non-volatile memory or the main server 150 can be in communication with the non-volatile memory storing the database. The database can be stored at different locations.

Software program modules and data stored in the non-volatile memory the main server 150 may be arranged in logical collections of related information on a plurality of computer systems having associated non-volatile memories. The software and data may be stored using any data structures known in the art including files, arrays, linked lists, relational database tables and the like.

The server 150 and user interface devices 120 are programmed to perform the methods described herein. For example, a smartphone, appliance or consumer good or device such as an Apple, Nokia, Samsung or other can include a smart tag or RFID/NFC reader and use an application to access marketing information and information from said smart tags and to manage said content either alphabetically, by store location or product type and a user can add personal notes and other information to said retrieved materials such as comparative pricing information and material, store name and location of said product, time, future sales dates, discounts, product specifications, recipes and ingredients, and to be able to read for example thin film tags in communication with sensors to view recorded temperature and other sensor information, market and transport time and product processing, storage and transportation history of a product or container, etc. Furthermore, said information can either be accessed directly from said smart tags or via a consumer good, appliance or device application that can access said information wirelessly via cloud or internet communication or connectivity or as described herein which can also include food allergens, nutritional value, serving and health benefits and requirements as well as product GMO information, expiration dates on a closed containers as well as expiration dates after a container is opened, expiration dates for containers stored in various environments such as refrigerators, freezers or vacuum systems, shelf-life approximations for various foods in said various food storage environments, best food storage practices and specific food container and bag storage requirements, etc.

Furthermore, another application can be used to stamp a time and date on a product when for example a container is opened as described herein. The application can have a default function to simply write onto an NFC or smart tag the time and date a container is opened or to record that information to the appliance operating system. Additional application options can include writing container content information onto the NFC or smart tag such as chicken, fish, etc. or adding the same information to the appliance operating system and can additionally post said information to an appliance display for a user to review and monitor. Further, an application or operating system can send notice emails to a smartphone, device or notices to a website in or at predetermined times, intervals or sequences such as every 5 days or any other such time duration combination.

Another embodiment includes a cover with a one-way valve or a seal as described herein which can be attached or disposed onto a plate to seal the cover onto the plate and which can then be placed into a vacuum system to create a vacuum inside the sealed space of the container and plate. This method can be used to keep food items vacuum fresh and warm and to be used for home or hospitality services. The cover can attach to the plate by threading or a locking device and can include an NFC or smart tag with food, room, pricing or menu information. Additionally, one-way valve bags described herein can be used as Ziploc type sealable lunch bags. Place the food items inside the sealable bag and then vacuum seal the bag inside a vacuum compartment as described herein.

The present invention also provides a method for communicating product benefits such as technologies, benefits and advantages to consumers regarding a perishable food or item inside a container with container storage technologies, the method comprising the steps of: (i) manufacturing or producing a container with a container storage technology, wherein the container and container storage technology comprises a benefit; (ii) placing into the container with a container storage technology a perishable food or item for sale, wherein the associated packaging or container comprises: (a) a primary brand logo or name, wherein the primary brand logo is associated with a perishable food or item inside a container with a container storage technology, and (b) a secondary brand logo or name, wherein the secondary brand logo or name is associated with an appliance capable of utilizing said container and container storage technology and can also include (c) a tertiary brand logo or name which can be associated with storage technologies, the container, food distribution store or can include any of the steps or combinations of the methods disclosed herein and in any combination thereof and applies to all steps disclosed herein.

In another embodiment, the present invention relates to a method of product packaging that communicates benefits to a consumer of a container with container storage technologies, the product packaging comprising: (i) a primary brand logo or name, wherein the primary brand logo is associated with the perishable food or item inside the container with container storage technologies, and (ii) a secondary brand logo or name, wherein the secondary brand logo or name is associated with a container storage technology incorporated into said container and can also include (iii) a tertiary brand logo or name which can be associated with storage technologies, the container, food distribution store or can include any of the steps or combinations of the methods disclosed herein and in any combination thereof.

An alternate embodiment presents a method of product packaging that communicates benefits to a consumer of a perishable food or item placed inside a container with container storage technologies, the product packaging comprising: (i) a primary brand logo or name, wherein the primary brand logo or name is associated with a perishable food or item inside a container with container storage technologies, (ii) highlighting said container storage technologies, (iii) a secondary brand logo or name, wherein the secondary brand logo or name is associated with the highlighted container storage technologies or an appliance capable of utilizing said container storage technologies and can also include (iv) a tertiary brand logo or name which can be associated with storage technologies, the container, food distribution store or can include any of the steps or combinations of the methods disclosed herein and in any combination thereof.

Another embodiment presents a method of product packaging that communicates benefits to a consumer of a perishable food or item placed inside a container with container storage technologies, the product packaging comprising: (i) a primary brand logo or name, wherein the primary brand logo or name is associated with a perishable food or item inside a container with container storage technologies, (ii) communicative indicia or text using a descriptor to highlight the benefits and advantages of the primary, secondary or tertiary brand logos or names, (iii) a secondary brand logo or name, wherein the secondary brand logo or name is associated with said highlighted container storage technologies or an appliance capable of utilizing said container and container storage technologies and can also include (iv) a tertiary brand logo or name which can be associated with storage technologies, the container, food distribution store or can include any of the steps or combinations of the methods disclosed herein and in any combination thereof.

In another embodiment, the present invention relates to a method of product packaging that communicates benefits to a consumer of a perishable food or item placed inside a container with container storage technologies, the product packaging comprising: (i) a primary brand logo or name, wherein the primary brand logo or name is associated with a perishable food or item inside a container, (ii) a secondary brand logo or name, wherein the secondary brand logo or name is associated with container storage technologies or an appliance capable of utilizing said container storage technology, (iii) a tertiary brand logo or name which can be associated with storage technologies, a container, food distribution store or can include any of the steps or combinations of the disclosed methods herein and in any combination thereof, and (iv) an informational product and technology section on the container that uses said brand logos and names to highlight product advantages and benefits.

An alternative embodiment presents a method of product packaging that communicates benefits to a consumer of an appliance, the product packaging comprising: (i) a primary brand logo or name, wherein the primary brand logo or name is associated with an appliance, (ii) highlighting appliance storage technologies, (iii) a secondary brand logo or name, wherein the secondary brand logo or name is associated with the highlighted appliance storage technologies or a perishable food or item, a container, a container storage technology or any combination thereof and can also include (iv) a tertiary brand logo or name which can be associated with storage technologies, the container, food distribution store or can include any of the steps or combinations of the disclosed methods herein and in any combination thereof.

Another embodiment presents a method of product packaging that communicates benefits to a consumer of a container and an appliance, the product packaging comprising: (i) a primary brand logo or name, wherein the primary brand logo or name is associated with a container or manufacturer, (ii) highlighting container storage technologies, (iii) a secondary brand logo or name, wherein the secondary brand logo or name is associated with an appliance, the highlighted appliance storage technologies or a perishable food or item, a container, a container storage technology or any combination thereof and can also include (iv) a tertiary brand logo or name which can be associated with storage technologies, the container, food distribution store or can include any of the steps or combinations of the disclosed methods herein and in any combination thereof.

Any of the methods and steps herein can be combined or used individually or in any combination with other methods and steps disclosed herein.

The present invention also discloses methods, including manufacturing, for perishable food or items in containers with container storage technologies. Any of the methods or steps disclosed herein can include the use of a smartphone, user interface or consumer electronics good to access marketing materials from a smart tag, Bluetooth, Wi-Fi, Li-Fi, cloud or other internet connected product or service network to access information to make or access a purchasing decision, marketing materials, product information or any related or associated materials. Furthermore, those steps can include the use of smart tags containing marketing materials to create an informed decision and to provide marketing and product materials.

A method can also include the following product preparation and consumer steps: a) providing or producing a perishable food or item for container storage, b) selecting a sealable or resealable container suitable for said perishable food or item, c) selecting a suitable storage technology to be incorporated into said container, d) if desired or necessary, selecting additional and compatible storage technologies to be incorporated into said container, e) manufacturing or providing the selected sealable or resealable container, f) manufacturing or providing the selected container storage technologies, g) incorporating said selected container storage technologies into the selected container, h) placing a perishable food or item into the container, i) sealing said container, with or without a created container storage environment, with said food or item inside said container, j) placing said food or item, container and container storage technologies on display and sale, k) marketing said perishable food or item, container and container storage technologies to consumers for use with an appliance, l) a consumer purchases said perishable food or item, container and container storage technologies, m) a consumer opens and then reseals said container with a perishable food or item inside said container, n) a consumer uses an appliance to preserve, monitor or track said perishable food or item and container with container storage technologies, and o) a consumer can use an appliance such as a microwave to defrost, warm or cook said perishable food or item in a container with any cooking pressure released via the one-way valve, with or without opening said container, for a pre-determined period of time or at a pre-determined temperature. The NFC tag can provide cooking, storage and opened date storage information to an appliance and as previously describes can provide best use by dates for open food items and send and post corresponding data and information.

A "container storage environment" referred to in step i) above and herein can include any created environment such as a modified atmosphere, gas or vacuum environment or any other type of container storage environment to preserve or enhance the shelf-life or appearance of a perishable food or item. A storage technology referred to in any of the method steps and herein can include any storage technology disclosed herein and any combinations thereof. Additionally, the steps of product, container and container storage technology sales, packaging and marketing materials can be provided and performed during any of the method steps herein and in any of the disclosed methods. It should also be noted that the aforementioned method steps can be performed in any combination or order and with any method steps omitted, modified or added as described herein. Further, any of the one-way valve and seal container embodiments can be used in a vacuum system as well as where applicable in a microwave oven or other cooking appliance as disclosed herein.

Another method can include the following product preparation and consumer steps: a) providing or producing a perishable food or item, b) selecting a sealable or resealable container suitable for said perishable food or item, c) selecting a suitable storage technology that includes a one-way valve to allow air to be evacuated from inside a container, d) if desired or necessary, selecting additional and compatible storage technologies to be incorporated into said container, e) manufacturing or providing the selected sealable or resealable container, f) manufacturing or providing the selected one-way valve and container storage technologies, g) incorporating said selected one-way valve and container storage technologies into the selected container, h) placing a perishable food or item into the container, i) sealing said container, with or without a container storage environment, with said food or item inside said container, j) placing said food or item, container and container storage technologies on display and sale, k) marketing said perishable food or item, container and container storage technologies to consumers for use with an appliance, l) a consumer purchases said perishable food or item, container and container storage technologies, m) a consumer opens and then reseals said container with a perishable food or item inside said container, and n) a consumer uses an appliance such as a vacuum drawer or compartment to create a vacuum environment inside said vacuum drawer or compartment and concurrently inside said container to preserve, monitor or track said perishable food or item and container with container storage technologies.

Another method can include the following product preparation and consumer steps: a) providing or producing a perishable food or item, b) selecting a sealable or resealable container suitable for said perishable food or item, c) selecting a suitable storage technology that includes a seal to cover the aperture of a container to allow air to be evacuated from inside a container, d) if desired or necessary, selecting additional and compatible storage technologies to be incorporated into said container, e) manufacturing or providing the selected sealable or resealable container, f) manufacturing or providing the selected seal and container storage technologies, g) incorporating said selected seal and container storage technologies into the selected container, h) placing a perishable food or item into the container, i) sealing said container, with or without a container storage environment, with said food or item inside said container, j) placing said food or item, container and container storage technologies on display and sale, k) marketing said perishable food or item, container and container storage technologies to consumers for use with an appliance, l) a consumer purchases said perishable food or item, container and container storage technologies, m) a consumer opens and then reseals said container with a perishable food or item inside said container, and n) a consumer uses an appliance such as a vacuum drawer or compartment to create a vacuum environment inside said vacuum drawer or compartment and concurrently inside said container to preserve, monitor or track said perishable food or item and container with container storage technologies.

An alternate method includes the following product preparation and consumer steps: a) providing or producing a perishable food or item, b) selecting a sealable or resealable container suitable for said perishable food or item, c) selecting a suitable storage technology that includes a one-way valve to allow air to be evacuated from inside a container, d) if desired or necessary, selecting additional and compatible storage technologies to be incorporated into said container, e) manufacturing or providing the selected sealable or resealable container, f) manufacturing or providing the selected one-way valve and container storage technologies, g) incorporating said selected one-way valve and container storage technologies into the selected container, h) placing a perishable food or item into the container, i) closing and sealing said container, j) placing said one-way valve container into a vacuum system to create a vacuum environment inside the vacuum system and concurrently inside the container placed therein with said food or item inside said container, k) if the perishable food or item is presold, a gift or a benefit then said food or item can be distributed to consumers and then continue to step o) and, if not, then continue here, l) placing said food or item, container and container storage technologies on display and sale, m) marketing said perishable food or item, container and container storage technologies to consumers for use with an appliance, n) a consumer purchases said perishable food or item, container and container storage technologies, o) a consumer opens and then reseals said container with a perishable food or item inside said container, and p) a consumer uses an appliance such as a vacuum drawer or compartment to preserve, monitor or track said perishable food or item and container with container storage technologies.

An alternate method can include the following product preparation and consumer steps: a) providing or producing a perishable food or item, b) selecting a sealable or resealable container suitable for said perishable food or item, c) selecting a suitable storage technology that includes a one-way valve to allow air to be evacuated from inside a container, d) if desired or necessary, selecting additional and compatible storage technologies to be incorporated into said container, e) manufacturing or providing the selected sealable or resealable container, f) manufacturing or providing the selected one-way valve and container storage technologies, g) incorporating said selected one-way valve and container storage technologies into the selected container, h) placing a perishable food or item into the container, i) sealing said container, with or without a container storage environment, with said food or item inside said container, j) placing a removable or resealable adhesive, film, plastic or material to cover and seal the exterior opening of the one-way valve, and if desired, also placing a removable or resealable adhesive, film, plastic or material to cover and seal the interior opening of the one-way valve, k) placing said food or item, container and container storage technologies on display and sale, l) marketing said perishable food or item, container and container storage technologies to consumers for use with an appliance, m) a consumer purchases said perishable food or item, container and container storage technologies, n) a consumer opens and then reseals said container with a perishable food or item inside said container, o) a consumer removes the adhesive, film, plastic or material from the respective opening of the one-way valve to allow air to be evacuated from inside the container, and p) a consumer uses an appliance such as a vacuum drawer or compartment to create a vacuum environment inside said container to preserve, monitor or track said perishable food or item and container with container storage technologies.

Another method can include the following product preparation and consumer steps: a) providing or producing a perishable food or item, b) selecting a sealable or resealable container suitable for said perishable food or item, c) selecting a suitable storage technology that includes a sealable one-way valve to allow air to be evacuated from inside a container and a sealable one-way valve to allow air to pass into a container, d) if desired or necessary, selecting additional and compatible storage technologies to be incorporated into said container, e) manufacturing or providing the selected sealable or resealable container, f) manufacturing or providing the selected one-way valves and container storage technologies, g) incorporating said selected one-way valves and container storage technologies into the selected container, h) if desired, placing a removable or resealable adhesive, film, plastic or material to cover and seal the exterior opening of each one-way valve, and if desired, also placing a removable or resealable adhesive, film, plastic or material to cover and seal the interior opening of each one-way valve, i) placing a perishable food or item into the container, j) sealing said container, with or without a container storage environment, with said food or item inside said container, k) placing said food or item, container and container storage technologies on display and sale, l) marketing said perishable food or item, container and container storage technologies to consumers for use with an appliance, m) a consumer purchases said perishable food or item, container and container storage technologies, n) a consumer opens and then reseals said container with a perishable food or item inside said container, o) a consumer removes the adhesive, plastic, film or material from a one-way valve to: allow air to be evacuated from inside the container to create a vacuum environment; or to allow air to pass into the container to create a pressurized environment; or removes the covers from the openings of both one-way valves to allow air to simultaneously evacuate from and pass into the container to vent said container, and p) a consumer uses an appliance such as a vacuum drawer or compartment to create a vacuum or pressure environment inside a container or to degas or vent said container to store, preserve, monitor or track said perishable food or item and container with container storage technologies.

It should be noted that in step o) a consumer can remove an adhesive, plastic, film or material from the opening of a one-way valve or as disclosed in another embodiment a consumer can puncture a hermetically sealed and covered one-way valve which is constructed or embedded into said container, as described herein.

Another method can include the following product preparation and consumer steps: a) providing or producing a perishable food or item, b) selecting a sealable or resealable container suitable for said perishable food or item that can include a threadable lid or cover ("cover") that engages with threads on the aperture of a container, c) selecting a suitable storage technology that can include a one-way valve to be incorporated into a cover to allow air to be evacuated from inside a container, d) if desired or necessary, selecting additional and compatible storage technologies to be incorporated into said container, e) manufacturing or providing the selected sealable or resealable container, f) manufacturing or providing the selected one-way valve, cover and container storage technologies, g) incorporating said selected one-way valve into the threadable cover of said container to allow air to be evacuated from the inside of said container when the cover is disposed on said container and incorporating any other container storage technologies into the selected container, h) placing a removable or resealable adhesive, film, plastic or material to cover and seal the exterior opening of the one-way valve, and if desired, also placing a removable or resealable adhesive, film, plastic or material to cover and seal the interior opening of the one-way valve in the cover of the container, i) placing a perishable food or item into the container such as, but not limited to, milk, juice, sauces and condiments, j) sealing the aperture of said container, with or without a container storage environment, with a sealing material such as film, plastic, foil or any other suitable material, with said food or item inside said container, k) disposing or threading said container cover onto the threaded aperture of said sealed container, l) placing said food or item, container and container storage technologies on display and sale, m) marketing said perishable food or item, container and container storage technologies to consumers for use with an appliance, n) a consumer purchases said perishable food or item, container and container storage technologies, o) a consumer removes the threaded cover from the aperture of said container and removes the material covering and sealing the container aperture to access said contents, p) a consumer removes the adhesive, film, plastic or material from the respective openings of a one-way valve to allow air to be evacuated from inside the container to create a vacuum environment therein, q) a consumer then disposes or attaches said cover onto said container to close and seal said container, and r) a consumer uses an appliance such as a vacuum drawer or compartment to create a vacuum environment inside said drawer or compartment and concurrently inside said container to preserve, monitor or track said perishable food or item and container with container storage technologies.

This method can apply to a container that can use a removable or attachable lid or flip type lid that can be pressed to engage, close and seal a container cover to a container body and also incorporate a one-way valve and sealing system as described herein into said cover.

An alternate method can include the following product preparation and consumer steps: a) providing or producing a perishable food or item for container storage, b) selecting a sealable or resealable container suitable for said perishable food or item, c) selecting a suitable storage technology to be incorporated into said container, such as a one-way valve disposed in a hollow tube that can be disposed, inserted or screwed into a container or container cover post-purchase to allow air to be evacuated from the inside of a container, d) if desired or necessary, selecting additional and compatible storage technologies to be incorporated into said container, e) manufacturing or providing the selected sealable or resealable container, f) manufacturing or providing the selected hollow tube (lance) with a one-way valve disposed therein and other container storage technologies, g) incorporating said selected container storage technologies into the selected container, h) placing a perishable food or item into the container, i) sealing said container, with or without a container storage environment, with said food or item inside said container, j) placing said food or item, container and container storage technologies on display and sale, k) marketing said perishable food or item, container and container storage technologies to consumers for use with an appliance, l) a consumer purchases said perishable food or item, container and container storage technologies, m) a consumer opens and then reseals said container with a perishable food or item inside said container, n) a consumer inserts said hollow tube with a one-way valve disposed therein into said container body or container cover, and o) a consumer uses an appliance create a vacuum environment inside said container to preserve, monitor or track said perishable food or item and container with container storage technologies.

Another method can include the following product preparation and consumer steps: a) providing or producing a perishable food or item, b) selecting a sealable or resealable container suitable for said perishable food or item, c) selecting a suitable storage technology that includes a threadable, flexible or deformable container cover that allows air to be evacuated from inside a container when disposed onto the aperture of a container, d) if desired or necessary, selecting additional and compatible storage technologies to be incorporated into said container, e) manufacturing or providing the selected sealable or resealable container, f) manufacturing or providing the selected threadable, flexible or deformable container cover and container storage technologies, g) incorporating said selected threadable, flexible or deformable container cover and container storage technologies into the selected container, h) placing a perishable food or item into the container, i) sealing said container, with or without a container storage environment, with said food or item inside said container, j) placing said food or item, container and container storage technologies on display and sale, k) marketing said perishable food or item, container and container storage technologies to consumers for use with an appliance, l) a consumer purchases said perishable food or item, container and container storage technologies, m) a consumer opens and then reseals said container with a perishable food or item inside said container, and n) a consumer uses an appliance such as a vacuum drawer or compartment to create a vacuum environment therein and concurrently inside said container to preserve, monitor or track said perishable food or item and container with container storage technologies.

It should also be noted that the insertable hollow tube with a one-way valve disposed therein or a threadable container cover or lid with a one-way valve can be provided to consumers to use with purchased products and containers and to use said technologies interchangeably between newly purchased products and containers at any method step described herein.

Another method can include the following product preparation and consumer steps: a) providing or producing a perishable food or item, b) selecting a sealable or resealable container suitable for said perishable food or item that can include a threadable cover that engages with threads on the aperture of a container, c) selecting a suitable storage technology that can include a threadable cover that includes a spherical seal contained therein that can be aligned and positioned over the aperture of said container when the cover is disposed on said container to allow air to be evacuated from inside a container to create a vacuum environment inside said container, d) if desired or necessary, selecting additional and compatible storage technologies to be incorporated into said container, e) manufacturing or providing the selected sealable or resealable container, f) manufacturing or providing the selected threadable cover with a spherical seal contained therein, g) placing a perishable food or item into the container such as, but not limited to, spices, milk, juice, sauces, condiments, (then either step h) or step k)), h) if desired, creating a storage environment inside said container, i) then sealing the aperture of said container with a sealing material such as film, plastic, foil or any other suitable material, with said food or item inside said container, j) disposing or threading said container cover onto the threaded aperture of said sealed container, k) disposing or threading said container cover onto the threaded aperture of said container, l) if desired, placing said container into a vacuum system to create a vacuum environment inside said system and simultaneously inside said container, m) if desired, covering and sealing the cover onto the container body with a removable protective plastic, n) placing said food or item, container and container storage technologies on display and sale, o) marketing said perishable food or item, container and container storage technologies to consumers for use with an appliance, p) a consumer purchases said perishable food or item, container and container storage technologies, q) if applicable, a consumer removes the protective plastic cover from the cover or container and then removes the threaded cover from the aperture of said container and, if applicable, removes the material covering and sealing the container aperture to access said contents, r) a consumer then disposes or attaches said cover onto said container to close and seal said container, and q) a consumer uses an appliance such as a vacuum drawer or compartment to create a vacuum environment inside said drawer or compartment and concurrently inside said container to preserve, monitor or track said perishable food or item and container with container storage technologies.

Another method can include the following product preparation and consumer steps: a) providing or producing a perishable food or item, b) selecting a container with an open aperture suitable for said perishable food or item, c) selecting a suitable storage technology such as a one-way valve and a film, plastic, foil or any other material that can incorporate a one-way valve to allow air to be evacuated from inside a container when the one-way valve and film, plastic, foil or material cover and seal the aperture of a container, d) if desired or necessary, selecting additional and compatible storage technologies to be incorporated into said container, e) manufacturing or providing the selected container, f) manufacturing or providing the selected one-way valve and sealable or resealbale film, plastic, foil or material to incorporate said one-way valve and the other container storage technologies, g) incorporating a one-way valve into said selected film, plastic, foil or material, h) placing a perishable food or item into the container (then continue to either step i) or to step l)), j) sealing said container with said film, plastic, foil or material incorporating said one-way valve without a storage environment and said food or item inside said container, k) placing said sealed container into a vacuum system to create a vacuum environment inside said system and simultaneously inside said container, l) sealing said container with said film, plastic, foil or material incorporating said one-way valve with a storage environment and said food or item inside said container, m) if desired, placing a removable or resealable adhesive, film, plastic or material to cover and seal the exterior opening of the one-way valve, n) placing said food or item, container and container storage technologies on display and sale, o) marketing said perishable food or item, container and container storage technologies to consumers for use with an appliance, p) a consumer purchases said perishable food or item, container and container storage technologies, q) a consumer opens and then reseals said container using the film, plastic, foil or material incorporating a one-way valve with a perishable food or item inside said container, r) if applicable, a consumer removes the adhesive, plastic, film or material from the opening of the one-way valve to allow air to be evacuated from inside the container to create a vacuum environment therein, and s) a consumer uses an appliance such as a vacuum drawer or compartment to create a vacuum environment inside said container to store, preserve, monitor or track said perishable food or item and container with container storage technologies.

Another method can include the following product preparation and consumer steps: a) providing or producing a perishable food or item, b) selecting a sealable or resealable container, such as a bottle with an aperture, suitable for said perishable food or item that can include alcoholic or non-alcoholic beverages, c) selecting a suitable storage technology that can include a cork, rubber or plastic type stopper and a suitable one-way valve that can be incorporated into the stopper which can then be placed or disposed into the aperture of a bottle or into a circular opening of a container to create an airtight engagement and to allow air to be evacuated from inside said container to create a vacuum environment therein, d) if desired or necessary, selecting additional and compatible storage technologies to be incorporated into said container, e) manufacturing or providing the selected sealable or resealable container, f) manufacturing or providing the selected rubber or plastic stopper with a one-way valve incorporated therein, g) placing a perishable food or item into the container such as, but not limited to, beverages, spices, milk, juice, sauces, condiments, (continue to step h) or skip to step i), h) if desired, creating an storage environment therein, i) placing said stopper into said container with said food or item inside said container, m) if desired, placing said container into a vacuum system to create a vacuum environment inside said system and simultaneously inside said container, n) if desired, placing a removable or resealable adhesive, film, plastic or material to cover and seal on the exterior opening of the one-way valve, o) if desired, covering and sealing the stopper to the container body with a removable protective plastic, p) placing said food or item, container and container storage technologies on display and sale, q) marketing said perishable food or item, container and container storage technologies to consumers for use with an appliance, r) a consumer purchases said perishable food or item, container and container storage technologies, s) if applicable, a consumer removes the protective plastic cover from the stopper and container and then removes the stopper from the container aperture to access said contents, t) a consumer then places the stopper into the container and removes the cover from the one-way valve, and u) a consumer uses an appliance such as a vacuum drawer or compartment to create a vacuum environment inside said drawer or compartment and concurrently inside said container to preserve, monitor or track said perishable food or item and container with container storage technologies. It should be noted that the method steps disclosed herein are applicable to all container embodiments disclosed herein and in any appropriate order.

The methods described herein can include a perishable food or item that is sold separately from a container with a container storage technology but which is intended for use in a container with a container storage technology, such as a vacuum technology as described herein. For example, spices may be sold in a vacuum storage container as described herein but refills or additional product may be sold in a vacuum sealed plastic bag the contents which are then intended to be placed into an originally sold vacuum container. Or, a spice vacuum container may be provided to a consumer as a gift or benefit to use a certain brand of spices said spices which are sold to consumers in a vacuum sealed plastic bag without a container and are intended to be placed into said container for vacuum storage.

It should be noted that the one-way valves used in the embodiments in the method steps to create vacuum environments can also be used as one-way valves to create pressurized environments inside containers and said vacuum systems disclosed herein can be pressurized systems to create pressure environments inside said containers. Furthermore, for safety purposes containers can have one-way valves with adjusted one-way valve air flows, sensitivities or cracking pressures so that containers are not damaged or destroyed inside a vacuum compartment. Additionally, vacuum compartments can also have release valves, as described herein, to automatically release a vacuum environment when predetermined vacuum level is reached or exceeded in order to prevent a container from being damaged. Furthermore, the disclosed methods and steps described herein can also apply where a container and storage technology is sold without a food item for use with an appliance such as a vacuum, microwave or UV light treatment source appliance or where a food item inside a container or bag is designed for use with a UV light treatment source appliance. Additionally, and where applicable, combinations of methods and steps can be used for a multi-function appliance.

BRIEF DESCRIPTION OF THE DRAWINGS

FIG. 1A describes a food or goods management system;

FIG. 1B illustrates a perspective view of a housing and compartments;

DETAILED DESCRIPTION OF THE INVENTION

Figure 4:
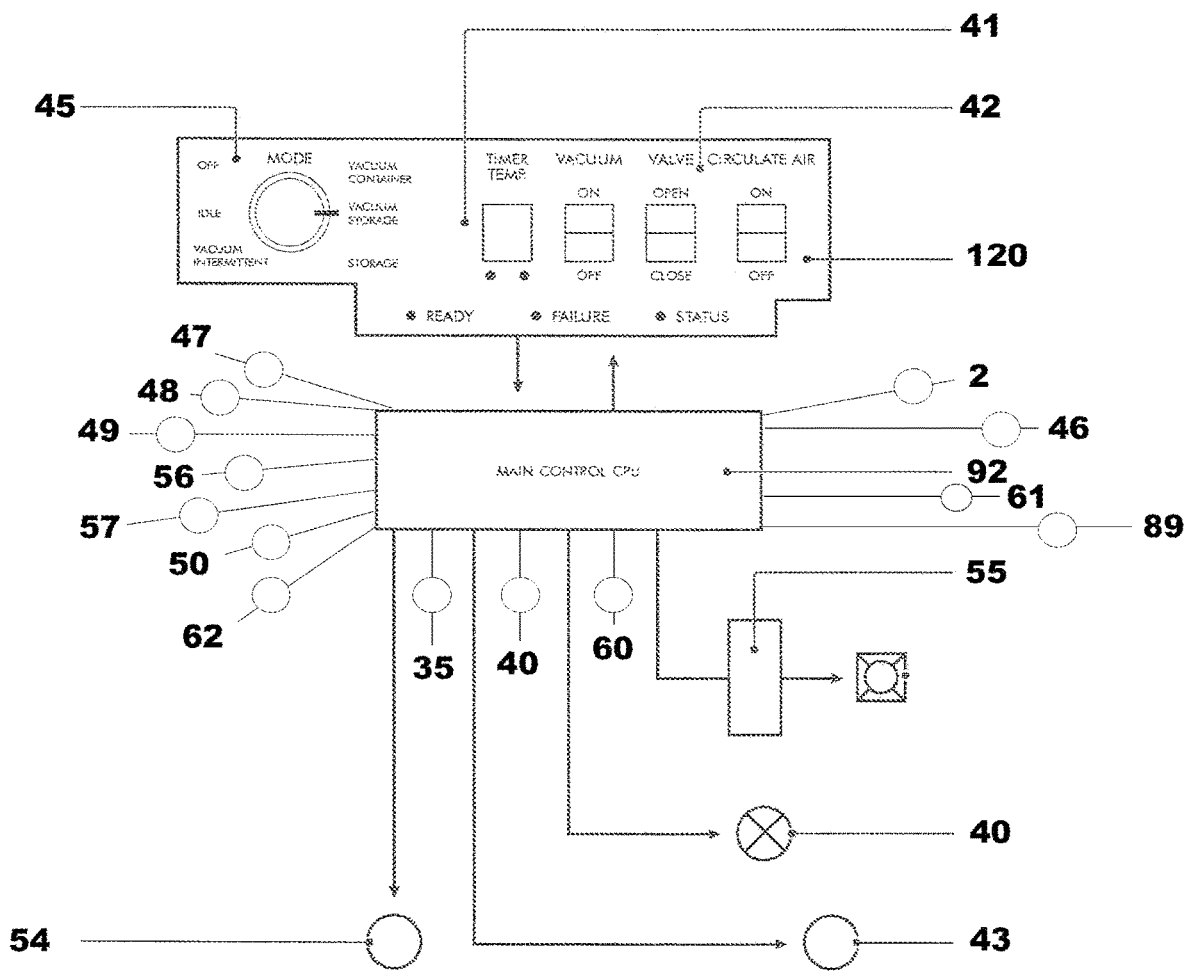
FIG. 4 illustrates a schematic diagram of a control system including display panel, microprocessor and memory device.

The invention will now be described with reference to the attached non-limiting Figures. A preferred embodiment as described herein is a single or multi-function smart appliance ("appliance") that can include any combination of the following functionalities, but not limited thereto: a compartment designed to function as a vacuum system, an oven, a microwave oven, a temperature controlled compartment or housing with a temperature means that can include conventional refrigeration cooling and systems, a Peltier device (60) or solid state cooling and heating (62) (condenser and condenser free systems)(which can be located inside or outside an appliance compartment), a vacuum bag sealer with heat bar for use inside a compartment, a UV light treatment source system, a handheld or manual vacuum system, a handheld or manual UV light system, a humidity and venting system, as well as the other previously disclosed wireless capabilities and functions and modes, that can include Li-Fi-NFC/RFID enabled, connected and in communication with an appliance control or operating system and can be controlled wirelessly via a smartphone, by voice, AI or similar devices. In one embodiment, an appliance with a vacuum storage function or system can comprise any of the following such as, a housing (1) shown in FIG. 1B, in which at least one sealable modular compartment (6) can be disposed with at least one or more containers disposed therein. A compartment (6) can also be removably disposed inside the housing. In communication with the interior of a compartment can be a pump to create vacuum, pressure, venting and other environments inside said compartment and containers disposed therein. A control system (2) can include a display panel, microprocessor (CPU), memory device, software and hardware for an IoT enabled appliance including a wireless device connected to a microcontroller to communicate with the cloud, internet, other appliances, containers, as well as, control and operating systems for each. As shown in FIG. 4, an appliance control system can selectively or automatically activate and deactivate a pump and place said pump in either a vacuum or pressure mode or function. Further, said pump can function in a vacuum or pressure mode and can pump, vent or draw air into or out of an open or sealed compartment. Furthermore, a pump with a vacuum or pressure function can connect to the interior of a compartment and communicate with a control system, sensors and release valves connected and in communication with said compartment. In differing embodiments, operating systems can be physically removed from or inside, or a combination, of an appliance compartment where appropriate. Furthermore, said compartment cavities, spaces and apertures as disclosed herein can be constructed and designed to support a combination of microwave oven, oven, UV light treatment source and vacuum, temperature, humidity, outgassing, venting, and other disclosed modes and functions ("environments").

Figure 3:
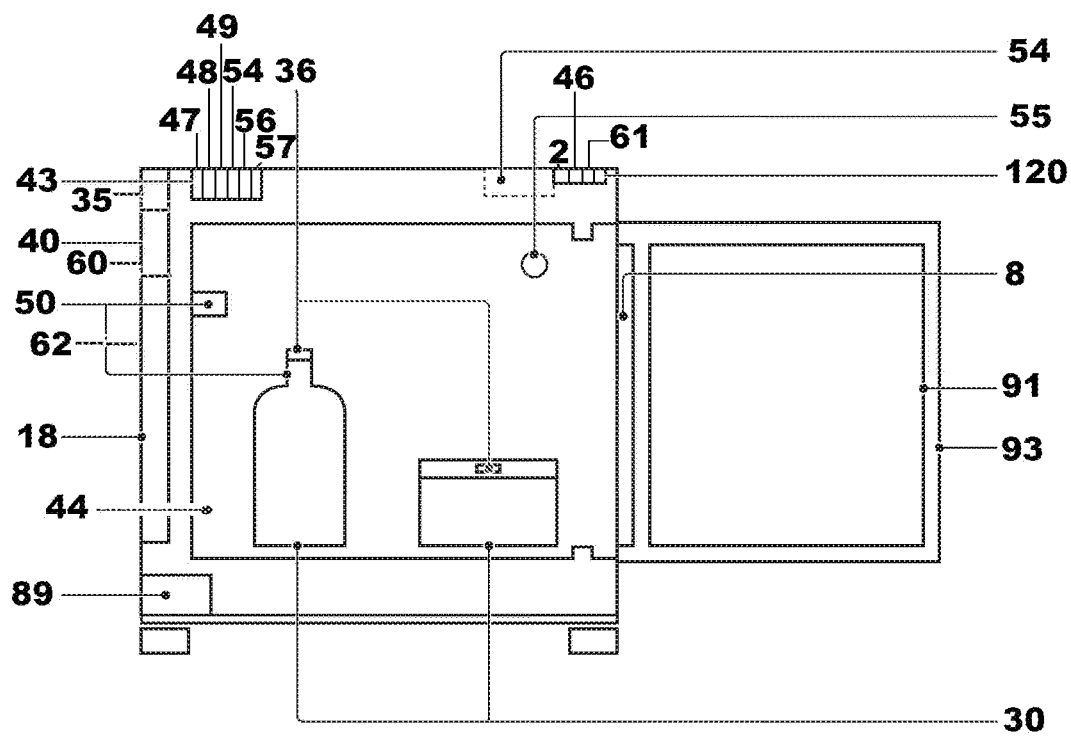
FIG. 3 illustrates a compartment with a door and containers.

Another embodiment, as shown in FIG. 3, provides an apparatus housing (18) and operating systems to create, monitor, regulate, maintain and release compartment or container environments, as disclosed herein, which can connect to and communicate with a control system, each individual operating system, sensors and a compartment. Operating systems, as described herein, can include inventory and ordering management systems, voice activation and interaction functions and modes or with necessary means to connect and communicate with a voice control, recognition user interface, AI software and connectivity via internet, cloud, etc., pump(s) (89), sensors (50) (which can include humidity, gas, temperature, tactile, time, pressure and vacuum, and as described herein), valves (90), system status indicators and controls and temperature (40) and humidity (35) control devices, (55) a camera (still and video) to view and monitor a housing and compartment interior, contents and to record product, event and user transaction activity, (54) ultraviolet light emitting diode (UV light), (43) microwave oven, Li-Fi-Wi-Fi-NFC, smart tag and reader systems and associated software and hardware programs and functions (operating system(s), systems and components) and a scanner to read bar codes, QR codes and others as described herein to read containers for food preparation and to scan information into an inventory management system. A temperature system (40) can create a range of temperature inside a housing (18), a compartment (6) and a container (30) disposed therein and can connect to a control system (2) and to individual or selected operating system components. A humidity system (35) can create a range of humidity inside a compartment and a container disposed therein and can connect to a control system and to individual or selected operating system components. Single or multiple UV lights (54) can be positioned inside a housing, compartment or both such as on a wall, top or bottom of said housing or compartment with each configured to emit light having a peak wave length in the ultraviolet range to reduce or eliminate the growth of microbes in said compartment, containers, food or items placed therein. Furthermore, a UV light positioned in a compartment can be designed so that it can be moveable and adjustable to position the UV light source in effective contact with the item(s) to be treated. For example, when a UV light function or mode is activated automatically, selectively or via other operating systems (as with all operating systems herein) a user can either manually lower a moveable UV light so that it is placed in effective proximity to said items to be disinfected via a movable system or arrangement with pinions or tracks or a UV light can be automatically moved via an electrical device with sensors so that the UV light is moved and can track in effective proximity the items via electrical track system under control of an appliance control system. When the UV light process or function is terminated the UV light system can automatically return via electrical type system to its original position until reactivated. Additionally, a UV light can include a telescopic arm or hinged leg functionality so that a UV light positioned in a recessed part or on a compartment wall, ceiling or base can be moved or tilted in effective proximity to disinfect a food or item placed inside the compartment. This adjusting function can be manual or electronic with a sensor to determine UV light proximity to an item and connected and in communication with appliance operating systems. A microwave oven function can include microwave oven functions, well known in the art, such as power levels, defrost and cooking times (61), among others, to defrost or cook items inside said compartment and can include a camera (55) to identify, monitor the cooking, contents, user transactions and activity of a housing or compartment and can connect to and communicate with an appliance control system. A compartment storage cavity or space can serve as a microwave oven cavity (44) with microwave oven functions. The compartment housing can include, among other elements, a waveguide (57), cooling fan (56), magnetron (47), high voltage diode (48), high-voltage capacitor and a high-voltage transformer (49) or can include a solid state microwave system (54) incorporating antennas or single or multiple RF sources connected to appliance control systems with related software each with its unique port into a compartment or cavity such that a relative phase between the sources can be altered to shift nodes and anti-nodes and can further be connected to an appliance control system incorporating cooking and preservation algorithms and feedback processes to control cooking and related functions including other related elements all well known in the art. Any compartment disclosed herein can also include a viewing window to monitor the contents inside said compartment. Additionally, a compartment or compartment housing can also include a vacuum hose attachment (62) in communication with and in connection with a vacuum pump and system under separate switch or control or control of a control system to create vacuum environments inside one-way valve containers and bags when the aperture of the hose is placed over a one-way valve or other vacuum sealing mechanism on said container or bag and said vacuum system is activated. The vacuum hose attachment can be removably incorporated into a housing or compartment. An assembly can include and comprise one or more external vacuum hose input ports connected to and in communication with a vacuum pump in said appliance compartment or housing to apply a vacuum to containers or bags. Said vacuum hose system can be manually activated via a switch or selectably via an appliance control system.

Furthermore, a handheld UV light (51) can also be removably incorporated into a housing or compartment as described above and can be activated or controlled manually by a switch or controlled via an appliance control system. A handheld UV light can be connected to and in communication with an appliance control system and operating systems or can be wireless with a recharger unit or system incorporated into an appliance housing or compartment.

Additionally, the compartment storage cavity or space can include a turntable (52) which can be mechanized, as is well known in the art, to rotate with items placed thereon when the microwave oven or UV light functions are activated and be connected to and in communication with an appliance control system. A turntable can be made of any materials consistent with the use and need of a microwave oven or the use of a UV light source such that a UV light positioned in the base of a compartment can pass through the turntable when it rotates to disinfect an item placed thereon. Said turntable can be constructed with apertures and also function as a tumbler to rotate fruit or produce placed upon the turntable. Said compartment can also be coated in graphene to reduce radiation risk or a UV reflective material. The aperture to said compartment, which can include any of those described herein such as a drawer or microwave oven hinged door compartment, can include a contact or choke seal to also function as a vacuum seal where necessary. Furthermore, if said appliance is a combination vacuum sealing and microwave oven compartment, when the vacuum sealing function is selected a user can manually seal the holes/apertures inside the compartment cavity that allow delivery of the microwave energy into the compartment cavity and the venting and cooling apertures with a cover or plate to form a vacuum seal. The cover or plate (53) can be a friction cover such as a concave/convex type mechanism. This function can also be electronically controlled via a control system such that when said vacuum function is selected via a control system an electronically controlled cover or plate automatically hermetically or vacuum seals the holes/apertures in a compartment with mechanized covers. Likewise, when a microwave function is selected, the covers or plates can manually be removed, slide or move to an open position or can be automatically opened using an electronic device or mechanism via the control system connected to an electrical or motorized mechanism to allow the holes/apertures to move to an open position to allow microwave energy, venting and cooling to pass into a compartment cavity and to vent an compartment. Said covers or plates can be hinged, threaded, slide or push to seal or can consist of off-set holes/apertures such that when moved the holes/apertures of two overlapping plates align to form an open position and when moved to a close position one of the overlapping plates can be constructed to close the holes/apertures and seal said compartment. Furthermore, a compartment venting system can also be activated to function with a microwave function. An appliance system can be programmed to function to a default setting such as a microwave or other selected mode. An appliance can include a control and operating system as described herein to communicate with and operate the microwave oven functions and the operation of the other systems disclosed herein. A compartment can comprise any combination of the aforementioned compatible operating systems which can function individually, in combination or sequence with other control and operating systems and functions.

An appliance can include voice recognition, interaction and speech using appliance or internet or cloud connected software as discussed herein to allow a user to provide commands or trigger words to control, regulate and activate an appliance control or operating system or can connect and communicate via a voice recognition, interaction and speech user interface system to control each appliance function such as food vacuum, container vacuum, pressure, temperature setting, preserve, cook, vent, add or remove food items from a storage compartment and adjust environment setting to optimize storage.

An appliance housing or compartment can incorporate single or multiple cameras and can include AI functionality connected and in communication with an appliance control and operating system to identify containers, products, appliance transactions with users and stored items and events by connecting to and communication with appliance or internet or cloud software. For example, an AI connected camera can identify a container or a product placed inside a housing or a compartment and can automatically adjust the required housing or compartment temperature. If an AI connected camera does not view a product in a housing or a compartment the temperature can be lowered to a predetermined temperature level until a product or container is identified. An AI connected camera can optimize appliance preservation and storage settings to activate, deactivate or regulate appliance control and operating systems, such as, identify containers placed into an appliance to automatically activate appliance functions to create a predetermined vacuum level to store a specific food item or loose food item, identify a container to automatically create and release a vacuum environment inside a compartment or create an environment inside said container, to vent a container and per operations and functions disclosed herein. An AI connected camera can identify food items inside a housing or compartment and optimize and set the most effective temperature, humidity, venting and pressure settings for one or more food items that can include the same or different fruit and vegetables, meat, dairy, bakery, fish or a range of respiring or non-respiring food items. An AI connected camera can capture food during the cooking process to control or regulate the temperature, turn off an appliance function or sound an alarm or send a text message if splattering, burning, fire or other identified events occur. An AI connected camera can capture an appliance transaction where a container or food item is placed inside a housing or compartment and recommend to a user the most effective storage placement inside the housing or compartments therein by suggesting via voice, lights situated inside a housing or compartment or via a defined location in said housing or compartment such as top shelf, back or fruit not vegetable drawer to provide the most effective food storage in an appliance and use of appliance control and operating systems.

Each appliance operating system such as vacuum, temperature, UV, outgassing, venting and humidity systems can connect to sensors and said sensors can connect to operating systems such as vacuum, temperature, UV and humidity systems to activate, deactivate, interrupt, create, regulate and maintain individual or selected operating systems, processes and environments as described herein. For example, sensors such as temperature, vacuum, gas and humidity, can communicate with a control system and can individually or in combination activate or deactivate a pump or valve(s) to an open or close position when a predetermined level, range or value of temperature, vacuum, gas, time or humidity is created, maintained or exceeded inside a compartment or inside a container disposed therein or after a preset period of time. A compartment can include a seal (91) on the open and close mechanism or device for the compartment aperture as disclosed herein. All appliance functions can be controlled via a smartphone application.

Status indicators can include a sound, noise, light or series of lights located on the front of a drawer or compartment which illuminate in colors to inform of each system's status, such as, red when a vacuum is being created and green when a vacuum is being released from a compartment or when a UV light source treatment is in process or has terminated. Furthermore, a compartment can include an external or internal multi-colored light source that is activated when one of the functions are initiated and additionally can remain activated as long as a food or item is left or remains inside a compartment or if the aperture has not been opened and closed since the last appliance operation. This light source can have designated light colors for each or unique appliance events such as a microwave function can include a red light, a vacuum function a green light and a UV light treatment a blue light to status the appliance function. Additionally, a combined appliance system can incorporate a default setting, such that an appliance is always in a microwave setting or function and other functions such as vacuum sealing or UV light treatment can be selected but then default to the microwave oven function.

Figure 2:
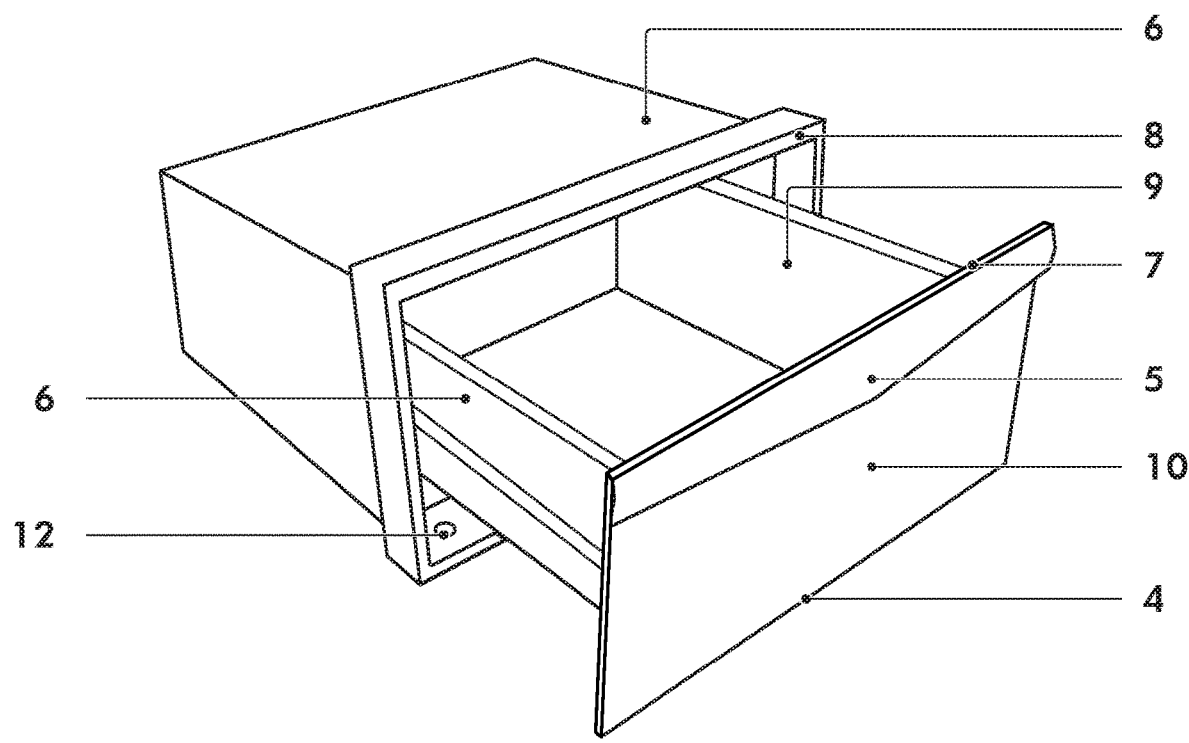
FIG. 2 illustrates a perspective view of a compartment with a drawer.

As shown in FIGS. 1-2, a housing (1) can include a compartment (6) disposed therein comprising exterior walls with a slidable drawer (4) that can serve as an internal holding area or retaining compartment (9) for goods with a front wall (10) that can serve as a means to open, close or seal said compartment. Housings can include, but are not limited to, a microwave oven, refrigerator, freezer, cabinet, shell, breadbox, drawer or hinged or unhinged doored or covered compartments. A compartment can include an aperture comprising a drawer (6), door (93), bin, pivot bin, lid or cover, any of which can be hingedly attached to a housing or compartment or surrounding area.

As shown in FIGS. 2-3, an appliance compartment (6) can be constructed and arranged so that when a retaining compartment, such as a drawer (10), is in a closed position inside a compartment said drawer can create a seal between the engaging surfaces of a compartment and the interior of a drawer. The created seal can also be airtight or can create a vacuum or microwave seal. An induction plate can also be incorporated into a drawer with other appliance functions such as vacuum, etc. Further, in other embodiments, when an appliance vacuum is created inside a compartment a seal can be formed between a front wall of a drawer unit (7) and the walls of a compartment (8). A sealing device (91) can also be provided positioned between or around the engaging surfaces of a compartment and the interior (9) of a drawer or a door (93). Additionally, a sensor (12) can be positioned on a drawer or door of a refrigerator or compartment and connect to operating systems and to a control system to indicate the open, close and seal status to activate and deactivate individual or selected operating systems. Furthermore, a mechanical or electrical latch mechanism can be provided to secure a drawer or aperture and a compartment together when the interior portion of a drawer is substantially contained inside a compartment to engage a drawer and a compartment together to seal said compartment interior. A latch mechanism can connect to a control system and to individual or selected operating systems to activate or deactivate individual or selected operating systems. A drawer can also include a handle (5).

As shown in FIG. 4, other aspects of the invention provide a programmable control system, which can consist of a display panel (41), operating system controls (42) and a microprocessor and memory device (92), for a housing or a compartment to connect and communicate with operating system components to activate, deactivate, control, monitor, release and regulate any of the operating and elements and systems disclosed herein such as a pump(s) (89), latch mechanism, sensors (50), valves (90), system status indicators connected to sensors, and controls, and microwave oven, oven, induction plate, external appliances, UV light source, vacuum, temperature, outgassing and humidity systems. Accordingly, each operating system and compartment can interconnect and inter-communicate with each other, or via a control system, to function together or individually to carry out the processes described herein. Accordingly, as an example, a control system can activate or deactivate a pump to vent, cool or create vacuum and pressure environments inside a compartment, as well as, activate or deactivate a gas or release valve to open or close positions to seal or unseal a compartment. Additionally, a control system can connect to and communicate with sensors (50) described herein and said sensors can connect to and communicate with a control system (2) and each operating system such as a pump(s), valves, latch mechanism, sensors, system status indicators, system controls and vacuum, temperature and humidity systems to activate, deactivate, create, monitor, regulate, maintain and release operating systems, environments, such as, vacuum, pressure, temperature, humidity, gas, air, components and processes for and in a housing, compartment and containers disposed therein and combinations thereof. A user interface with an led display and apparatus power source (120, 46,) with touch, keyed or digital display panel functionality can operatively connect to and communicate with a control system to allow the input of instructions, formulas, time sequences, algorithms and values to operate external appliances and each or selected appliance system components, systems and processes described herein. A user interface, situated on a compartment or a housing exterior or interior front panel, access or surrounding areas can also comprise touch panel controls, switches, buttons and knobs to connect to and communicate with operating systems and housing components. The operating systems can be programmed to be activated and deactivated automatically via a control system or manually via a control panel or via each operating system.

In another embodiment a vacuum sensor can communicate with a compartment interior and operatively connect to a housing, compartment or control system to open and close a gas or release valve and to activate and deactivate a pump(s). Alternately, a vacuum sensor can connect directly to a pump(s), a housing, compartment or valve. Furthermore, a housing or compartment sensor, as described herein, such as vacuum, temperature, pressure, tactile, drawer and refrigerator door open, close and seal status sensors can operatively connect in combination to a pump, valve(s), sensors and housing or compartment operating systems to open and close a valve(s) or to activate or deactivate a pump(s).

A control system or pump and valve can also be activated to vent or cool a compartment interior by activating a pump to draw or pump air through a compartment interior and contemporaneously activate a valve or a release valve to open positions. These functions can be activated simultaneously with other appliance modes such as microwave, venting and cooling functions. A compartment or housing control system or a vacuum sensor can activate a pump and a valve to create a predetermined vacuum level in a compartment or container disposed therein. A pressure release or valve can release a predetermined amount of vacuum from inside a compartment at a predetermined time period, pressure level or when a level is reached or exceeded and a vacuum can also be released via the aperture of a compartment.

As shown in FIG. 4, a compartment can comprise multiple storage functions or modes (45) such as, but not limited to, a conventional compartment with operating systems placed in either off or idle positions, a vacuum compartment, a pressurized compartment, a venting compartment, a cooling compartment, a humidity compartment, an outgassing compartment, a processing compartment to create environments inside containers disposed therein, such as temperature, humidity, vacuum, pressure, venting, cooling and outgassing, a processing compartment to emit UV light to treat items placed inside said compartment, a monitoring compartment to view, monitor and interact with items inside said compartment via an AI connected camera located inside a housing or compartment, a microwave and an oven function to defrost or cook items placed inside said compartment, among others.

Some of the appliance, operating and control system functionalities and modes can include, but are not limited to:
1.) A function to create a range of temperature inside a housing to cool or warm a compartment, container or food item disposed therein.
2.) A function to activate a pump and close a valve or to close a valve and activate a pump or to contemporaneously activate a pump and close a valve to create a vacuum environment inside a compartment when said compartment aperture is closed and sealed.

3.) A function to activate a pump and close a valve or to close a valve and activate a pump or to contemporaneously activate a pump and close a valve to create a pressurized environment inside a compartment when said compartment aperture is closed and sealed.

4.) A function to activate a pump (in vacuum or pressure mode) while a compartment valve is contemporaneously actuated to an open position to vent, cool or degas said compartment and contents therein. Furthermore, a temperature sensor or control system can activate a valve to a close position after a predetermined value, time period or level of vacuum, temperature or humidity has been established, reached or exceeded inside a compartment. This setting is applicable to any mode or function described herein.

5.) A function to activate a pump (vacuum or pressure mode) and to simultaneously close a valve to create a pressure or vacuum environment inside a compartment and to maintain said pressure or vacuum level inside said compartment until it is deactivated manually or automatically via a control system.

6.) A function to activate a pump and to close a valve to create a pre-determined vacuum in a compartment and when said maximum pressure level reaches or exceeds a pre-determined level, time period or value to then deactivate said pump and open a valve to release said vacuum and open said compartment by admitting air into said compartment.

7.) A function to activate a pump and to close a valve to create a preset vacuum level inside a compartment and when said maximum vacuum level reaches or exceeds a pre-determined time period, level or value to open a valve to release said vacuum by admitting air into a compartment and to deactivate said pump.

8.) A function to activate a pump and to close a valve to create a vacuum inside a compartment and when said maximum vacuum level reaches or exceeds a pre-determined level, time period or value to concurrently open a valve and deactivate a pump to admit air into said compartment to release said vacuum.

9.) A function to activate a pump and to close valves to create a preset vacuum in a compartment and thereafter for a pump to intermittently remove air or gas from the interior of said compartment or a container disposed therein. Further, said pump can intermittently remove air and gas following the reduction of the pressure in a compartment to a selected pressure. Additionally, a gas sensor, such as an ethylene, oxygen, carbon dioxide or other gas sensor or as described herein, can connect to a compartment interior, a control system or operating systems such that when a predetermined air or gas(es) level(s) fail, reach or exceed a pre-determined level or value inside a compartment a sensor can communicate with a control system or activate a pump to remove additional air or gas from said compartment. Further, a sensor can communicate with a control system, activate a pump or activate a valve to an open position to remove additional air or gas from a compartment. A sensor can also activate a pump and activate a valve to an open position to vent a compartment and remove air or gas, including a container disposed therein. The aforementioned sensors can also be located inside a container and function as previously described.

10.) A function to activate a pump and to close a valve to create a vacuum in a compartment, maintain said vacuum level for a pre-determined period of time and, thereafter, open a valve to admit air into said compartment to release a vacuum.

11.) A function to activate and place a valve in a closed or open position to seal or unseal a compartment to create, regulate and release environments from inside a compartment.

12.) A function to concurrently open a valve and to activate a pump (vacuum or pressure mode) to draw or push air into or out of a compartment to release or create environments therein.

13.) A function to deactivate a pump when a valve is in a close position to admit air into a compartment through an open and close aperture mechanism, such as a drawer or door opening, of a compartment to release a vacuum.

14.) A function to deactivate a pump and admit air into a compartment through an open and close aperture mechanism, such as a drawer or door opening, of a compartment to release a vacuum.

15.) A function to deactivate all or selected operating systems or place all or selected operating systems in an idle state.

16.) A function to close or open a valve when a compartment aperture mechanism, such as a drawer or door opening, is in a close or open position via an aperture sensor placed on a compartment or refrigerator aperture and in communication with a control system.

17.) A function to allow a valve to have an independent pressure setting or to be connected to a control system in a compartment to automatically open to release a vacuum created therein when a vacuum level is reached or exceeded inside said compartment and to automatically deactivate a vacuum pump creating said vacuum. As used herein, when a vacuum is released from a compartment said compartment is returned to atmospheric pressure.

18.) A function to operate, control and regulate a single or multiple UV lights positioned inside a compartment to treat the environment, containers or food items placed therein. The UV light can function in an appliance storage function or container processing mode and can further be sequenced to function for a period of time, a value or time interval prior to, in one instance, creating and maintaining a vacuum environment. Furthermore, the UV lighting treatment can function intermittently for programmed or sequenced time intervals or periods or based upon certain environmental parameters such as being achieved, exceeded, or not, and between and in sequence with other appliance functions.

19.) A function or mode to operate and control a microwave oven or oven to defrost, prepare and cook items placed inside a compartment.

20.) A function or mode to operate and control a camera or AI connected camera for facial, product or event recognition using photos or video and connected and further can be in communication with voice recognition and interaction systems and related software and hardware and internet and cloud connectivity to monitor and interact with users, events and products in a housing or compartment.

21.) A function for all modes to allow a control or operating system or a container with a wireless communication device to automatically activate a mode, series or sequence of modes or functions for selective, automatic or determined or sensor prompted or activated actions as described herein.

22.) A function that automatically turns off the temperature or reduces said temperature to a predetermined level when no container or food item is detected inside an appliance or compartment when the temperature function is activated and then return the temperature level to the previous setting when a food item or container is placed, identified or sensed inside said compartment. This function can be selectively activated or automatically via a sensor in a compartment or a sensor and wireless device attached to or inside a container in communication with a control system or via an AI connected camera system described herein connected to internet or cloud based services.

23.) A function or mode to activate, deactivate, regulate and operate a vacuum hose attachment to create vacuum environments inside one-way valve containers and bags. Said function can be selectively activated via a switch connected and in communication to the vacuum hose pump or via an appliance control system connected and in communication with the vacuum pump.

24.) A function or mode to activate, deactivate, regulate and operate a handheld UV light to disinfect and treat an appliance compartment or food and items placed inside the appliance compartment. The UV light can connect and communicate with an appliance control system or can connect, communicate and be actuated via a switch. Furthermore, a UV light can be wireless, rechargeable and be attached to, located or situated inside an appliance, appliance housing or compartment such as a recess or other constructed area to hold said device.

25.) An appliance function or mode to control, regulate and operate a humidity system to humidify the interior of an appliance compartment and containers placed therein.

26.) An appliance function or mode to electrically (motorized) open and close an appliance compartment venting system to open to allow compartment venting and cooling and to close said venting system to create a hermetically or vacuum sealed environment.

All operating systems, elements, functions or operations disclosed herein can be connected to or in communication with said appliance control and operating systems which in turn can be connected to internet and cloud based services. The appliance control system can be pre-programmed or programmable for each individual mode or operating function or combinations thereof. For example, each mode can be manually, automatically or in combination, selected via an appliance control system or each operating system individually or in combination. Single or multiple appliance modes or functions can sequence together, simultaneously, in series, selectively or automatically, and upon predetermined, programmable, sensed, timed, heard, voice, camera viewed, or voice or AI motivated, triggered or acted upon or via environmental parameters not achieved, achieved or exceeded. For example, a venting mode can be selected to vent a compartment at specified time or gas intervals and during this operation a user can place a one-way valve container into said compartment and select a vacuum sealing mode or the container can wirelessly communicate this mode to the control system to activate. The vacuum sealing mode is activated and once the predetermined vacuum level is created and released this mode terminates and the venting mode then automatically resumes. Further, each of the appliance modes can operate and function via a predetermined level, range or value of temperature, vacuum, gas, time, interval, occurrence or humidity level is created, maintained or exceeded inside a compartment or inside a container disposed therein or after a preset period of time. A compartment can also include sensors, such as weight, laser, proximity or other, connected to and in communication with said containers or control system to sense or identify if a food item or container is present inside a compartment when said temperature function has been activated and requires the temperature function. If a food item or container is sensed then the temperature function can be activated and maintained. If a food item or container is not sensed or identified then the temperature setting can be turned off or lowered to a preset temperature setting to save on the appliance operating costs. Each of the appliance functions and modes described herein include methods for operations and functions described herein such as selecting an appliance function or mode, combing appliance functions and modes, using a container with appliance functions and modes, combining said functions and modes and sequencing appliance functions or modes with other functions and modes and with functions and modes of external appliances which can be further defined by appliance environmental, operational and control systems and internet, cloud, AI, product, event and facial recognition software and voice command and recognition connected parameters.

Figure 5:
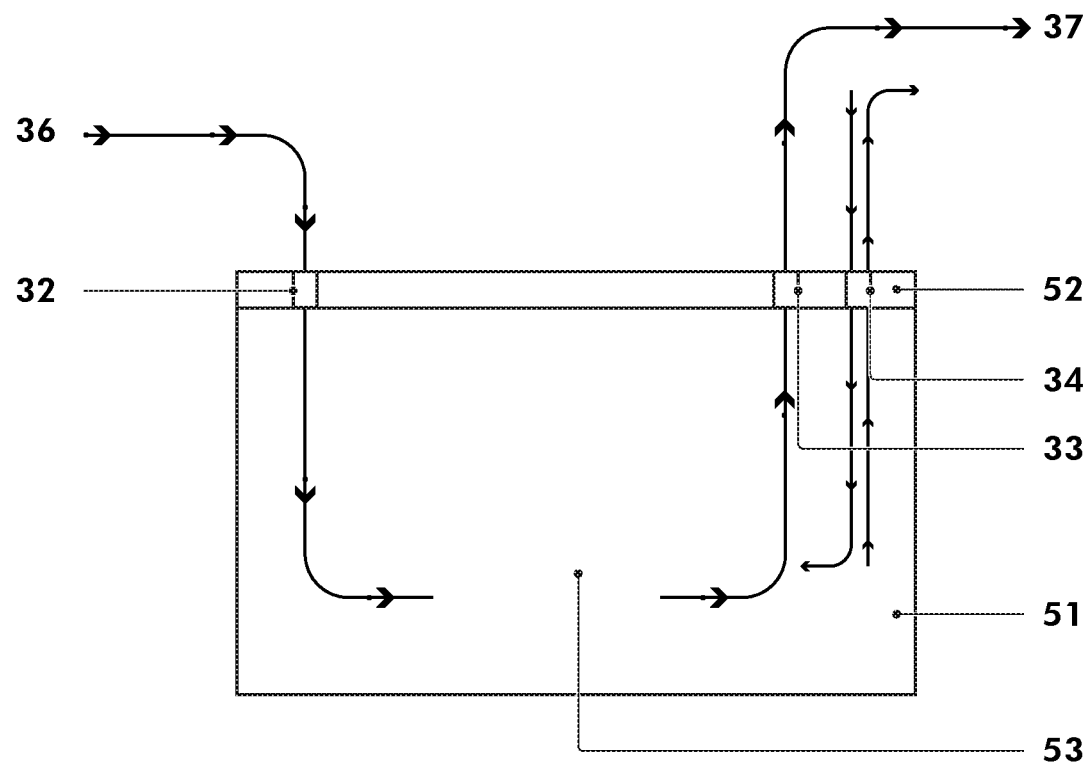
FIG. 5 illustrates a side view of a container with a cover and two one-way valves.
Figure 6:
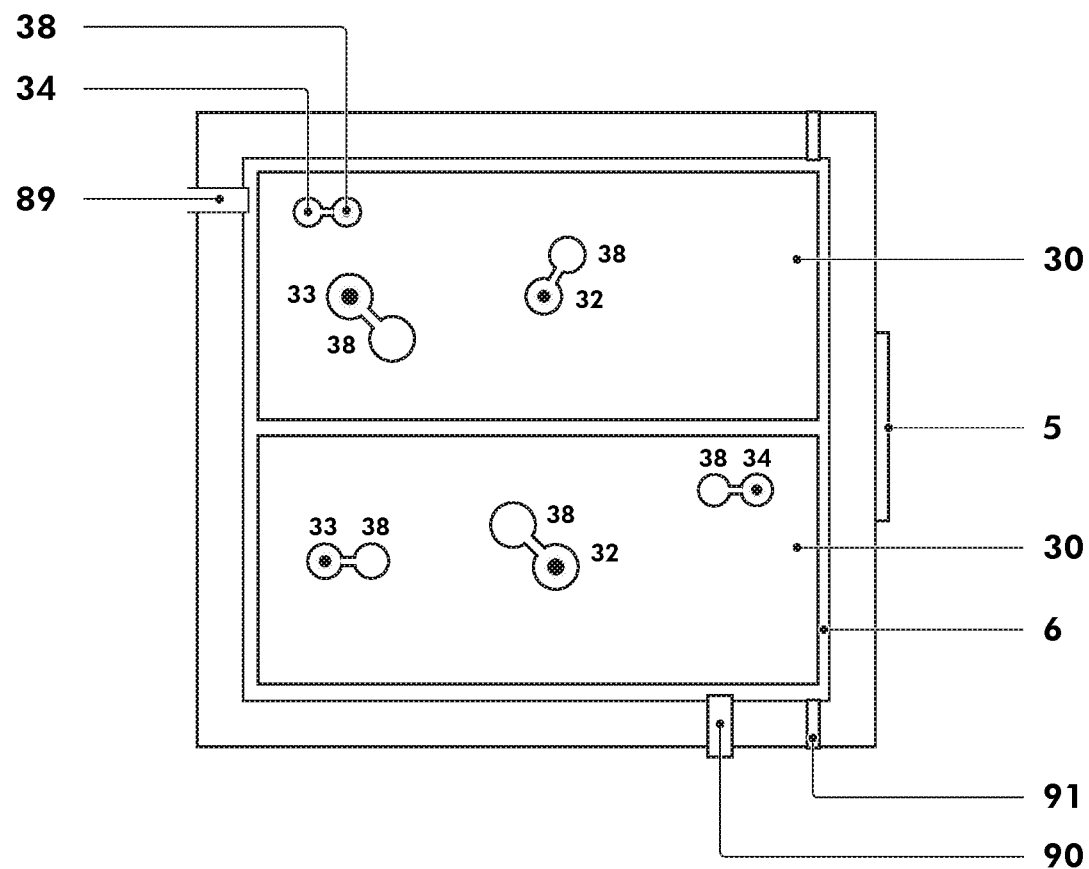
FIG. 6 illustrates a top view of covered containers with one-way valve assemblies inside a compartment.
Figure 7:
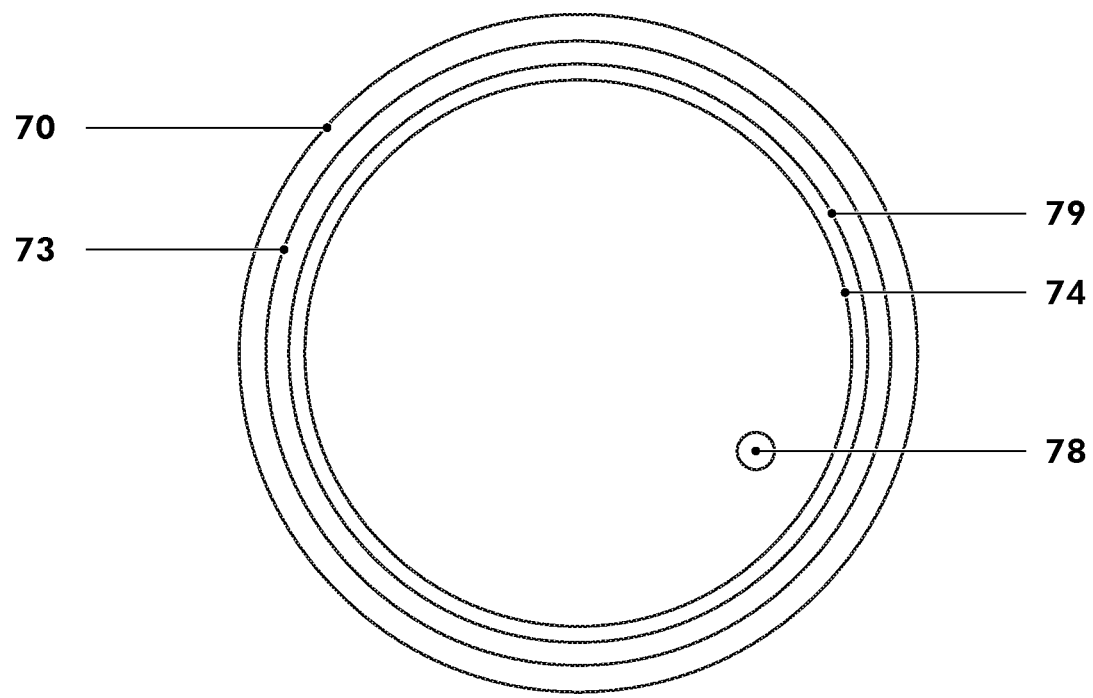
FIG. 7 illustrates a top view of a cover with an internal sealing mechanism.
Figure 8:
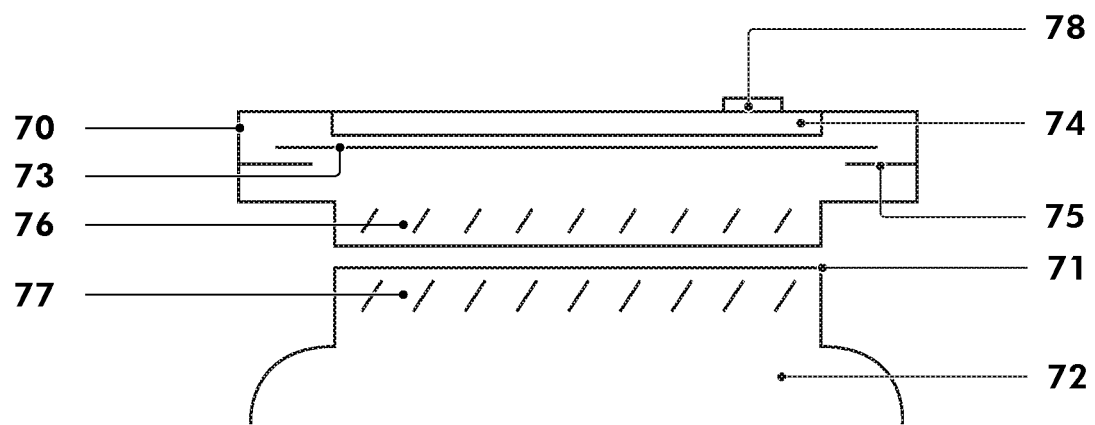
FIG. 8 illustrates a side view of a cover with an internal sealing mechanism.

Referring now to FIGS. 5 and 6, provided is a container to create multiple storage environments. A container can comprise any suitable material, such as plastic or glass or combinations thereof. A container can comprise a container body (51) with a sealable cover (52) that together can form an air-tight interior of a container (53). In the present embodiment, a cover can be fastened or attached to the container body in any manner (threads, fasteners, tongue and groove or a snap system) to engage and seal a cover and container body together to create and retain a vacuum or pressurized environment inside the interior of said container or to allow said container to vent.

A cover or container body can comprise two one-way valves, as shown in FIGS. 5 and 6. Valve (32) can allow air to enter (36) into a container and valve (33) can allow air to leave or exit (37) said container. A cover or container body can also comprise combinations of valves (32) and (36) and include a combination of openings and apertures (34) that open and close to allow air, gases or environments to be created inside and to enter and leave said container through either a one-way valve opening or via a container aperture. Valves and apertures can also include a rubber plug or stopper to seal said aperture and said container. In place of two separate valves, a three-way valve can be installed, which can be selected between one-way into the container, one-way out of the container, and both ways.

Each valve (32) and (36) and aperture (34) can be opened and closed by using said rubber plug or stopper (38) to prevent the flow of air, gases or environments into or out of said container. A sealing device can be a rubber plug or stopper device (38), or any other type of sealing mechanism, such as a toggle or switch that opens and closes the valves and apertures, a slidable cover, a dial, or any other closure system to seal and open said valve openings and apertures.

In this manner, the present container can be placed into a vacuum compartment wherein a vacuum is created inside said compartment and concurrently inside said container such that when a vacuum is released from the compartment the vacuum is concurrently released from the interior of said container if the proper valve(s) and apertures are open or the vacuum can be retained in the container if the proper valve(s) and apertures are closed.

Some of the following container environments can be created with said vacuum and container valve system when said container is placed inside a vacuum or pressure compartment.

1.) When valve (32) is closed and valve (33) is open or valve (33) is open and aperture (34) is closed, a partial vacuum created inside a compartment is concurrently created inside said container and retained inside said container when the vacuum is released from said compartment.

2.) When valve (32) is open and valve (33) is closed or valve (32) is open and aperture (34) is closed, a pressurized environment created inside said compartment is concurrently created inside said container and retained inside the container when the pressurized environment is released from said compartment.

3.) When valve (32) is open and valve (34) is open or valve (33) is open and aperture (34) is open, a vacuum created inside said compartment is concurrently created inside the container. When a vacuum is released from the compartment it is also released from inside said container. When the compartment is outgassed said container is also outgassed. When additional gases or air are removed from said compartment the air and gases are also removed from said container. Further, when a pump is activated to draw air through the compartment, air is also drawn or vented through said container. This functionality can be used to vent respiring content such as fresh fruit, vegetables, etc., and to cool container contents.

4. Closing the valves on a container after a vacuum or a pressure environment is created inside a container prevents other environments from being created inside said container or from allowing existing container environments from releasing. Closing all the valves and apertures allows the container to be used as a conventionally sealed storage container.

The aforementioned environments 1-4, and others, can be sequenced into a valve or aperture open and closure position system and device, such as a dial, switch, toggle, twist or slide mechanism. For example, by turning a dial or moving a slide from one position to another a user can automatically create environment 1 and, thereafter, can sequentially create environments 2-4 by moving the valve and aperture covers into the proper positions. For example, a dial or slide can be moved to a fresh fruit or meat label or marker and automatically position the valves and apertures to the appropriate close and open positions to preserve said goods.

Each container can be constructed with temperature, non-conducive retractable, removable or collapsible legs so that when the containers are placed inside a compartment and a vacuum is created and maintained inside said compartment the vacuum insulates the container from the compartment surfaces thereby creating a thermos effect inside each container therein. Closed or open containers can be used. This effect can be used as a food or plate warming preservation type drawer system. Each container can also have temperature, non-conducive borders or tabs on a lid or container body to prevent contact with compartment surfaces or other containers placed inside said compartment. Cold and hot items can be simultaneously stored. Additionally, containers can be placed on top of a temperature, non-conducive mat or container holder positioned inside said compartment.

FIGS. 7-9 and 17 and 19 illustrate other embodiments of a cover and a container that can be used as a conventional storage container or as a vacuum sealing container. This embodiment includes a cover (70) (also; lid, top, cap) that detachably covers and seals an aperture (71) (also; mouth, opening) of a container (72) to allow a vacuum environment to be created therein. A cover can attach to a container by compression fit, thread attachment, snap or any other manner or combinations thereof. In this manner, a cover can close and seal a container in an airtight manner.

Figure 19:
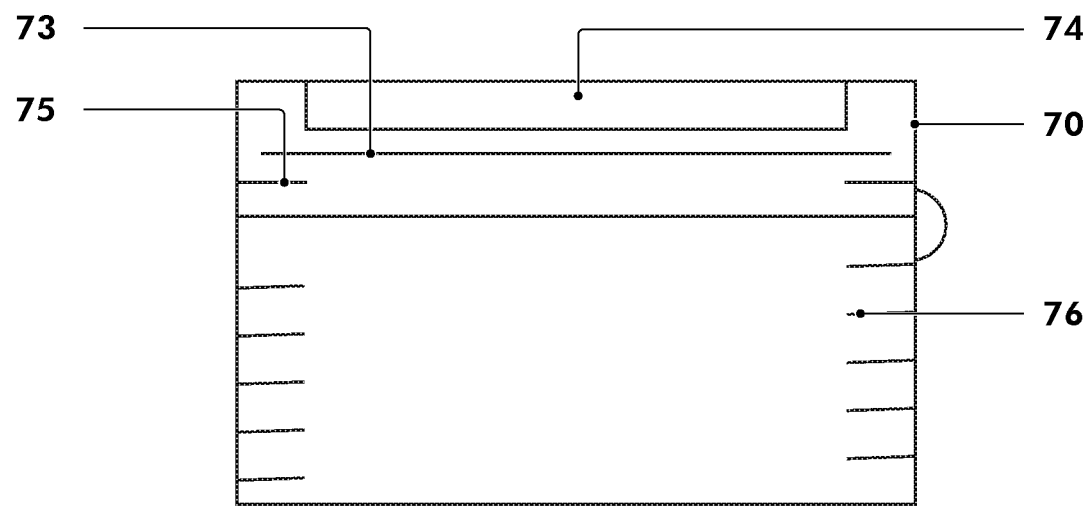
FIG. 19 illustrates a side view of an interior ring and mechanism to contain a seal in a flip top cover.
Figure 24:
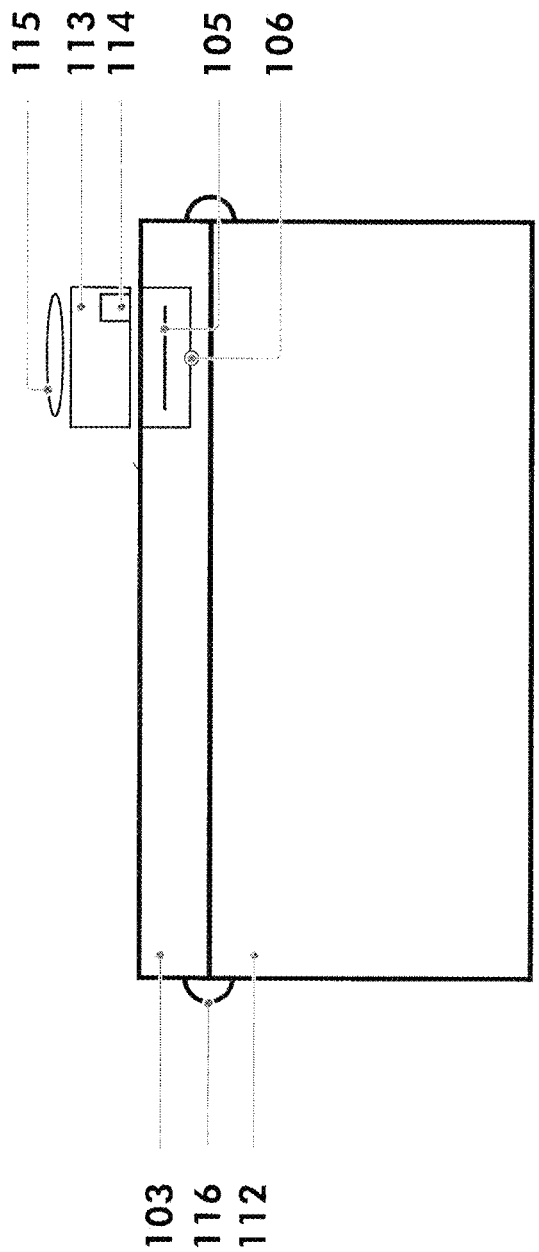
FIG. 24 illustrates a side view of a cover for a container with a container storage technology.
Figure 25:
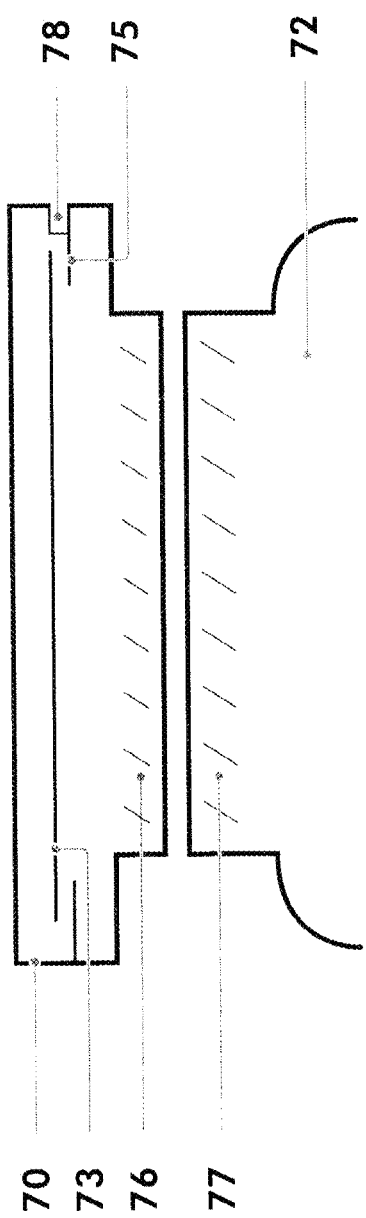
FIG. 25 illustrates a side view of a cover for a container with a container storage technology.
Figure 26:
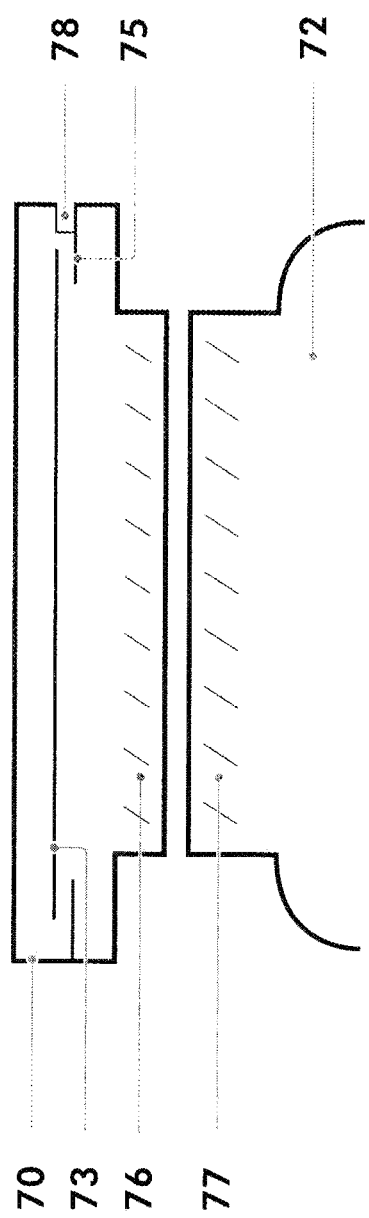
FIG. 26 illustrates a side view of a cover for a container with a container storage technology.

In the present embodiment, provided is a cover (70), comprising a thin, flat, annular (also: spherical, round, circular) sealing device (73) (seal), disposed and contained inside the interior of a cover. In one embodiment, a seal is contained in a cover by and between two extending, raised or protruding rings (74) that connect to and extend inwardly from the cover side walls or skirt. In another embodiment, a single ring (75) construction and arrangement can contain a seal. A cover can threadably (76) attach to a container. A cover can comprise a threaded interior neck (76) or aperture to threadably attach to a threaded exterior of a neck or aperture of a container (77) (or vise versa) or to another part of the cover that can be attached to said container. Depending upon the embodiment, the attachable threads of a cover and a container can engage to create an airtight seal or can engage without creating an airtight seal to allow air to pass through the threads. In other embodiments, engaging threads can be constructed and arranged to allow air into a container in a first position and then said engaging threads, when moved into a second position, can be arranged and constructed to create an airtight threading engagement to prevent air or a vacuum from entering or releasing from the interior of a container. Furthermore, a cover can include a sealable aperture or valve (78) to allow air into and out of the interior of the container via the cover and to create or release a vacuum from inside said container. Further, FIG. 24 shows a cover with a cut-out portion so that when the cover is in a close position with a vacuum environment inside a container a user can insert the end of a knife or other similar utensil to lift the flat seal to break the vacuum seal to release the vacuum from inside the container. In FIG. 25, the cover can have an integral attached cut-out on the bottom portion of the cover with a plastic wedge on the inside of the cut-out so that a user can press the attached cut-out inward towards the container so that the wedge pushes the flat seal upwards to break the vacuum seal to release the vacuum environment from inside the container. FIG. 19 depicts a container with a flip top and seal located therein.

In one embodiment, a cover containing an internal seal can be disposed onto a receptacle and moved clockwise into a first position to arrange and align a seal onto or over the aperture of a container with the inside top or sides of the cover closing and securing said seal onto the aperture of the container to allow air to flow out of said container when a vacuum is applied to said container but restricting the movement of air into said container. In this position said internal seal covers and seals the aperture of a container and the contents therein. A vacuum can then be applied to said container when placed into a compartment to evacuate air from the interior of said container with said internal seal closing and sealing said container such that when the vacuum is released from inside said compartment the internal seal covering the aperture of the container is vacuum sealed closed creating a vacuum environment inside said container. A cover can then be moved counter clockwise into a second position to remove the seal from the top of the container aperture and simultaneously unseal and remove the seal from the aperture of the container releasing an airtight seal between the internal seal and the container thereby releasing the vacuum environment from the interior of said container.

In another embodiment, a cover can be disposed onto a receptacle and moved clockwise into a first position to arrange and align a seal onto or over the aperture of a container to allow air to flow out of said container but restrict the movement of air into said container and also attach said cover onto a container. In this position a seal covers the aperture of a container. A cover can then be moved clockwise into a second position to secure or lock said seal onto and over the top or opening of the aperture of a container creating an airtight seal so that air or a vacuum environment cannot enter or release from the interior of said container. A cover can then be moved counter clockwise into a third position to remove said seal from the top of a container aperture and simultaneously unseal and remove the seal from the aperture of the container thereby releasing an airtight seal between the seal and the container and to release the vacuum environment from the interior of said container. A fourth counter clockwise position can detach and remove said cover and seal from the aperture of said container. The cover and container can be devised to function and engage in a clockwise or counter clockwise manner and can include the functionality of push or compression fit cover to engage in the various steps described herein or in combinations thereof.

Figure 9A:
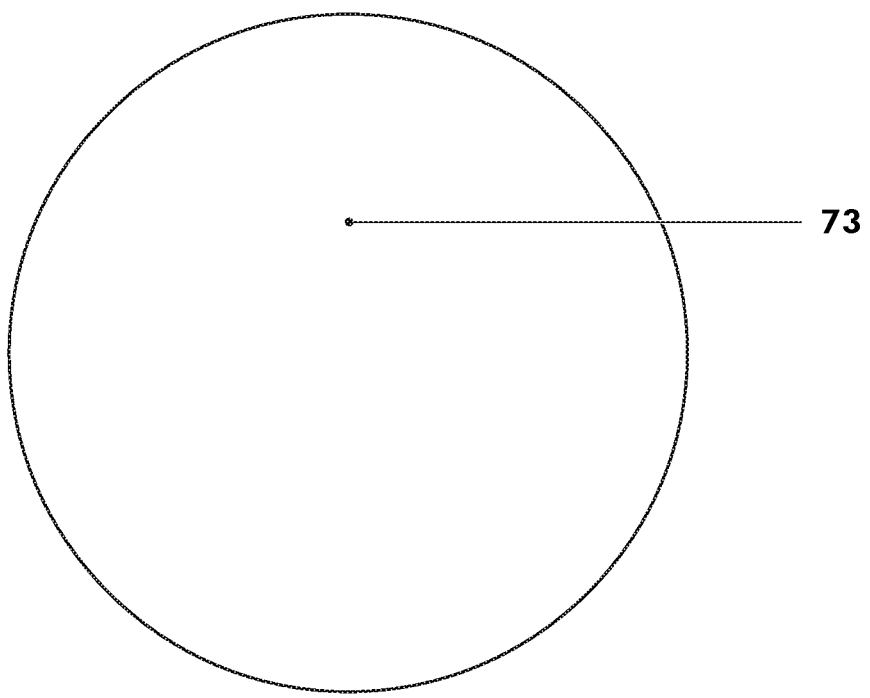
FIG. 9A illustrates a top view of an annular seal.
Figure 9B:
FIG. 9B illustrates a side view of an annular seal.

Continuing, the top interior walls or skirt of a cover can comprise a means to support, hold or contain a seal, such as raised, extending or protruding single or double rings, edges or lines, knobs or any other support or constraining type device mechanism (79) (rings) connected to the walls of the cover and extending inward away from the cover walls and constructed to hold a seal within a predetermined space and defined alignment. As shown in FIG. 9, a seal (73) can be sized and shaped with a circumference to cover and seal the aperture of a container and to contact the rings such that when a seal is positioned over and covering a container aperture said aperture is covered by said seal and can extend beyond the container aperture limits or edges to make contact with the rings extending from a cover. A seal can be constructed to move or float between two rings or between one ring and the top of a cover. In other embodiments, a seal can attach to the top or side walls of a cover to move or float and to align and cover the aperture of a container when a cover is attached to a container. A seal and top interior of a cover can be constructed such that a seal does not adhere or stick to the top of a cover. For example, the top of a cover can comprise a convex, raised or protruding ring, edge or line (74) extending downward and away from the top of a cover to prevent a seal from coming into contact and adhering to the top of a cover while also serving as a mechanism to secure and lock a seal onto the aperture of a container.

Figure 10:
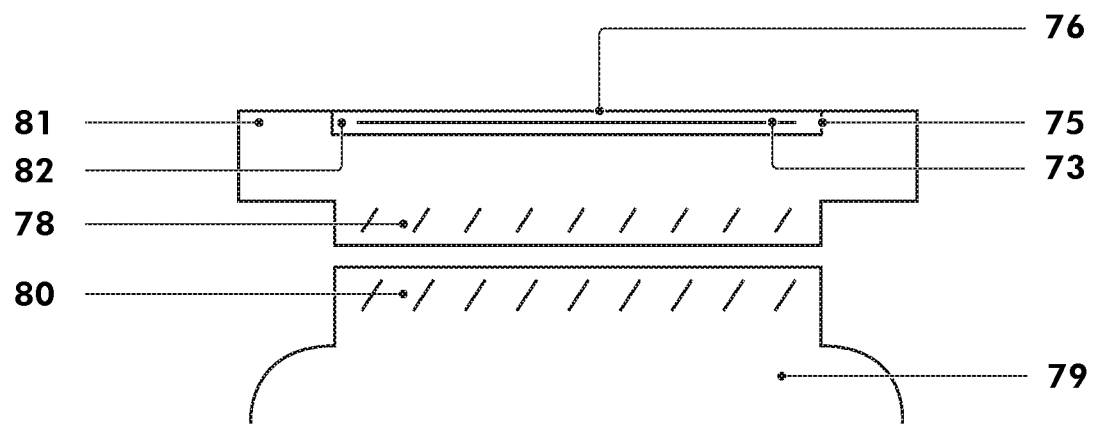
FIG. 10 illustrates a side view of a cover with an internal hollow circular sealing mechanism.

Another embodiment, as shown in FIG. 10, provides a cover (81) with a hollow circular skirt (82) constructed inside a cover skirt and attached to and extending downward from the interior top of a cover with a seal (73) contained inside said circular skirt and contained by a ring device (75), as previously discussed, to allow a seal (73) to float between the ring and the top (76) of a cover. When a cover is threaded (78) or pushed onto a container (79) into a first position the container aperture is constructed to fit into the hollow circular skirt to align and position a seal on top of a container aperture. In this position, a container aperture is covered by a seal and air can be evacuated from the interior of a container to create a vacuum environment therein. In other embodiments, a cover and container engaging threads (80) are constructed and arranged to allow air to release from a container in a first position and when moved into other positions the engaging threads can be arranged and constructed to create an airtight threading engagement to prevent air or a vacuum environment from entering or releasing from the interior of a container.

When a cover is disposed onto a container and moved into a first clockwise position a seal is positioned and aligned to fully cover the aperture of a container. In this position, a cover is secured onto a container base via the engagement of the cover and container threads with the seal positioned and aligned to cover and form a seal over the aperture of said container; however, the seal and threads of the cover and container, in this embodiment, can be constructed not to create an airtight seal between the cover, seal and aperture of a container to allow air or gas to flow out of the interior of said container and to allow a container to be evacuated when a vacuum is applied to it. A covered container in this position can be placed into a vacuum compartment. When a vacuum is applied to the compartment gases or air can be evacuated from the interior of the compartment and concurrently from the interior of said container. When a vacuum is released from the compartment the released vacuum forces the seal onto and over the container aperture creating an airtight seal and a vacuum environment inside said container. The container can be stored in this position. Furthermore, in another embodiment, moving a cover into a second clockwise position secures and locks the cover with the extending convex or raised ring, edge or line locking mechanism in the top of the cover onto and over the seal and onto and over the aperture of said container to create a locked airtight seal over the aperture of said container. When a cover is moved into a third counter clockwise position a double or single ring device, which contains and aligns the seal in the cover, unseals and removes the seal from the aperture of said container and unseals, removes and releases the airtight seal and any vacuum from the interior of said container. Additionally, when a cover is moved into a fourth counter clockwise position the cover and seal, which is disposed inside the cover, can be fully removed from the aperture of a container. As noted herein, the open and close steps can also include a two step method as discussed herein.

In another embodiment, a sealable aperture on a cover can allow air to be evacuated from the interior of a container and can be closed with a stopper or other type device so that the cover and container can function as a conventional storage container allowing an airtight environment to be created inside said container. Furthermore, in another embodiment, to notify a user that a cover and a container are properly aligned in first, second and third positions, the threads, cover or container can be constructed and arranged to create contact friction when moved into respective positions or another extending or contact material, structure or element from the cover or container at the points of alignment can create a sound or vibration to alert a user. A visual method can also be provided using markings such as lines, images, colors, icons or symbols on a container or a cover to inform a user of proper alignment and positioning and to notify the user said container is sealed.

In another embodiment, a cover can be constructed to tightly fit over and around the neck or aperture of a container so that it can be pushed onto the container without initially engaging threads. A cover can be pushed onto and over the neck or aperture of a container to place and align the cover and seal over the aperture of a container allowing it to be vacuum sealed. In one embodiment, in order to access the contents of a container after a vacuum is created inside a container, a cover can be pulled off which removes the seal, as previously discussed, releasing any vacuum from the interior of said container. In another embodiment a cover can include an air channel running from the base interior of a cover to the top of a cover or an aperture or valve can be situated on a cover to allow air to be evacuated from said container when the threading engagement creates an airtight seal between the cover and the container. Another embodiment provides a cover that can push onto a container into a first position where the seal is aligned and positioned over the neck or aperture of a container and can then be threaded into second and third positions after a vacuum is created inside said container. Another embodiment provides that a cover can push onto a container into a first position and push over threads into a second position and then be threaded counter clockwise into a third position. In another embodiment, a cover can be constructed to function as a flip top with a hinge type arrangement or mechanism and can further include a rubber seal or other suitable sealing material around the seal or container aperture and cover. A cover and a container can include any combination of threading or attachment in order to position and align a cover and a seal over the aperture of a container.

Figure 11:
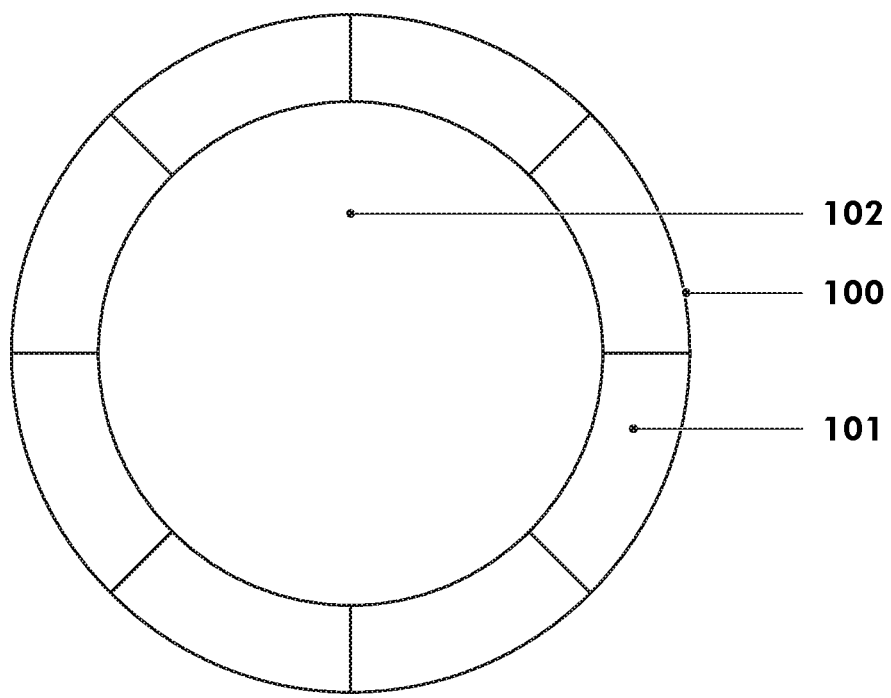
FIG. 11 illustrates a top view of a cover with an outer deformable section connected to an annular rigid center piece.
Figure 12:
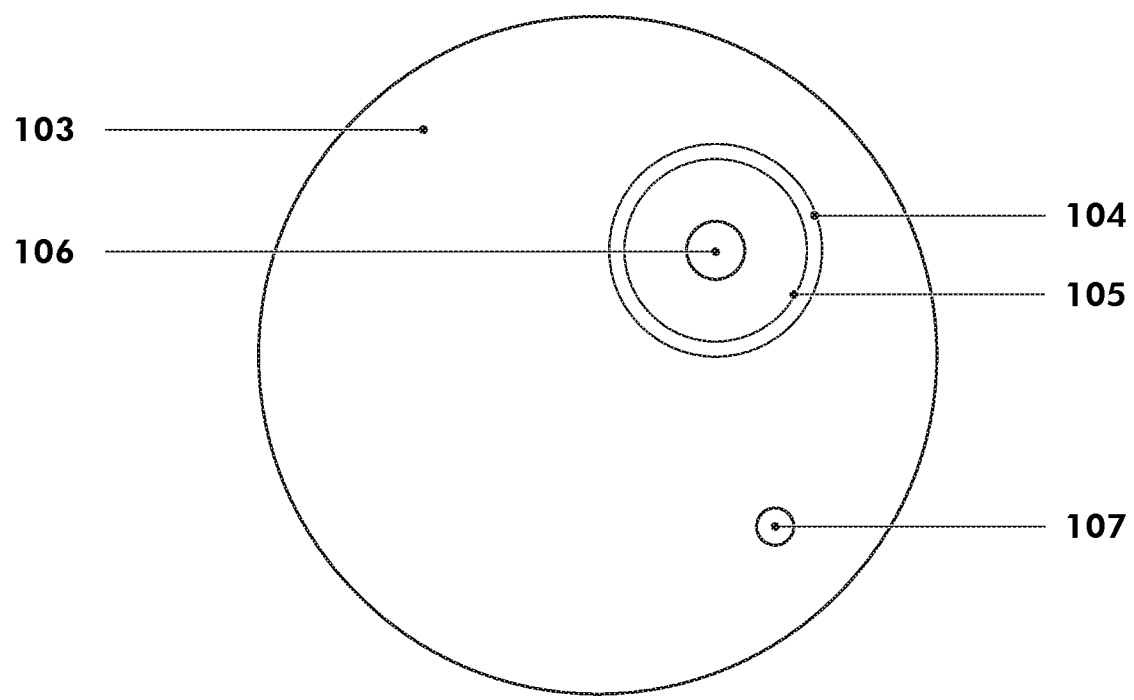
FIG. 12 illustrates a top view of an exterior sealing mechanism disposed on an annular cover.
Figure 13:
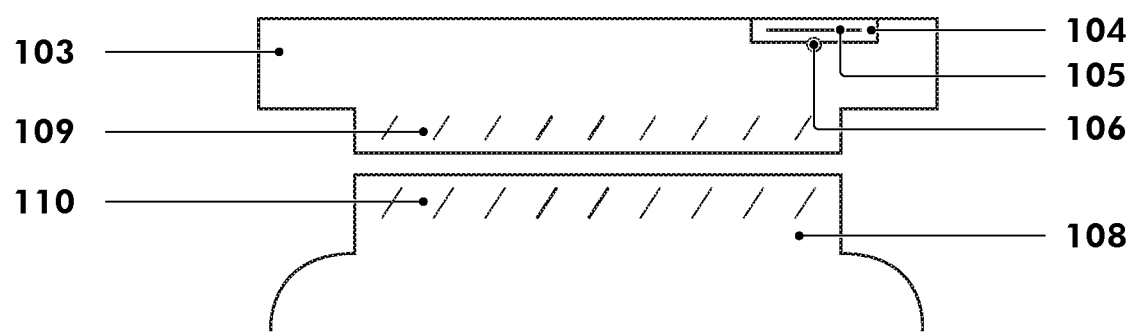
FIG. 13 illustrates a side view of an exterior sealing mechanism disposed on an annular cover.
Figure 14:
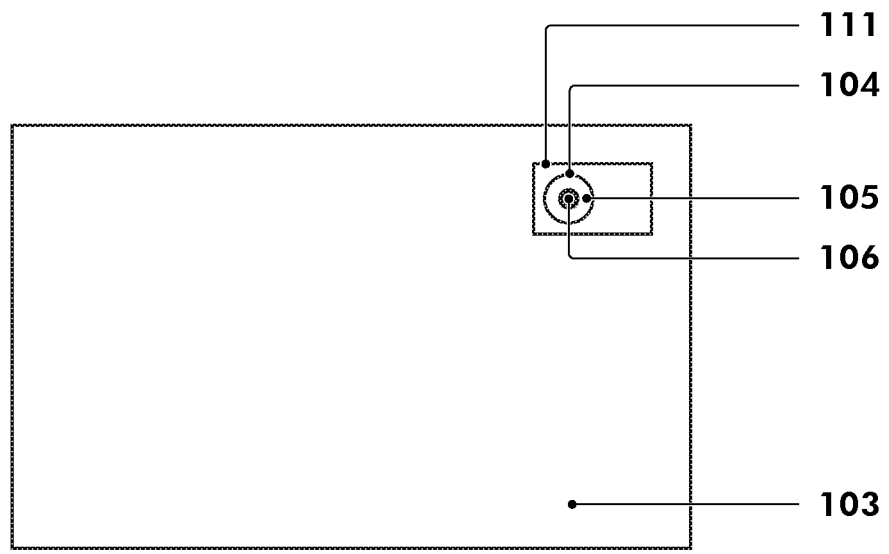
FIG. 14 illustrates a top view of an exterior sealing mechanism disposed on a cover with a protective adhesive plastic strip.
Figure 15:
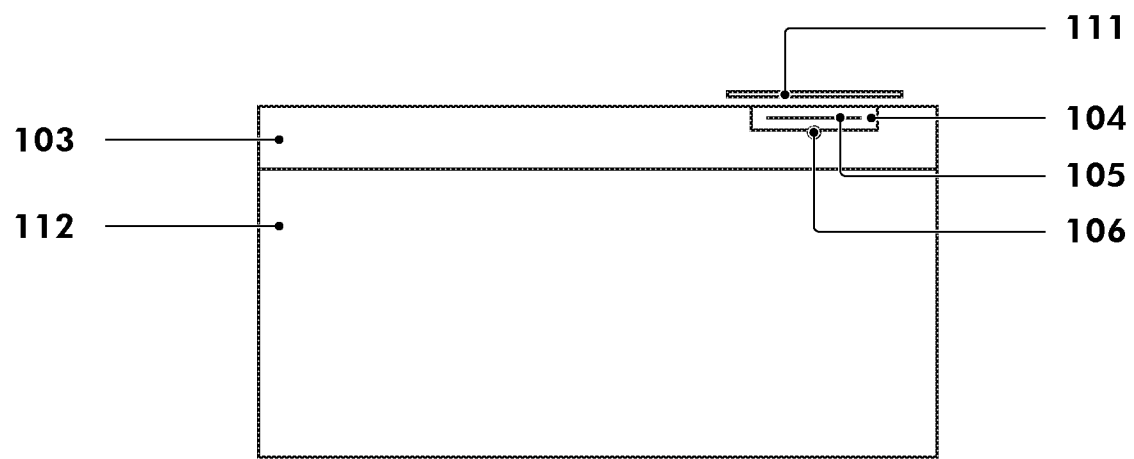
FIG. 15 illustrates a side view of an exterior sealing mechanism disposed on a cover with a protective adhesive plastic strip.

Referring now to FIG. 11, another embodiment can include a flexible or deformable container cover which can include a cover, top, center or side piece (100) constructed of a deformable, flexible, semi-rigid or jointed material (101), or combinations thereof and can include an annular, semi-rigid center piece (102) formed and sized to cover or exceed the circumference of the aperture of a container. A cover can be constructed such that when threaded or pushed onto the neck or aperture of a container the annular flexible or deformable cover, top or center piece is positioned and aligned to cover and seal the aperture or mouth of said container and is secured into said position via the engagement of the cover and container threads. In this position, air is prevented from entering into said container and the container contents are closed and sealed therein. Further, a vacuum applied to a container in this position can evacuate air from the interior of said container. In this embodiment, when the cover and container are engaged or threaded together air is allowed to pass or exit said container through the engaged threads of the cover and container when a vacuum is applied to the container. For example, when a vacuum is created inside a compartment, with a container disposed therein, a vacuum is concurrently created inside said container and when a vacuum is released from inside a compartment the release of the vacuum forces the annular flexible center section of the cover to create a vacuum seal over the aperture of the container mouth or aperture creating an airtight vacuum environment inside said container. The airtight, outer deformable, flexible, semi-rigid or jointed section of a cover allows the annular center piece to easily move and position to cover the aperture of a container and to maintain a vacuum environment inside a container.

Referring now to FIGS. 12-15, other embodiments include a cover (103) for containers (112) with a vacuum sealing mechanism disposed into the top portion of a cover. A cover can be detachable, threadably (109) or hingably attachable to a container (108). When a cover is attached to a container an airtight seal is created between said cover and the interior of said container. A cover can further include an indented or recessed section (104) on the exterior portion of a container or cover sized to receive and hold a seal or one-way valve (105). In this embodiment, a seal can be thin, flat and annular in shape (105). An aperture (106) can be positioned at the bottom of the indentation in the cover to allow air to flow into and out of the interior of said container. A seal can be positioned and arranged inside said indentation so that it can be contained and held in place. An indentation can include a containing or holding ring around the top part of said indentation. Additionally, a seal can include a "T" (144), ball or another seal shaped extension or tail to hold said seal in place in the aperture of a container. Furthermore, in this position a seal can be positioned on top of the aperture situated in the base of the indentation on the cover. A seal can cover and create a seal over the aperture in the cover but can be arranged to allow air to pass out of and evacuate from the interior of a container. When a container is placed into a compartment and a vacuum is created inside said compartment a vacuum is concurrently created inside said container. When a vacuum is released from the interior of a vacuum compartment the released vacuum forces a seal onto and over the aperture in the cover creating a vacuum seal and an airtight environment inside said container. Furthermore, a valve or sealed aperture (107) can be constructed on the cover to release a vacuum. The seal mechanism can also function without being placed into an indentation on a cover, as discussed herein, and be seated on the surface of a container and can be contained inside a ring positioned over an aperture in the cover of said container. Furthermore, the seal can be covered with a plastic material to create a hermetic environment and said plastic material can be punctured in order to allow air or gas to pass out of said container when a consumer intends to use it.

Figure 16:
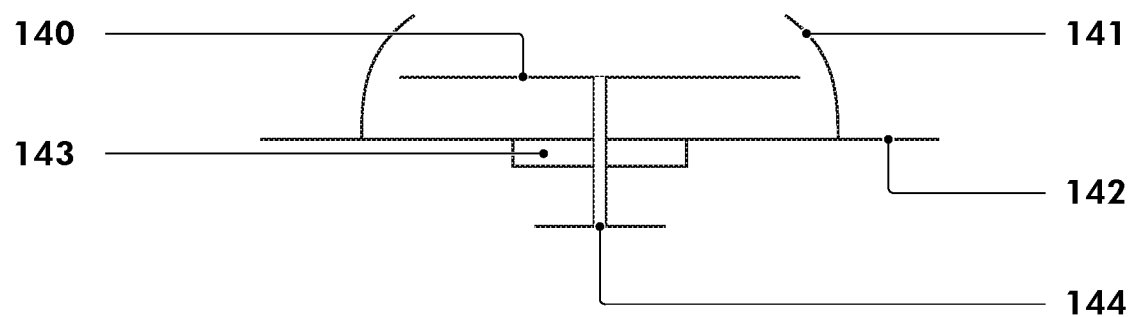
FIG. 16 illustrates a side view of an exterior holding ring and lock mechanism to contain a seal onto a cover.
Figure 17:
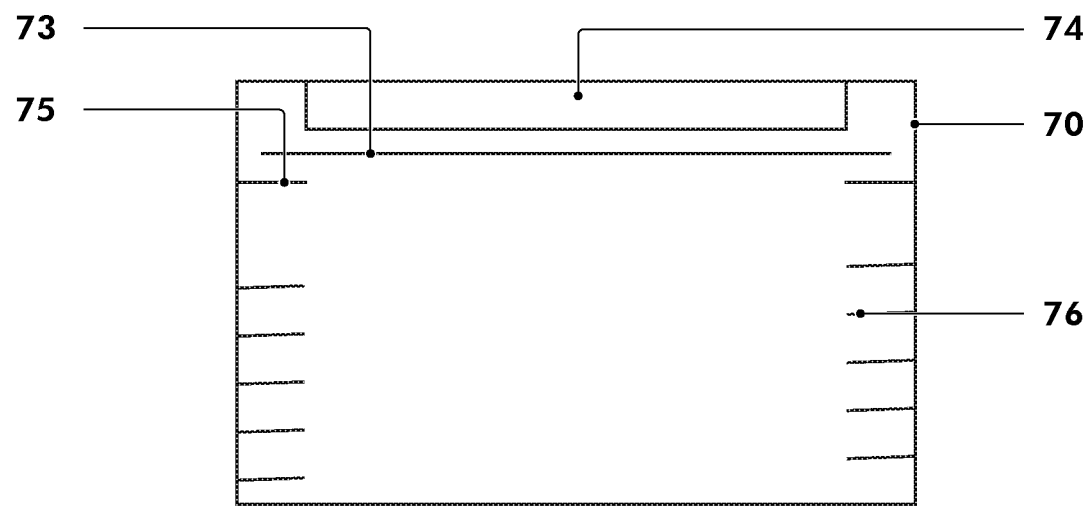
FIG. 17 illustrates a side view of an interior ring and lock mechanism to contain a seal onto a cover.

FIG. 16 illustrates another embodiment; a seal (140) can be secured and held in place under a raised ring or a semi-circular ring (141) that attaches to and extends upward from a cover (142) and aperture (143). The ring can be constructed and arranged to allow a seal to float or move between the container and said ring so that air can be evacuated out of a container when a vacuum is applied or a seal can attach to the container and aperture via a "T" shaped extension to contain said seal and to also prevent the contents of said container from exiting the container. A seal can be placed or inserted into said ring or semi-circular ring mechanism. In another embodiment, a ring mechanism can be pushed downward to lock a seal to the top of a cover and over an aperture or a ring can be threadable into a container or aperture so that a ring can be turned clockwise to lock a seal over an aperture on a cover and moved counter clockwise to unlock said seal and aperture. Any of the disclosures herein can also incorporate a sealing mechanism and device which can be placed into the neck or throat of a bottle with a one-way valve or seal incorporated or placed into the mechanism.

In other embodiments, a pull-off or puncturable adhesive, film, plastic or material ("strip") (111) can be positioned, adhered or heat attached and arranged on the opening of a valve or seal to protect, seal, secure or lock a seal or valve in a cover or container and to prevent any foreign materials from entering into a container or valve. For example, a seal or one-way valve can be hermetically or situated into a recess or indentation in a container with a strip over the top (111) so that a user can either pull the strip off or puncture said strip or plastic in order to use said container in a vacuum compartment. A strip can also cover and seal an aperture as described herein on the exterior or interior of a cover or container. A strip can be used for containers or covers constructed with one-way valves so that the exterior and interior openings of a one-way valve can be covered and sealed. A strip can attach or affix to one side of a seal. When a strip is pulled it can be removed from the top of a seal or valve and pulled to one side of a seal or valve with the other side of the strip remaining attached to a cover or container. In this way, a strip can be re-used to cover and secure a valve or a seal by re-adhering it over said valve or seal. In another embodiment, strip can pull off and be removed from a one-way valve without re-using it. In yet another embodiment, strip can remain attached to cover a valve or a seal. For example, a container with perishable food or items may be purchased from a store with a strip adhered over a one-way valve to keep the contents therein secure and safe. After a container is opened a user can reseal and create a vacuum environment inside said container. A user can remove said strip covering the exterior opening of a valve and can also remove an interior strip covering an aperture or interior opening of a valve to allow air to evacuate from the interior of said container if a vacuum is applied to create a vacuum environment therein. Afterwards, a user can re-adhere a strip over said valve, aperture or seal. If a user does not intend to re-vacuum a container a strip(s) can be left in place on said container.

Figure 18:
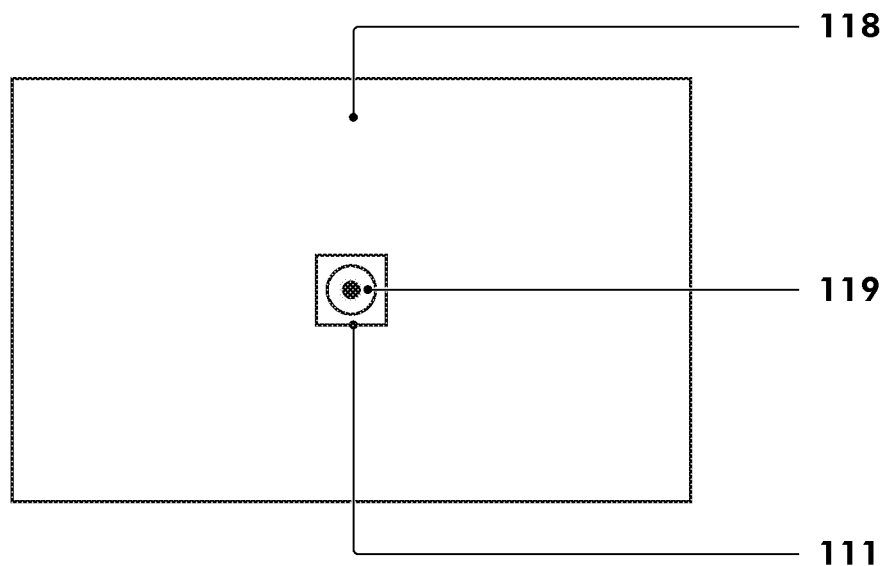
FIG. 18 illustrates a top view of a thin film, plastic or foil incorporating a one-way valve to seal an aperture of a container.

FIG. 18 shows a side view of a film, plastic, foil or other suitable food storage material ("material") (118) with a one-way valve (119) incorporated therein. Said material can be used to cover and seal the aperture of a container in order to create a vacuum environment inside said container when a vacuum is applied as described herein. Said material can adhere and be resealable in order to close and seal an opened container.

Figure 20:
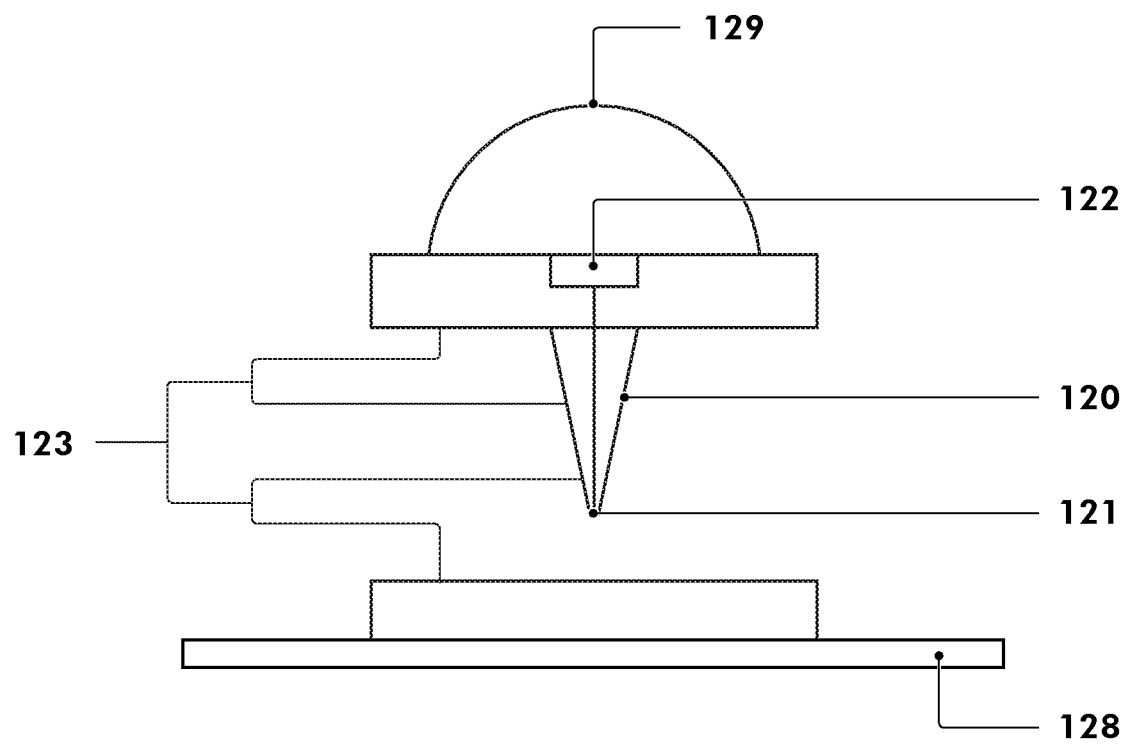
FIG. 20 illustrates a side view of a one-way valve threading or piercing lance device.

FIG. 20 shows another embodiment of a one-way valve device that can include a hollow tube with a one-way valve (122) positioned inside said tube or cover to create an airtight construction between said interior hollow tube walls or cover and a one-way valve disposed therein. The hollow tube can include engaging threads (123) on the exterior of the hollow tube or a piercing tip or point (121) and can be constructed and positioned on one end of the hollow tube with the one-way valve positioned at the other end so that when said one-way valve device is threaded or inserted, or a combination thereof, into a container or cover of a container the device pierces and creates an opening or aperture into the container or container cover to allow the hollow tube to be pushed into said container or cover to create a seal between the two engaging members and to allow air to pass out of a sealed container through said tube and one-way valve. When a sealed container with an inserted or attached one-way valve device is placed into a container and then in to compartment and a vacuum is applied, air is evacuated out of the container via the one-way valve in said hollow tube to create a vacuum environment inside said container and when the vacuum is released from inside the compartment a vacuum environment is retained inside said container. When the contents of a container are finished a user can remove the one-way valve device and use it interchangeably with other containers or covers. Another embodiment depicts a cover with a finger structure (129) to allow a user to hold said one-way valve device to insert or rotably attach said device into a container or using a combination thereof. Also shown is a raised annular ring that can include engaging threads on the inside or outside of said raised annular ring device. The one-way valve device cover (129) can also include engaging threads (123) to engage the threads on the annular ring. In this manner, the raised annular ring with threads can be incorporated into the body of a container (128), cover of a container or into a bag so that a user can insert the one-way valve device by engaging the respective threads of the cover and raised annular ring to thereby create an airtight seal between the cover and said annular ring and to simultaneously puncture and create an aperture in the container, cover or bag to allow air to be evacuated from inside a container or bag as previously noted. It should also be noted that the annular ring mechanism can be suited or located on the inside of a plastic bag with the cover pushed into the threads of the annular ring from the outside or other side of the bag to accomplish the same functions as described herein.

Figure 21:
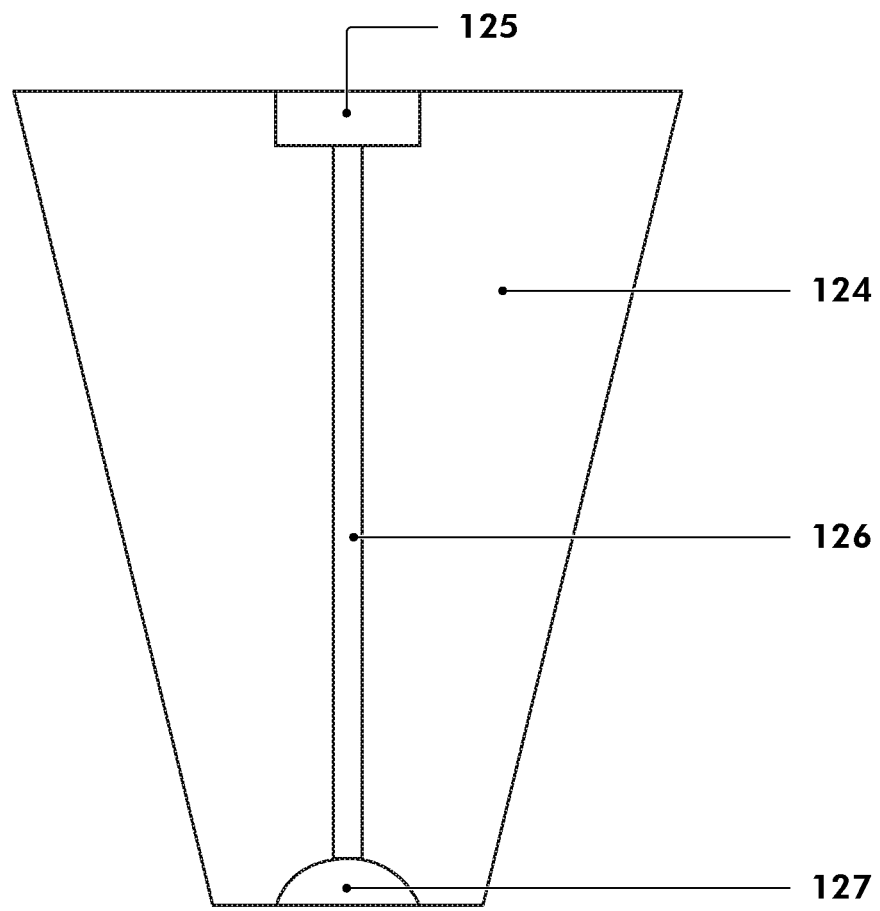
FIG. 21 illustrates a side view of a stopper with a one-way valve to seal the aperture of a container or bottle.

FIG. 21 illustrates a rubber stopper, plug or cork ("stopper") (124) construction incorporating a one-way valve (125) into said structure connecting said one-way valve via a passageway (126) to an aperture (127) to allow air to be evacuated from the interior of a container by inserting said stopper into the aperture of a container to create an airtight seal in said container. A stopper can have a tapered shape in order to fit securely into an aperture and can be interchangeable between various sized apertures of containers. A stopper can be placed into the aperture of a container or bottle to create a vacuum or pressurized environment therein as described herein. Furthermore, a stopper can include a seal device as disclosed herein.

It should also be noted that any of the container embodiments disclosed herein, where applicable, can be used in a microwave oven, oven, vacuum, pressure, humidity, UV system, induction plate (where said containers incorporate appropriate magnetic metals) or in any other system disclosed herein. Also provided are methods of manufacturing containers with container storage technologies which can also include any of the other disclosed method steps herein. A method of manufacturing can comprise the following steps: providing a flexible, air-tight bag having an opening for inserting perishable food or items to be stored; providing an air-tight seal across the opening; providing a one-way valve assembly installed in the bag, wherein the valve assembly allows air to pass out of the bag but prevents air from entering into the bag, wherein the valve assembly can comprise an adhesive, film, plastic or material to cover and seal the exterior side of said one-way valve such that when the adhesive, film, plastic or material seals or covers said valve air cannot pass out of the bag, wherein when said adhesive, film, plastic or material seal or cover is removed from the valve air is allowed to pass out of the bag.

An alternate method of manufacturing can comprise the following steps: providing a flexible or rigid air-tight container having an aperture or opening for inserting perishable food or items to be stored; providing a cover that engages onto the container body to create an air-tight seal between the cover and container body; providing a one-way valve assembly installed into the container body or cover for the container, wherein the valve assembly allows air to pass out of the container but prevents air from entering into the container, wherein the valve assembly can comprise an adhesive, film, plastic or material to cover and seal the exterior side of said one-way valve such that when the adhesive, film, plastic or material seals or covers said valve air cannot pass out of the container, wherein when said adhesive, film, plastic or material seal or cover is removed from the valve air is allowed to pass out of the container.

Another embodiment can comprise the following steps: providing a flexible or rigid air-tight container having a threaded aperture or opening for inserting perishable food or items to be stored; providing a threaded cover that engages onto the threaded aperture or opening of the container body to create an air-tight seal between the cover and container body; providing a one-way valve assembly disposed in the container body or cover lid for the container, wherein the valve assembly allows air to pass out of the container but prevents air from entering into the container, wherein the valve assembly can comprise an adhesive, film, plastic or material to cover and seal the exterior side of said one-way valve such that when the adhesive, film, plastic or material seals or covers said valve air cannot pass out of the container, wherein when said adhesive, film, plastic or material seal or cover is removed from the valve air is allowed to pass out of the bag.

Another method of manufacturing can comprise the following steps: providing a flexible or rigid air-tight container having an aperture or opening for inserting perishable food or items to be stored; providing a cover that engages onto the container body to create an air-tight seal between the cover and container body; providing a sealable one-way valve assembly that is installed into the container body or cover for the container, wherein the valve assembly allows air to pass out of the container but prevents air from entering into the container, providing a second sealable one-way valve assembly installed into the container body or cover for the container, wherein the valve assembly allows air to enter into the container but prevents air from leaving said container, wherein the valve assemblies can comprise an adhesive, film, plastic or material to cover and seal the exterior side of each one-way valve such that when the adhesive, film, plastic or material seals or covers said valve air cannot pass out or enter said container via the respective one-way valve, wherein when said adhesive, film, plastic or material seal or cover is removed from the valve air is allowed to pass out and air is allowed to enter said container via the respective one-way valve, such that when a one-way valve is opened to allow air to leave said container and the other valve is closed and a vacuum is applied to said container a vacuum environment is created inside said container and further such that when a one-way valve is opened to allow air to enter into said container and the other valve is closed and a pressurized environment is applied to said container a pressurized environment is created inside said container, and further when both one-way valves are placed into open positions and a vacuum, degas or venting environment is applied said container is also concurrently vented or degassed because air or gases are allowed to enter and leave said container concurrently.

The following disclosure modifies all the above container manufacturing methods as follows: Wherein the air-tight seal on a bag or container aperture is resealable, wherein the adhesive, film, plastic or material that can seal or cover a valve is resealable, wherein a second seal can be placed over the interior side of a one-way valve and further wherein said adhesive, film, plastic or material can cover the opening of a one-way valve or part of said container, further comprising the act of providing the valve assembly and seal as an integral piece or part of said container, further comprising the act of providing the one-way valve seal adhesive, film, plastic or material element to cover said valve openings to prevent particles of material from inside and outside said container from entering the valve assembly or container and wherein other compatible container storage technologies can be incorporated into said container with said one-way valves.

The disclosure herein of the various embodiments is not limited to an individual embodiment but rather said disclosure is intended to apply to any and all embodiments as disclosed herein.

As defined herein, "product packaging" refers to the exterior or interior of a container and embedded materials, bag, outer wrap, container sleeve or adhesives which can attach to or in which the perishable food or item can be stored.

As defined herein, "primary product" can refer to the primary product being sold. In one embodiment, a primary product is a perishable food or item and in another it can include a container and in yet another it can also include container storage technologies. Examples of perishable food or items are any perishable food or item that may or may not require freezer, refrigeration or vacuum storage or combinations thereof. Examples of containers and bags can include any type of sealable or resealable container, bag, package, pouch, receptacle, bottle, flexible or rigid container or any combination that can maintain a vacuum and air-tight environment inside said container when air is evacuated from the interior of the aforesaid or when a pressurized environment is created inside said container.

A "secondary or tertiary product" can refer to a product other than the primary product which can provide an actual or perceived benefit to the primary product. These benefits can also apply from primary to secondary and secondary to tertiary and tertiary to primary brand logos or names or in any combination or order thereof. In one embodiment, a secondary or tertiary product can be an appliance such as a smart refrigerator or kitchen storage system capable of reading containers with rfid tags, a refrigerated vacuum storage unit or a vacuum storage unit without refrigeration to create vacuum environments inside containers, all of which can be enabled to read rfid tags. Other secondary or tertiary products can include freezers, pantry cabinets or drawers, storage closets, containers, container storage technologies and food and service distribution channels or networks.

As defined herein, "benefit" can refer to a quality that is associated with a consumer or a product during its normal use, or to a quality that is not normally associated with a product, but which the product can possess nonetheless. This quality, advantage or synergy can be unexpected, unseen, not apparent, a perishable food or item, container, container storage technologies and appliance application or consumer engagement. In one embodiment, primary benefits of a perishable food or item in a storage container with storage container technologies can include, but are not limited to: preservation and freshness, extended shelf-life, maintenance of nutrients, improved storage appearance, hygiene, suitability, incorporated container or appliance technologies, product advantages and uses, consumer engagement with additional products and benefits, product availability and combinations thereof and as additionally described herein.

As defined herein, "primary brand logo or name" can refer to the brand name or logo that is normally associated with the primary product being sold. Similarly, "secondary or tertiary brand logo or name" can refer to the brand name or brand logo that is associated with a secondary or tertiary product, brand logo or name or common descriptor. A brand logo or name can also include any communicative indicia or combinations thereof.

As defined herein, "communicative indicia" can refer to any indicia that can communicate a specific primary, secondary or tertiary benefit. Communicative indicia includes, but is not limited to: brands, logos, brand logos, brand names, words, symbols, pictures, trademarks, service marks, graphics, text, product samples, advertising information, letters, messages, email and website addresses, social media and other digital contact information and combinations thereof.

As previously stated, the present invention relates to a method and system to provide consumers with a perishable food or item in a container with container storage technologies with product packaging that effectively presents communicative indicia and text to inform consumers of benefits associated with said product, uses and applications with other appliances and to provide consumer information regarding appliances that can utilize a select perishable food or item in a container with container storage technologies.

If a perishable food or item in a container with a container storage technology is to perform its intended task and to be commercially accepted, it should provide consumers with realized benefits. Benefits as previously noted can include, but are not limited to, the group comprising: preservation and freshness, extended shelf-life, maintenance of nutrients, improved storage appearance, hygiene, suitability, incorporated technologies, product advantages, consumer engagement with additional products and product, container, container storage technologies and appliance availability and combinations thereof.

In one embodiment, product packaging represents a perishable food or item in a container with a container storage technology. The product packaging further comprises one or more communicative indicium or text to inform consumers of benefits associated with said product. In another embodiment, the communicative indicium or text is a secondary or tertiary brand logo or name of products. Specifically, the secondary and tertiary products may be associated by consumers with a desirable quality or benefit, not normally associated, realized or expected with the primary product such as an appliance which can utilize said perishable food or item, container and container storage technologies and the benefits that flow from those uses.

Figure 22:
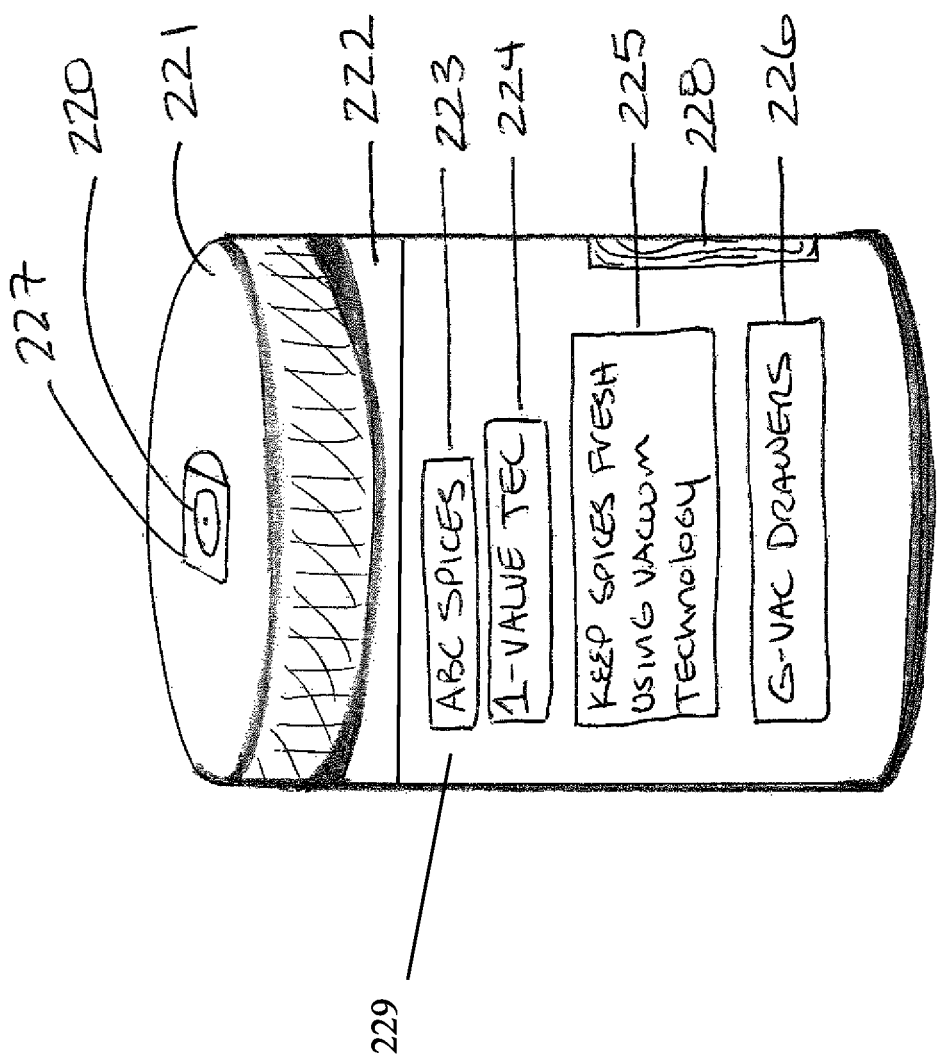
FIG. 22 illustrates a perishable food or item inside a container with a container storage technology and brand logos or names.
Figure 23:
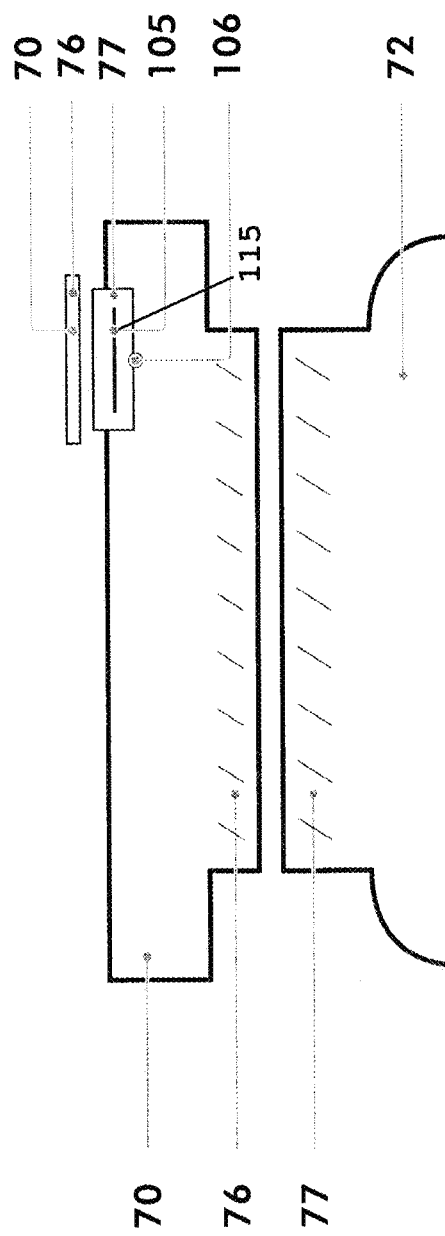
FIG. 23 illustrates a side view of a cover for a container with a container storage technology.

FIG. 22 depicts a perishable food or item inside a container with a container storage technology and brand logos and names. A sealable container (222) is provided with a cover (221) disposed thereon. The cover can include a one-way valve (220) to allow air to be evacuated from inside said container when a vacuum is applied to it to create a vacuum environment therein. An adhesive, film or plastic material (227) can cover the one-way valve to protect the valve and container contents and can be removed to allow a vacuum environment to be created inside said container. An rfid tag and a sensor (228), in one embodiment the RFID tag and sensor can be connected and in communication with each other, as well as for any of the other embodiments described herein, and can be located individually or together inside or on said container, to monitor and track said perishable food or item and said container. A primary brand logo or name (223) represents a perishable food or item. A secondary brand logo or name (224) represents a container or container storage technology that can be used to allow a vacuum environment to be created inside said container. A brand logo or name descriptor (225) can describe or associate the brand logos or names. A tertiary brand logo or name (226) represents a vacuum appliance that can be used to create a vacuum environment inside said container.

The system can be used to create a vacuum in which during heating of the food steam is vented from the container using the flat seal or one-way-valve and when the food is cooled air cannot enter the container thereby creating the vacuum. Seal and valve can be used to create pressure below vacuum in the container by creating a vacuum in a vacuum appliance.

Figure 27:
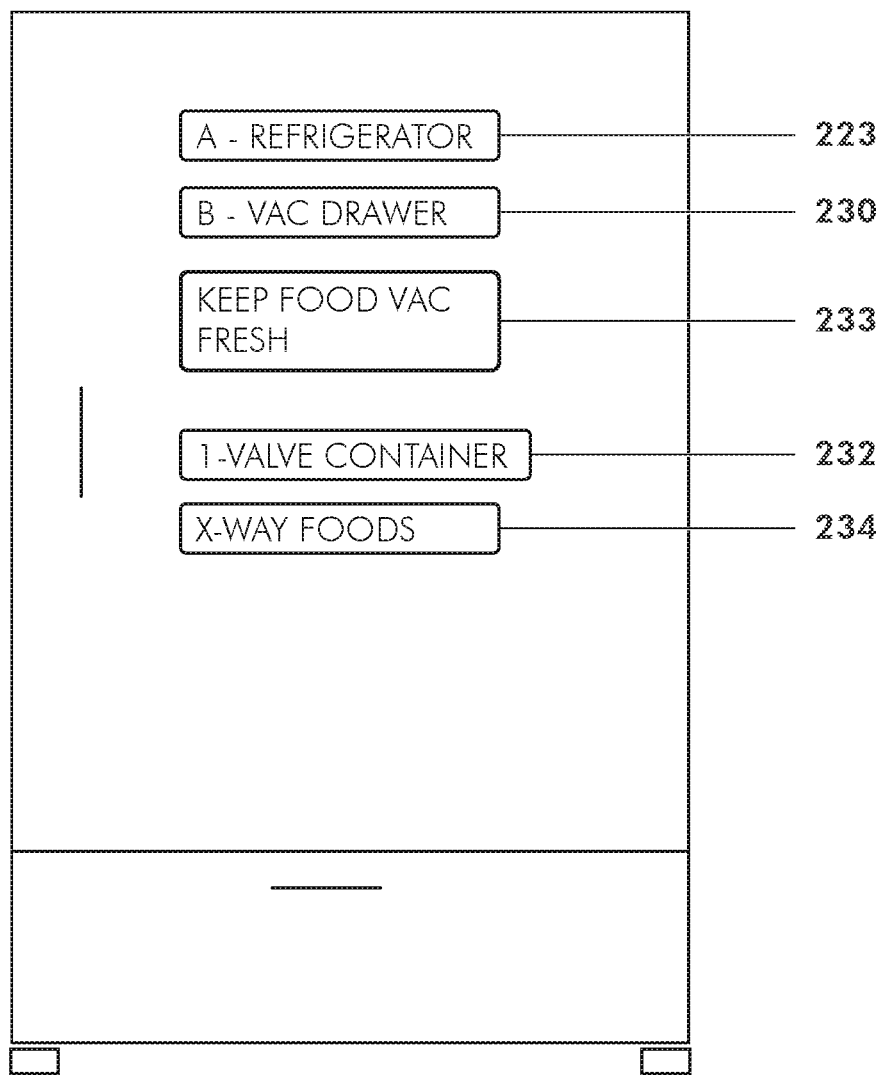
FIG. 27 illustrates an appliance with a storage technology that can use a perishable food or item inside a container with a container storage technology with brand logos or names.

It should be noted that the methods disclosed in FIGS. 1-4 can also apply where the primary brand logo or name is an appliance and where the secondary or tertiary brand logos and names or generic name references are a perishable food or item, a container or container storage technologies, or any combinations thereof as illustrated in FIG. 27.

FIG. 27 depicts an appliance with a storage technology such as a refrigerator with a vacuum drawer or compartment (230). A primary brand logo or name (223) represents an appliance (231). A secondary brand logo or name (232) represents a container or container storage technology that can be used to allow a vacuum environment to be created inside said container inside said vacuum compartment inside a refrigerator. A brand logo or name descriptor (233) can describe or associate the brand logos or names. A tertiary brand logo or name (234) can represent a perishable food or item or food or service distributor.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. A connected smart multi-function apparatus for storing, preserving and cooking, comprising:
a refrigerator-microwave compartment defining a cavity, the compartment comprising a base, sidewalls, and a top;
a door attached to the compartment to form a sealable compartment; and
apparatus operating systems;
the apparatus operating systems comprising:
a microwave element comprising a magnetron or solid state microwave system in communication with the compartment;
a temperature element comprising a Peltier or solid state device in communication with the compartment configured to cool or heat the compartment;
at least one camera with recognition software in communication with an interior of the compartment;
a control system comprising a processor;
a user interface device;
a voice control application or artificial intelligence software in communication with the processor configured to control the apparatus operating systems; and
the processor in communication with or connected to the temperature element, microwave element, camera, and user interface device, the user interface device configured to operate the temperature element, microwave element, or camera, wherein the camera is configured to display or view a container or a container with a barcode or QR code; to identify a container or a container with a barcode or QR code; to provide storage, preservation or cooking data; to determine freshness, expiration date, shelf-life, storage, preservation or cooking conditions for a container; to activate, deactivate or operate the temperature element or microwave element based on the identification and data from the container or container with a barcode or QR code; or to provide related storage, preservation or marketing notices to the user interface device.

2. The smart multi-function apparatus according to claim 1, wherein the user interface device comprises a display configured to connect by wire or wirelessly to the processor and comprises a display, smartphone, tablet, reader, computer, watch, or glasses and can communicate using BLE, NFC, RF or Wi-Fi or any other wireless communication.

3. A connected smart multi-function apparatus for storing, preserving and cooking, comprising:
a refrigerator-oven compartment defining a cavity, the compartment comprising a base, sidewalls, and a top;
a door attached to the compartment to form a sealable compartment; and
apparatus operating systems;
the apparatus operating systems comprising:
a temperature element comprising a Peltier or solid state device in communication with the compartment configured to cool or heat the compartment;
at least one camera with recognition software in communication with an interior of the compartment;
a control system comprising a processor;
a user interface device;
a voice control application or artificial intelligence software in communication with the processor configured to control the apparatus operating systems; and
the processor in communication with or connected to the temperature element, camera, and user interface device, the user interface device configured to operate the temperature element, or camera, wherein the camera is configured to display or view a container or a container with a barcode or QR code; to identify a container or a container with a barcode or OR code to provide storage, preservation or cooking data; to determine freshness, expiration date, shelf-life, storage, preservation or cooking conditions for a container; to activate, deactivate or operate the temperature element or microwave element based on the identification and data from the container or container with a barcode or QR code; or to provide related storage, preservation or marketing notices to the user interface device.

4. The smart multi-function apparatus according to claim 3, wherein the user interface device comprises a display configured to connect by wire or wirelessly to the processor and comprises a display, smartphone, tablet, reader, computer, watch, or glasses and can communicate using BLE, NFC, RF or Wi-Fi or any other wireless communication.

5. A connected smart multi-function apparatus for storing, preserving and cooking, comprising:
a refrigerator-oven compartment defining a cavity, the compartment comprising a base, sidewalls, and a top;
a door attached to the compartment to form a sealable compartment; and
apparatus operating systems;
the apparatus operating systems comprising:
a temperature element comprising a Peltier or solid state device in communication with the compartment configured to cool or heat the compartment;
a control system comprising a processor;
a user interface device configured with a radio frequency reader in communication with the interior of the compartment;
a voice control application or artificial intelligence software in communication with the processor configured to control the apparatus operating systems; and
the processor in communication with or connected to the temperature element, a radio frequency reader, and user interface device, the user interface device configured to operate the temperature element, or radio frequency reader, wherein the radio frequency reader is configured to identify and receive storage, preservation or cooking data from a tag or tag with a sensor in communication with a product, food item or container; to determine freshness, expiration date, shelf-life, storage, preservation or cooking conditions for a product, food item or container; to activate, deactivate or operate the temperature element based on the identification and data from the tag or tag with a sensor; or to provide related storage, preservation, cooking or marketing notices to the user interface device.

6. The smart multi-function apparatus according to claim 5, wherein a tag comprises an NFC, RFID, Bluetooth or hybrid tag configured to incorporate food, product, container, apparatus or marketing data and sensors connected to or in communication with a tag comprise gas, temperature, humidity or acidity sensors to monitor the condition of food, products or containers.

7. The smart multi-function apparatus according to claim 5, wherein the user interface device comprises a display configured to connect by wire or wirelessly to the processor and comprises a display, smartphone, tablet, reader, computer, watch, or glasses and can communicate using BLE, NFC, RF or Wi-Fi or any other wireless communication.

8. A connected smart multi-function apparatus for storing, preserving and cooking, comprising:
a refrigerator-microwave compartment defining a cavity, the compartment comprising a base, sidewalls, and a top;
a door attached to the compartment to form a sealable compartment; and
apparatus operating systems;
the apparatus operating systems comprising:
a microwave element comprising a magnetron or solid state microwave system in communication with the compartment;
a temperature element comprising a Peltier or solid state device in communication with the compartment configured to cool or heat the compartment;
at least one ultraviolet-C light source in communication with an interior of the compartment;
at least one camera with recognition software in communication with an interior of the compartment;
a control system comprising a processor;
a user interface device;
a voice control application or artificial intelligence software in communication with the processor configured to control the apparatus operating systems; and
the processor in communication with or connected to the ultraviolet-C light source, temperature element, microwave element, camera, and user interface device, the user interface device configured to operate the ultraviolet-C light source, temperature element, microwave element, or camera, wherein the camera is configured to display or view a container or a container with a barcode or QR code; to identify a container or a container with a barcode or QR code to provide storage, preservation or cooking data; to determine freshness, expiration date, shelf-life, storage, preservation or cooking conditions for a container; to activate, deactivate or operate the temperature element or microwave element based on the identification and data from the container or container with a barcode or QR code; or to provide related storage, preservation or marketing notices to the user interface device.

9. The smart multi-function apparatus according to claim 8, wherein the user interface device comprises a display configured to connect by wire or wirelessly to the processor and comprises a display, smartphone, tablet, reader, computer, watch, or glasses and can communicate using BLE, NFC, RF or Wi-Fi or any other wireless communication.

10. A connected, smart multi-function apparatus for storing, preserving and cooking, comprising:
a refrigerator-microwave compartment defining a cavity, the compartment comprising a base, sidewalls, and a top;
a door attached to the compartment to form a sealable compartment; and
apparatus operating systems;
the apparatus operating systems comprising:
a microwave element comprising a magnetron or solid state microwave system in communication with the compartment;
a temperature element comprising a Peltier or solid state device in communication with the compartment configured to cool or heat the compartment;
a control system comprising a processor;
a user interface device configured with a radio frequency reader in communication with the interior of the compartment;
a voice control application or artificial intelligence software in communication with the processor configured to control the apparatus operating systems; and the processor in communication with or connected to the temperature element, microwave element, a radio frequency reader, and user interface device, the user interface device configured to operate the temperature element, microwave element, or radio frequency reader, wherein the radio frequency reader is configured to identify and receive data from a tag or tag with a sensor; to provide product, food item or container storage, preservation or cooking data; to determine freshness, expiration date, shelf-life, storage, preservation or cooking conditions for a product, food item or container; to activate, deactivate or operate the temperature element or microwave element based on the identification or data received from the tag or tag with a sensor; or to provide related storage, preservation, cooking, or marketing notices to the user interface device.

11. The smart multi-function apparatus according to claim 10, wherein a tag comprises an NFC, RFID, Bluetooth or hybrid tag configured to incorporate food, product, container, apparatus storage, preservation, cooking or marketing data and sensors connected to or in communication with a tag comprise gas, temperature, humidity or acidity sensors to monitor the condition of food, products or containers.

12. The smart multi-function apparatus according to claim 10, wherein the user interface device comprises a display configured to connect by wire or wirelessly to the processor and comprises a display, smartphone, tablet, reader, computer, watch, or glasses and can communicate using BLE, NFC, RF or Wi-Fi or any other wireless communication.

13. A connected smart multi-function apparatus for storing, preserving and cooking, comprising:
a microwave compartment defining a cavity, the compartment comprising a base, sidewalls, and a top;
a door attached to the microwave compartment to form a sealable compartment; and
apparatus operating systems;
the apparatus operating systems comprising:
a microwave element comprising a magnetron or solid state microwave system in communication with the compartment;
at least one ultraviolet-C light source in communication with the compartment;
a control system comprising a processor;
a user interface device configured with a radio frequency reader in communication with the interior of the compartment;
a voice control application or artificial intelligence software in communication with the processor configured to control the apparatus operating systems; and
the processor in communication with or connected to the ultraviolet-C light source, microwave element, a radio frequency reader, and user interface device, the user interface device configured to operate the ultraviolet-C light source, microwave element, or radio frequency reader, wherein the radio frequency reader is configured to identify and receive data from a tag or tag with a sensor in communication with a product, food item or container; to determine freshness, expiration date, shelf-life, storage, preservation or cooking conditions for a product, food item or container; to activate, deactivate or operate the microwave element or ultraviolet-C light source based on the identification and data from the tag or tag with a sensor; or to provide related storage, preservation, cooking or marketing notices to the user interface device.

14. The smart multi-function apparatus according to claim 13, wherein a tag comprises an NFC, RFID, Bluetooth or hybrid tag configured to incorporate food, product, container, apparatus, storage, preservation, cooking or marketing data and sensors connected to or in communication with a tag comprise gas, temperature, humidity or acidity sensors to monitor the condition of food, products or containers.

15. The smart multi-function apparatus according to claim 13, wherein the user interface device comprises a display configured to connect by wire or wirelessly to the processor and comprises a display, smartphone, tablet, reader, computer, watch, or glasses and can communicate using BLE, NFC, RF or Wi-Fi or any other wireless communication.

16. A connected smart multi-function apparatus for storing and preserving, comprising:
an ultraviolet-C light source compartment defining a cavity, the compartment comprising a base, sidewalls, and a top;
a door attached to the compartment to form a sealable compartment; and
apparatus operating systems;
the apparatus operating systems comprising:
at least one ultraviolet-C light source in communication with the interior of the compartment;
at least one camera with recognition software in communication with an interior of the compartment;
a control system comprising a processor;
a user interface device;
a voice control application or artificial intelligence software in communication with the processor configured to control the apparatus operating systems; and
the processor in communication with or connected to the ultraviolet-C light source, camera, and user interface device, the user interface device configured to operate the ultraviolet-C light source and camera, wherein the camera is configured to display or view a container or a container with a barcode or QR code; to identify a container or a container with a barcode or QR code to provide storage, preservation or cooking data; to determine freshness, expiration date, shelf-life, storage, preservation or cooking conditions for a container; to activate, deactivate or operate the temperature element or microwave element based on the identification and data from the container or container with a barcode or QR code; or to provide related storage, preservation or marketing notices to the user interface device.

17. The smart multi-function apparatus according to claim 16, wherein the user interface device comprises a display configured to connect by wire or wirelessly to the processor and comprises a display, smartphone, tablet, reader, computer, watch, or glasses and can communicate using BLE, NFC, RF or Wi-Fi or any other wireless communication.

18. A connected smart multi-function apparatus for storing, preserving and cooking, comprising:
a refrigerator-microwave compartment defining a cavity, the compartment comprising a base, sidewalls, and a top;
a door attached to the refrigerator-microwave compartment to form a sealable compartment; and
apparatus operating systems;
the apparatus operating systems comprising:
a microwave element comprising a magnetron or solid state microwave system in communication with the compartment;
a temperature element comprising a Peltier or solid state device in communication with the compartment configured to cool or heat the compartment;

at least one ultraviolet-C light source in communication with the interior of the refrigerator-microwave compartment;
a control system comprising a processor;
a user interface device configured with a radio frequency reader in communication with the interior of the compartment;
a voice control application or artificial intelligence software in communication with the processor configured to control the apparatus operating systems; and
the processor in communication with or connected to the ultraviolet-C light source, temperature element, microwave element, a radio frequency reader, and user interface device, the user interface device configured to operate the ultraviolet-C light source, temperature element, microwave element, or radio frequency reader, wherein the radio frequency reader is configured to identify and receive data from a tag or a tag with a sensor in communication with a product, food item or container; to determine freshness, expiration date, shelf-life, storage, preservation or cooking conditions for a product, food item or container; to activate, deactivate or operate the temperature element, microwave element, or ultraviolet-C light source based on the identification and data from the tag or tag with a sensor in communication with a product, food item or container; or to provide related storage, preservation, cooking or marketing notices to the user interface device.

19. The smart multi-function apparatus according to claim 18, wherein the user interface device comprises a display configured to connect by wire or wirelessly to the processor and comprises a display, smartphone, tablet, reader, computer, watch, or glasses and can communicate using BLE, NFC, RF or Wi-Fi or any other wireless communication.

20. The smart multi-function apparatus according to claim 18, wherein a tag comprises an NFC, RFID, Bluetooth or hybrid tag configured to incorporate food, product, container, apparatus, storage, preservation, cooking or marketing data and sensors connected to or in communication with a tag comprise gas, temperature, humidity or acidity sensors to monitor the condition of food, products or containers.

21. The smart multi-function apparatus according to claim 18, wherein at least one camera with recognition software in communication with or connected to the processor and the interior of the compartment is configured to display or view a container or a container with a barcode or QR code; to identify a container or a container with a barcode or QR code; to provide storage, preservation or cooking data; to determine freshness, expiration date, shelf-life, storage, preservation or cooking conditions; to activate, deactivate or operate the temperature element, microwave element, or ultraviolet-C light source based on the identification or data from the container or container with a barcode or QR code; or to provide related storage, preservation, cooking or marketing notices to the user interface device.

* * * * *